United States Patent Office 3,110,441
Patented Nov. 12, 1963

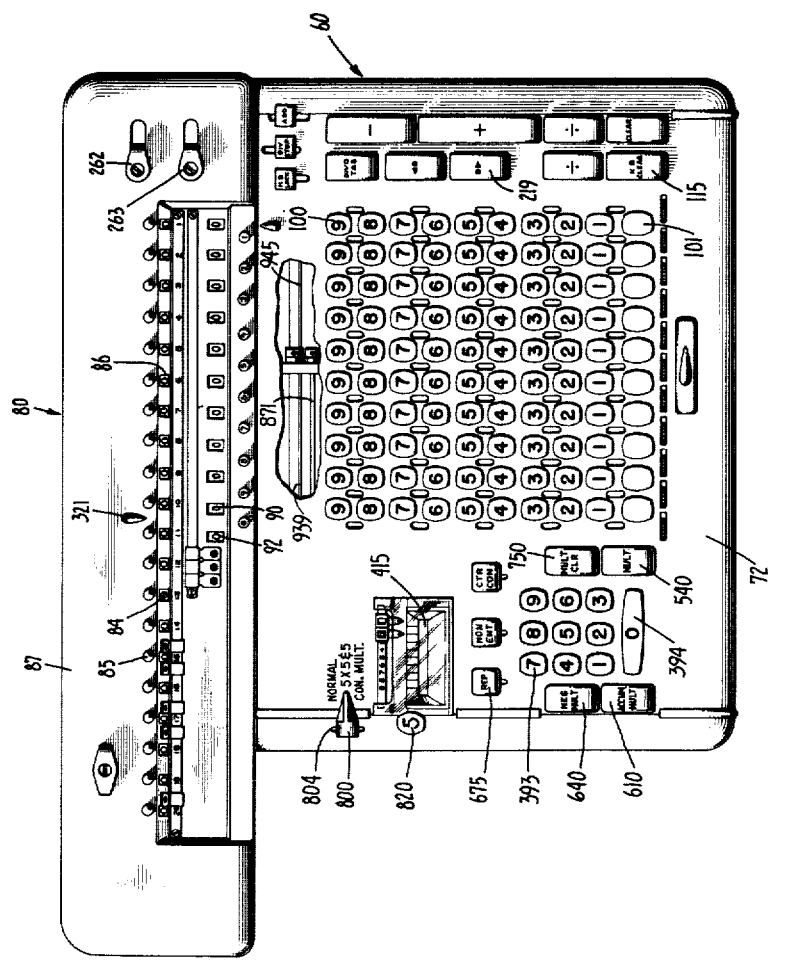

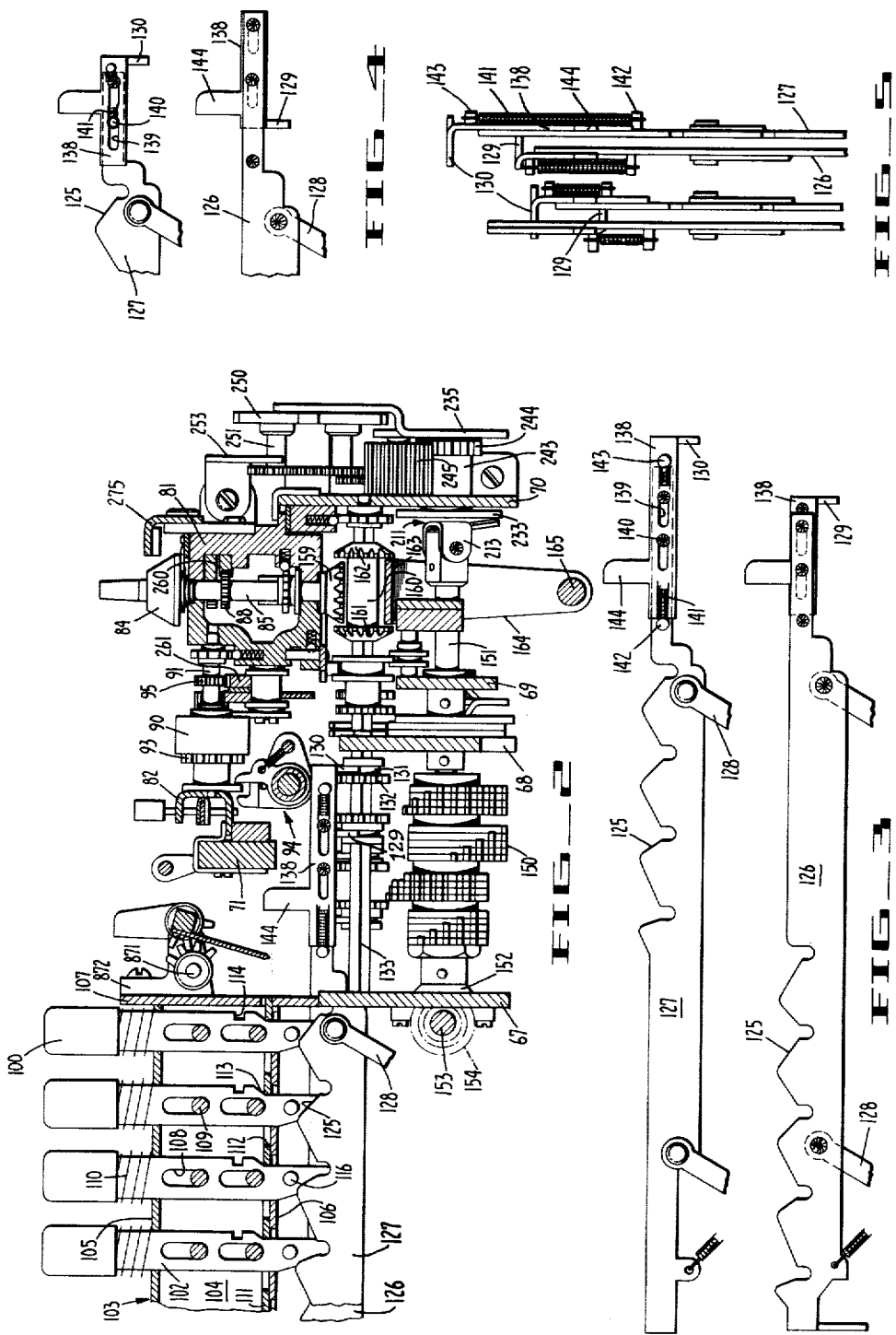

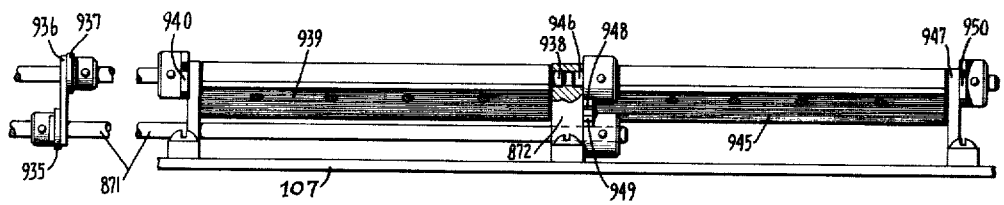
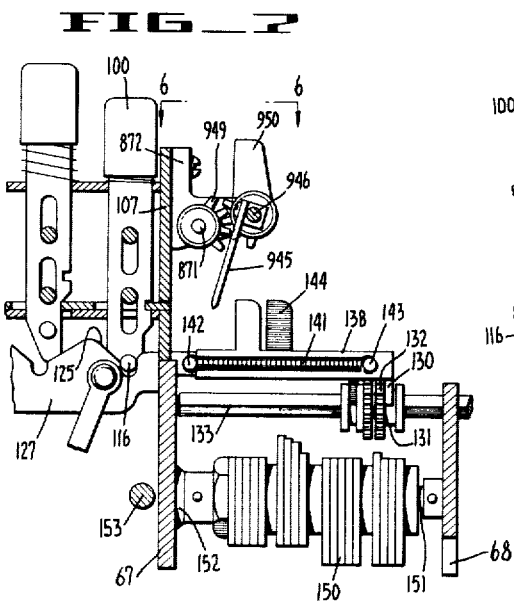
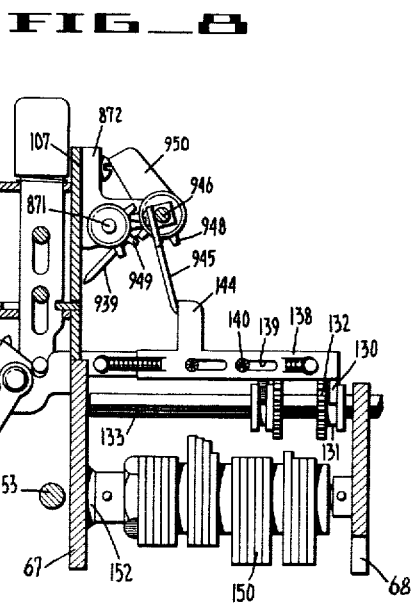
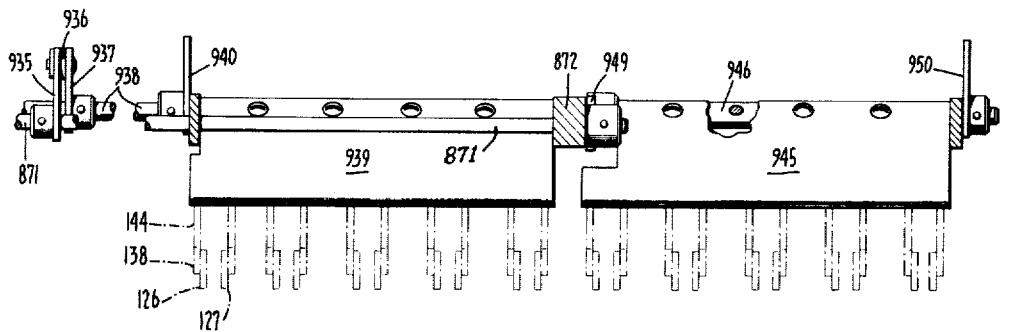

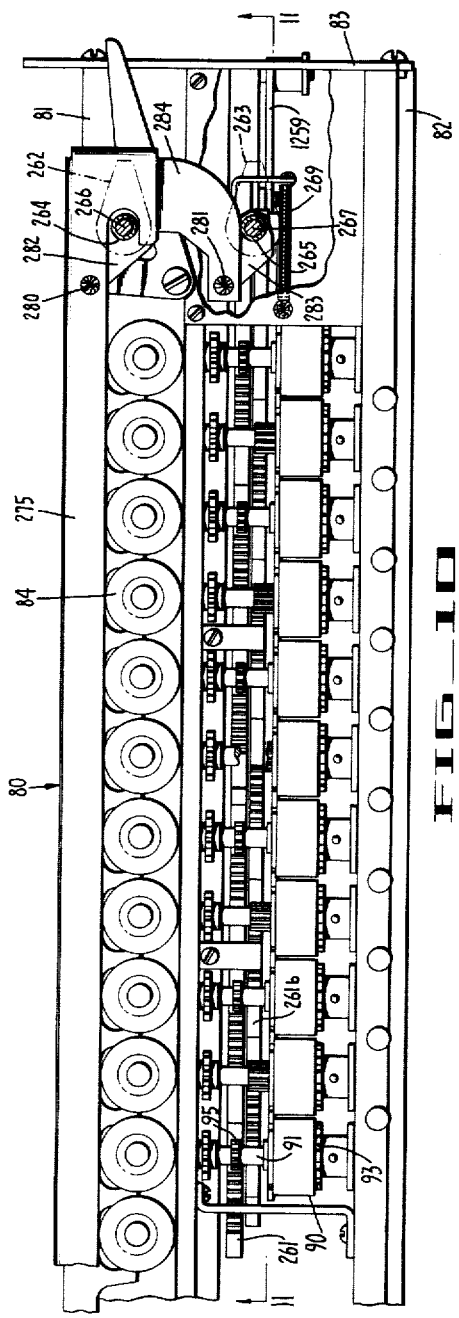

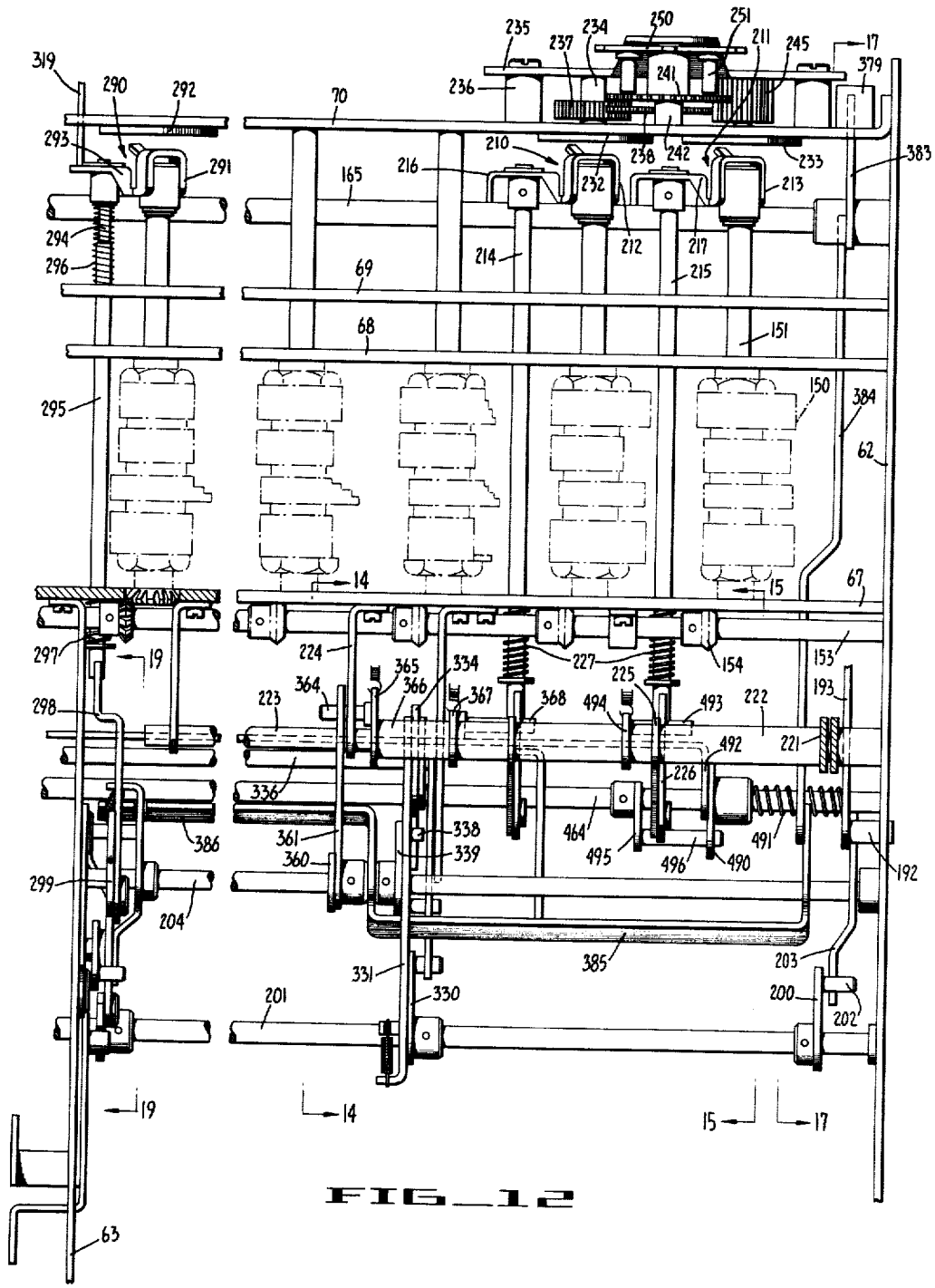
FIG_12

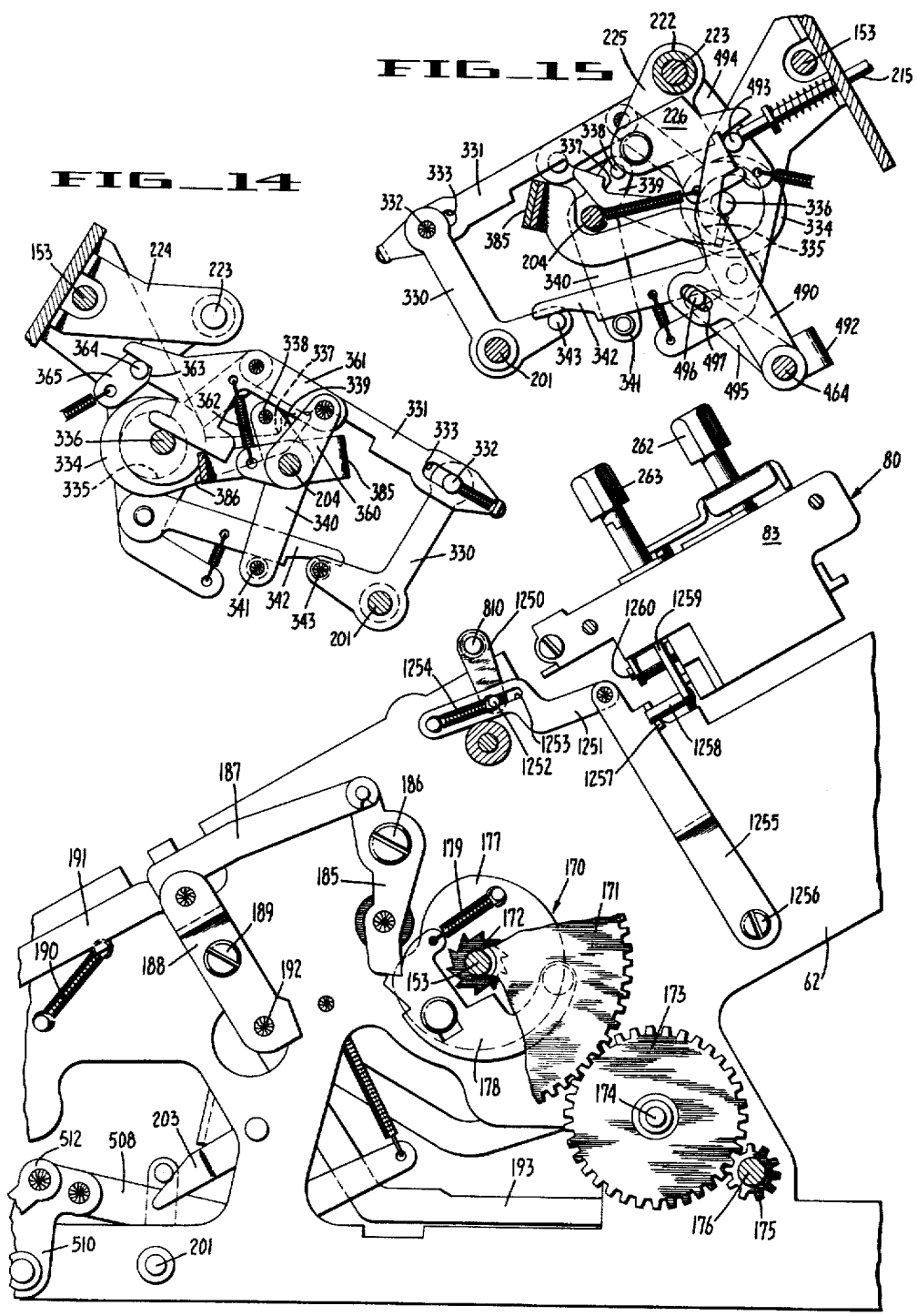

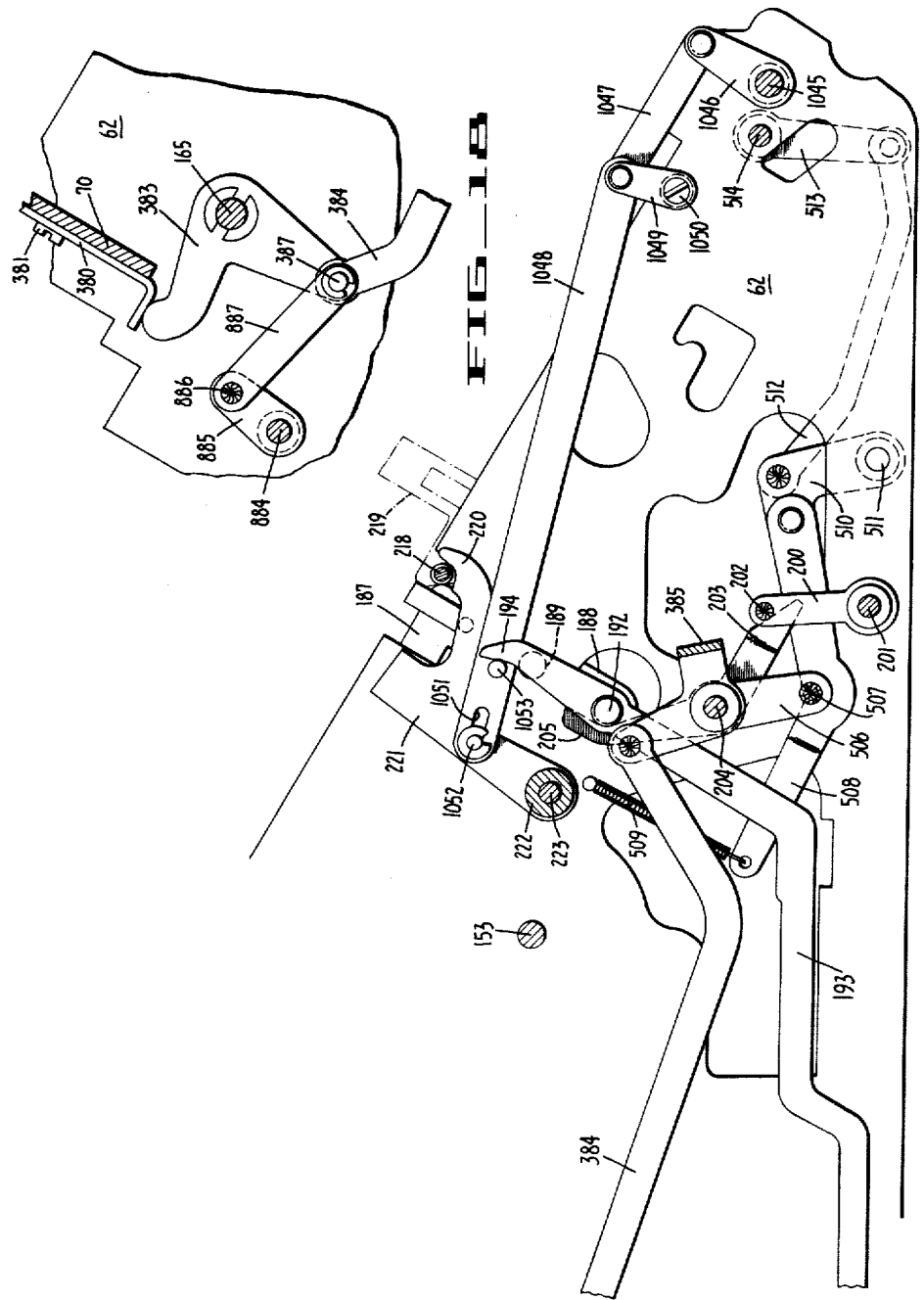

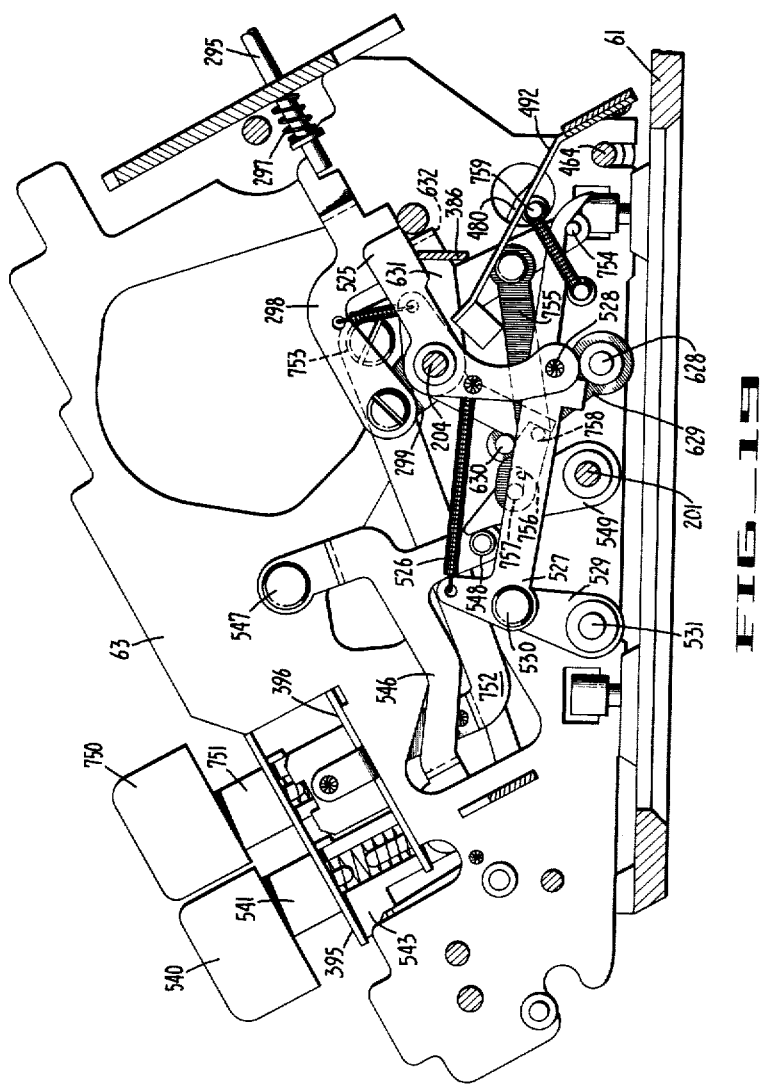

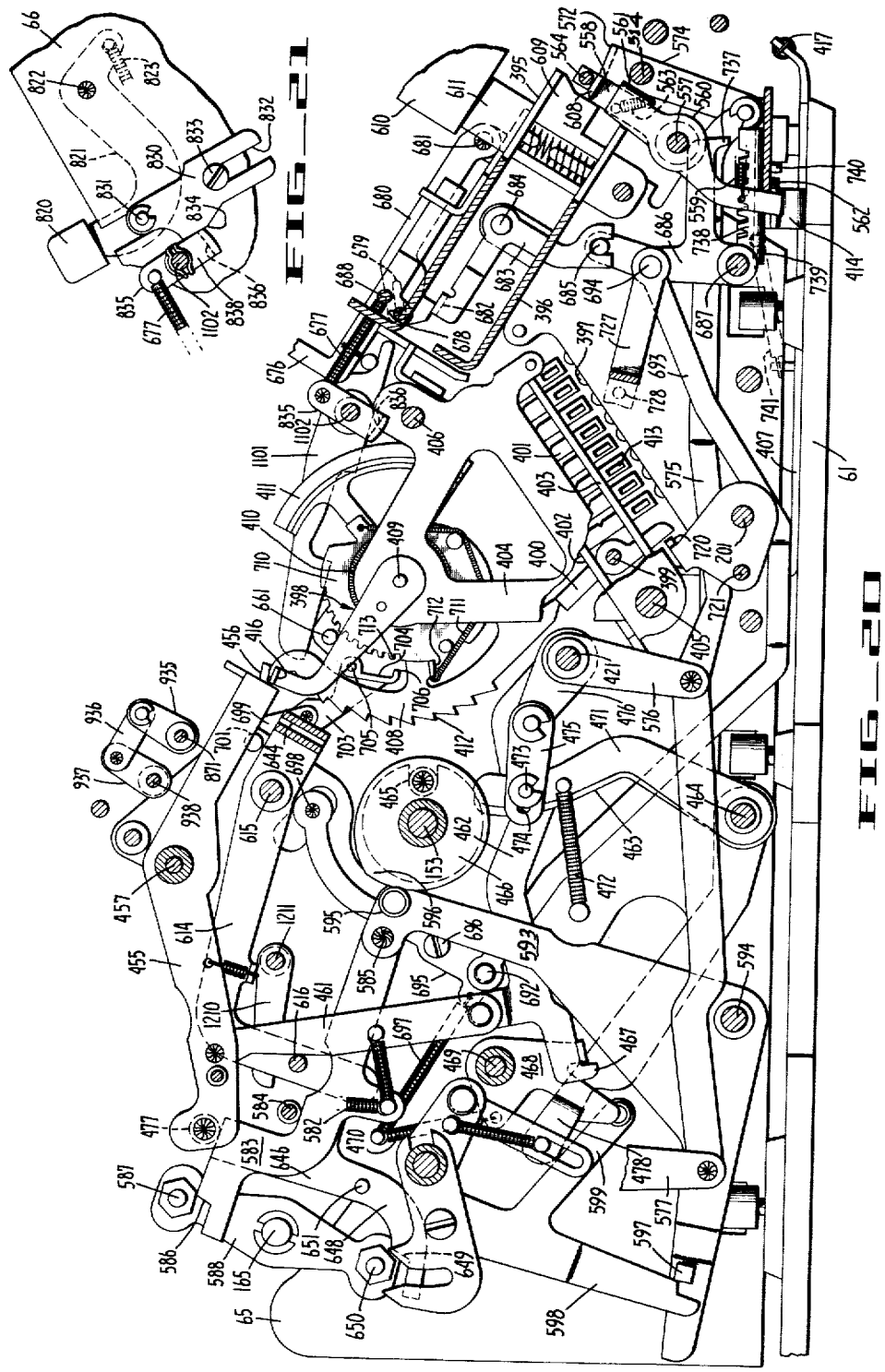

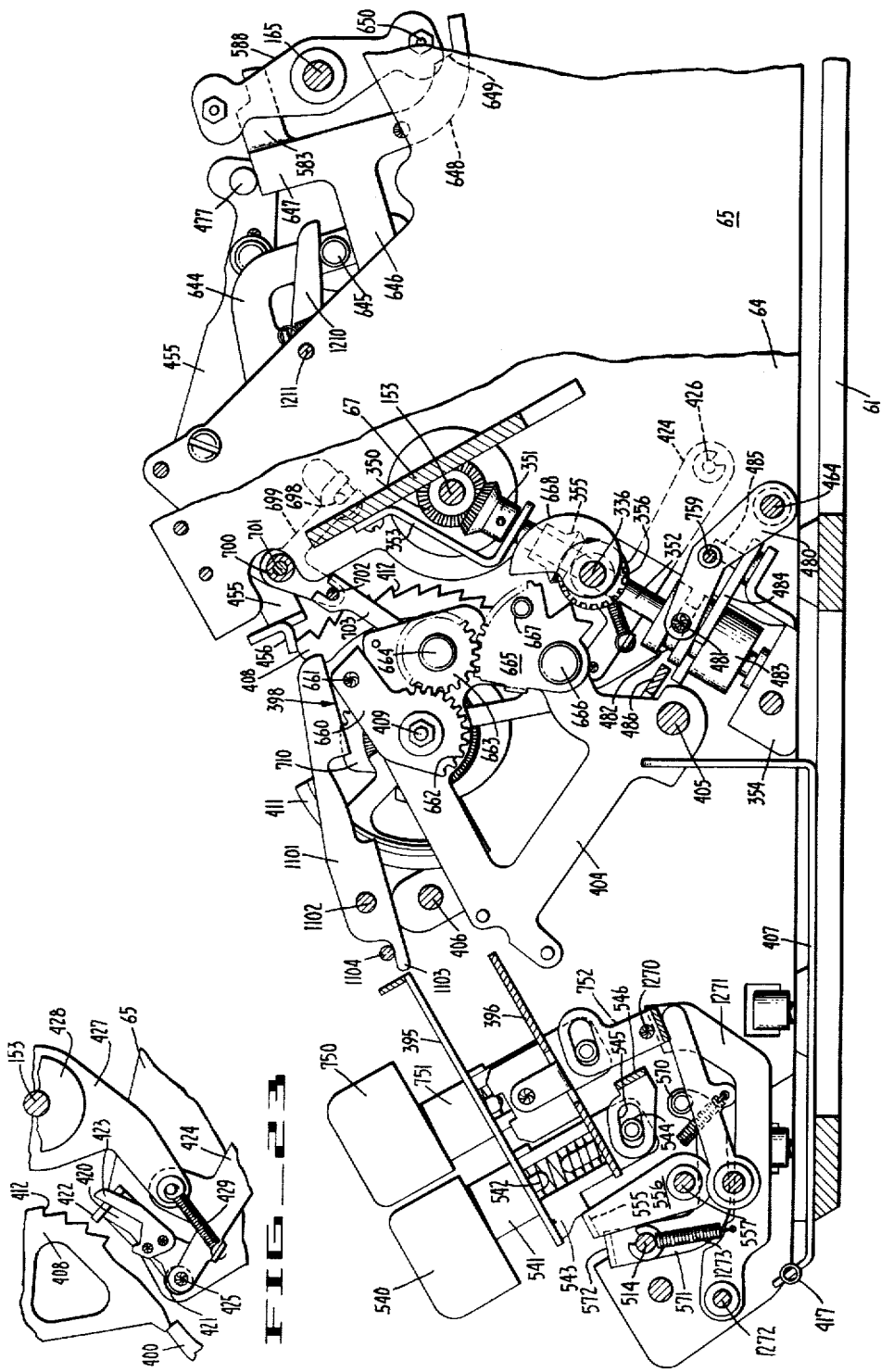

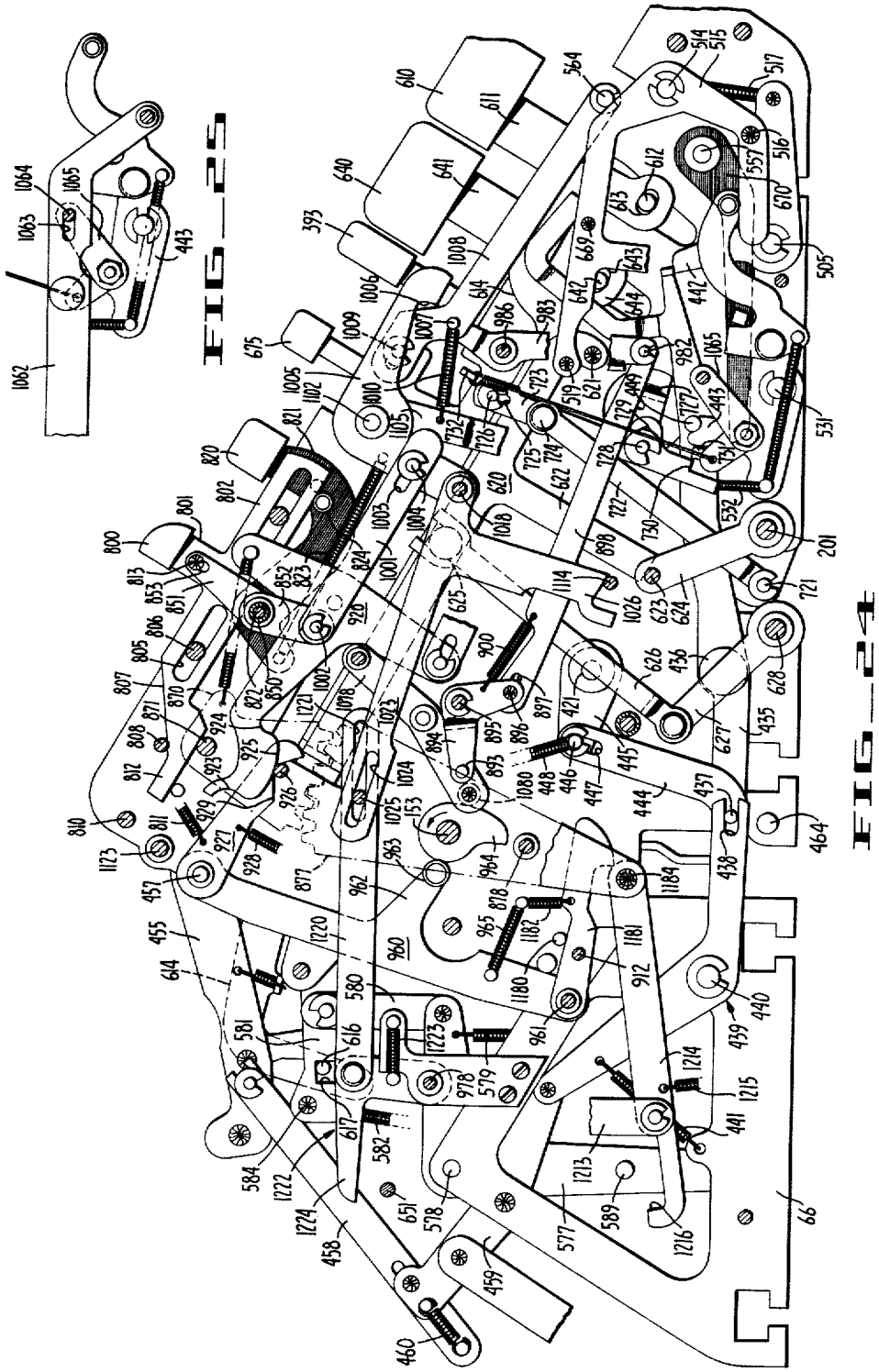

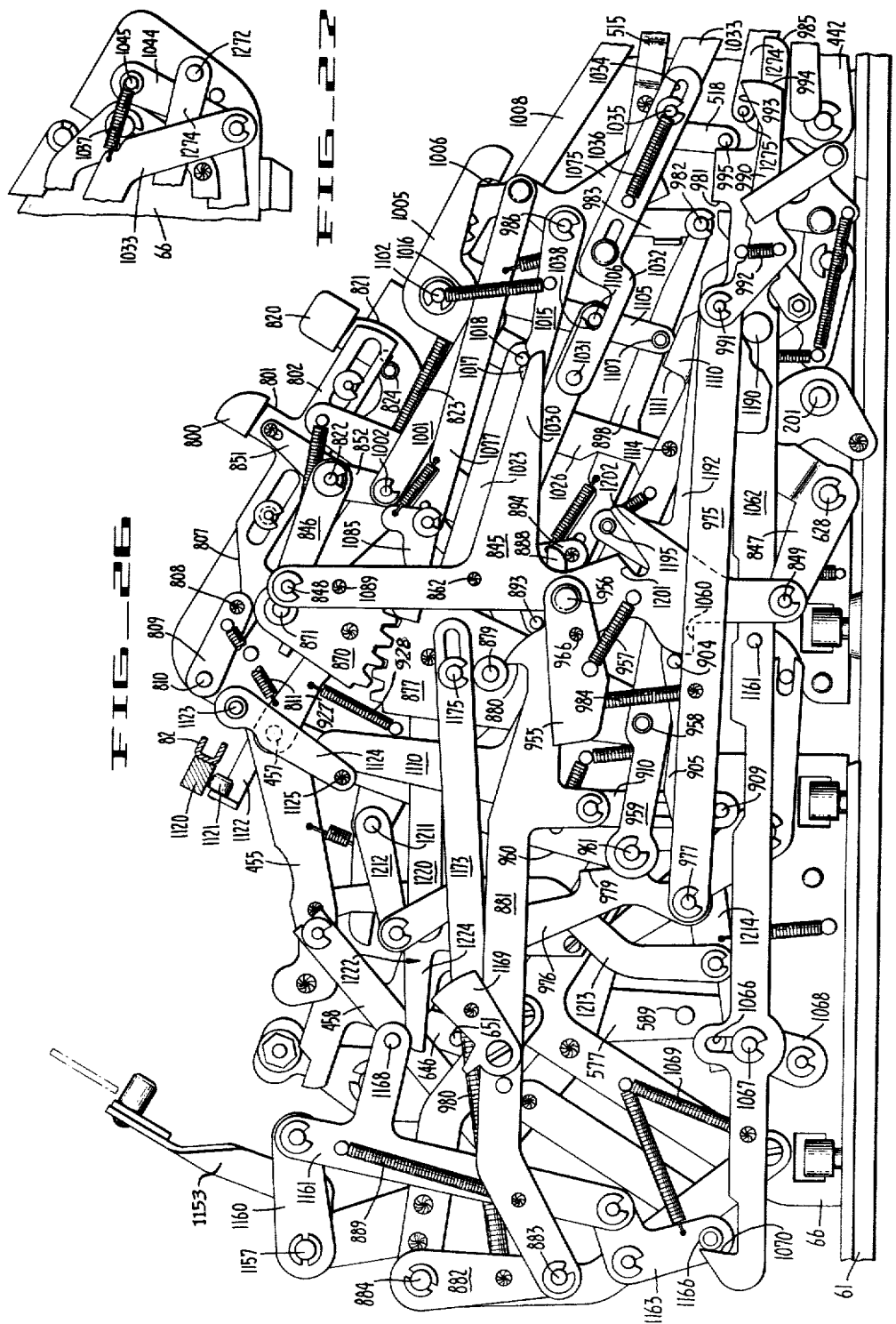

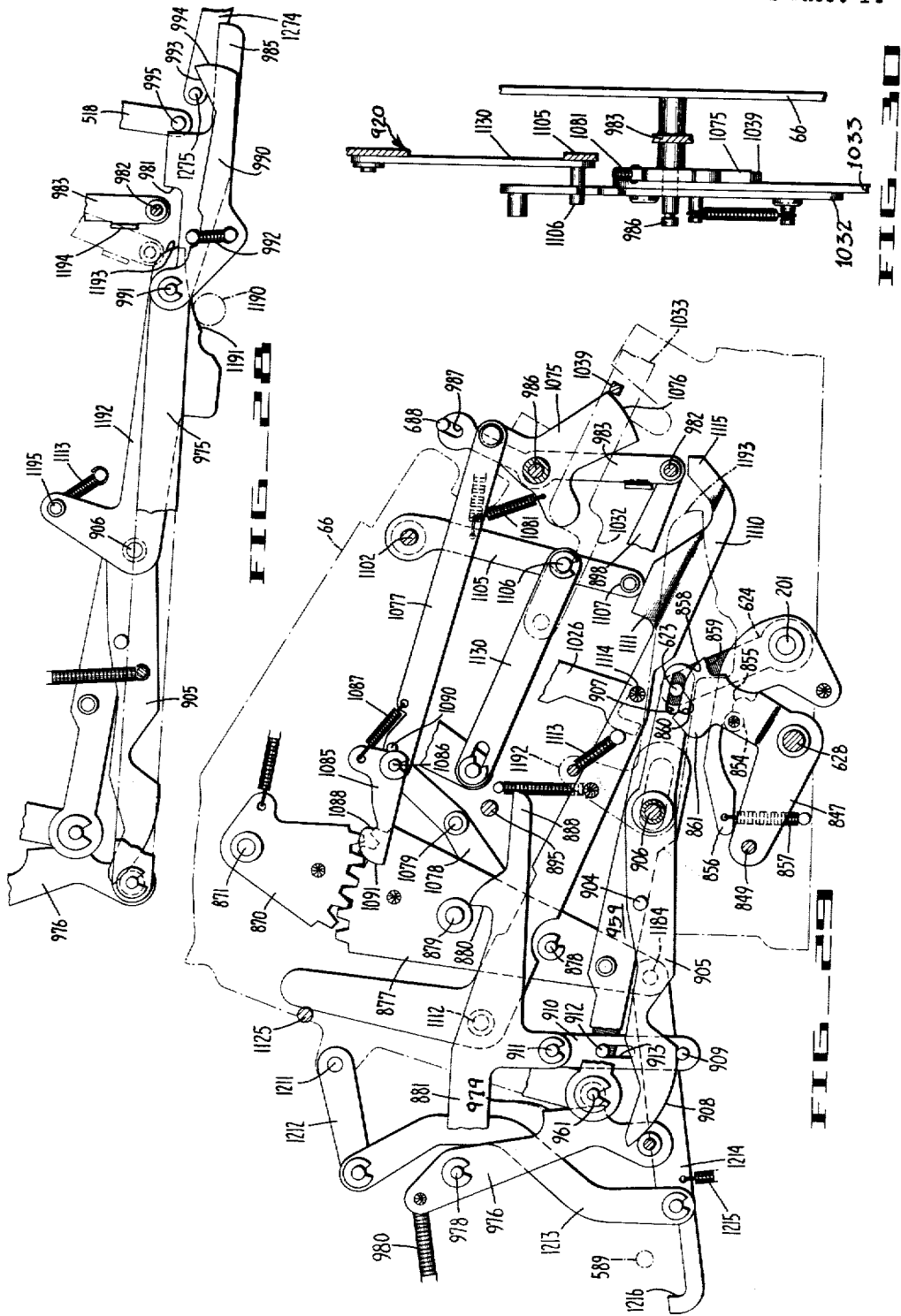

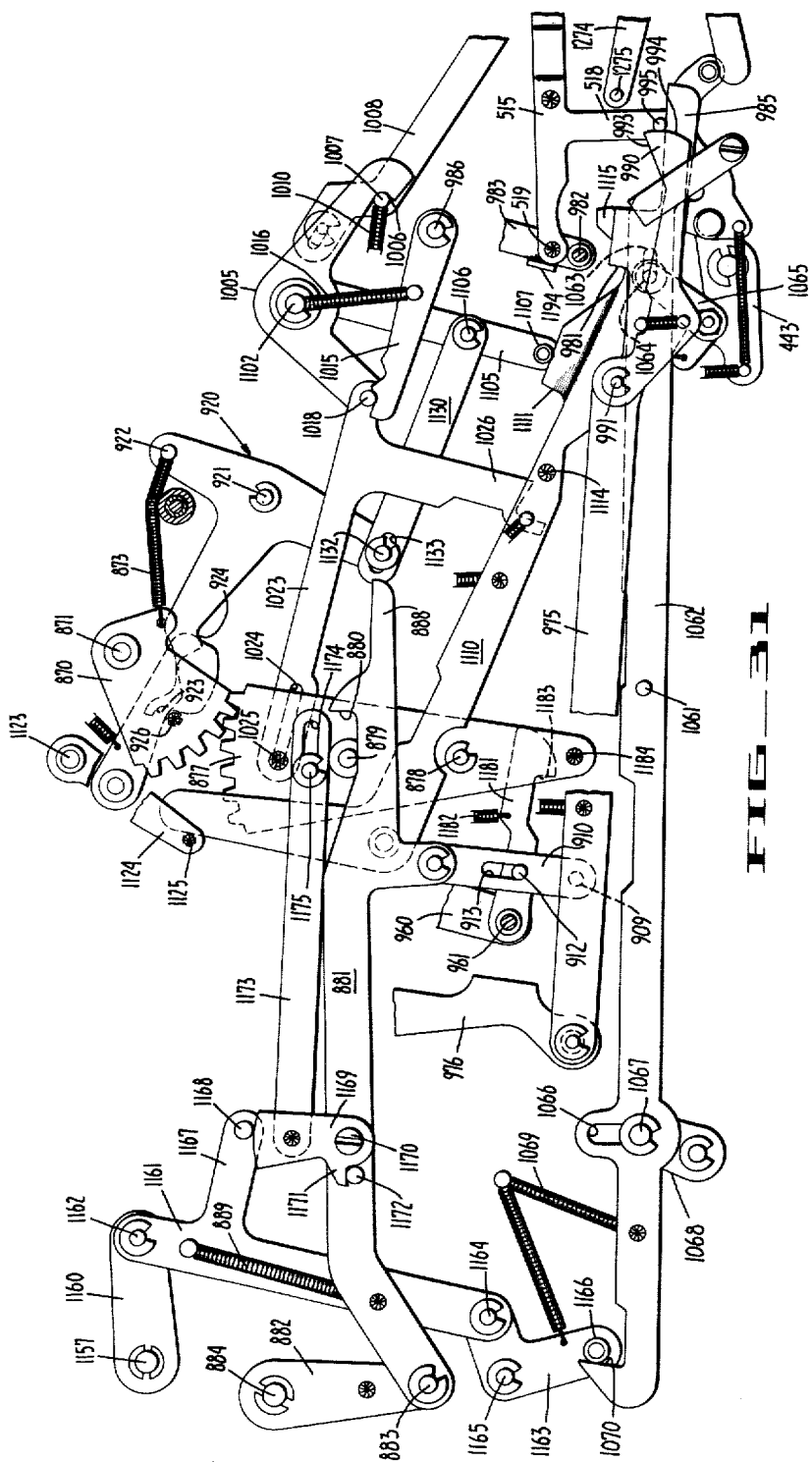

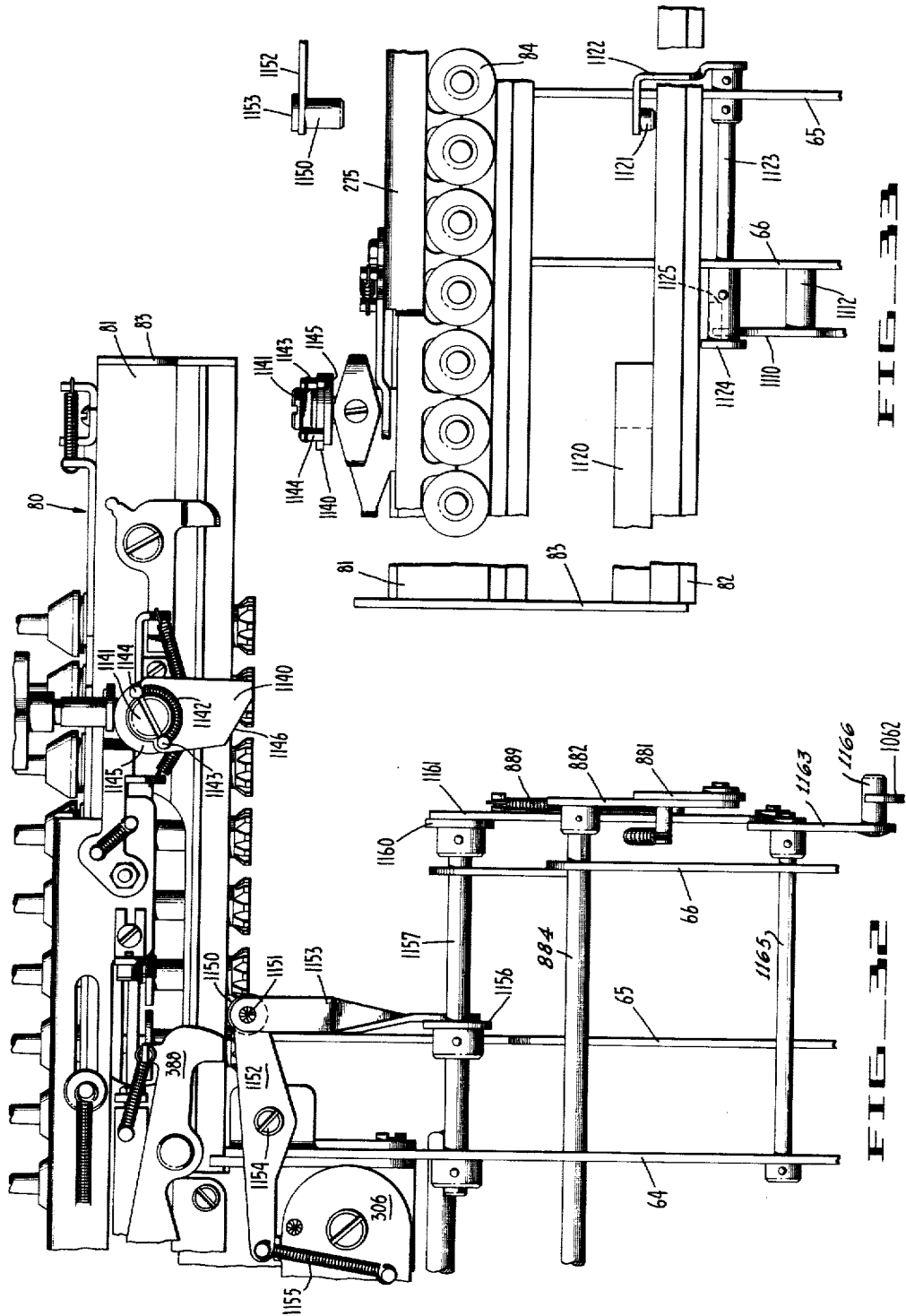

3,110,441
CALCULATING MACHINE
Grant C. Ellerbeck, San Leandro, Calif., assignor to Friden, Inc., a corporation of California
Filed Jan. 2, 1962, Ser. No. 163,644
20 Claims. (Cl. 235—63)

TABLE OF CONTENTS

| | Column |
|---|---|
| I. Prior Art Calculating Mechanism | 4 |
|   A. Machine Frame | 5 |
|   B. Register Carriage | 6 |
|   C. Selection Mechanism | 7 |
|   D. Drive and Clutch | 9 |
|   E. Carriage Shifting Mechanism | 10 |
|   F. Carriage Clearing Mechanism | 12 |
|   G. Automatic Clearing and Shifting Mechanism | 14 |
|   H. Shift and Clear Terminating Mechanism | 16 |
|   I. Multiplication Mechanism | 17 |
|     (1) Multiplier Keyboard | 17 |
|     (2) Multiplier Operation | 18 |
|     (3) Multiplication Control Keys | 22 |
|       (a) Multiply Key | 22 |
|       (b) Accumulate Multiply Key | 24 |
|       (c) Subtractive Multiply Key | 25 |
|     (4) Multiplication Restore | 26 |
|   J. Repeat Multiplication Mechanism | 28 |
|     (1) Repeat Key | 28 |
|     (2) Resetting Multiplier Segments | 28 |
|     (3) Carriage Escapement Control | 30 |
|   K. Multiplier Clearing Mechanism | 30 |
| II. Split-Multiplication Mechanism | 31 |
|   A. Conditioning Key | 32 |
|     (1) Limit Multiplier Entries | 33 |
|   B. Master Control Member | 33 |
|     (1) Enable Operation of the Selection Disabling Mechanism | 34 |
|     (2) Disable Restoration of Multiply Key at End of First Phase of Split-Multiplication | 38 |
|     (3) Condition Means for Operating the Repeat Mechanism | 39 |
|     (4) Condition Right Shift Mechanism for Operation at End of First Phase of Split Operation | 42 |
|     (5) Condition Mechanism Effective to Re-Operate the Multiplier Control Latch 443 to Start the Second Phase of Operation | 44 |
|   C. First Phase of Operation | 45 |
|   D. Second Phase of Operation | 48 |
| III. Constant Multiplication | 53 |
| IV. Subtractive Multiplication | 53 |
| V. Split Clearing of the Counter Register | 55 |

This invention relates to calculating machines, and particularly to a calculating machine of increased capacity for performing what might be called "split-multiplication" work.

It is a primary object of the present invention to provide an improved multiplying mechanism for a calculating machine.

Another important object of the invention is to provide a selectively operable split-multiplier mechanism of increased capacity.

It is a further object of the present invention to provide a mechanism whereby the capacity of the conventional calculaitng machine can be increased for split-multiplication work. In the preferred form of my invention I am enabled to multiply two five-digit multiplicand factors by a five-digit multiplier factor and still keep the two products separate on two sides of a twenty-digit register.

Another object of the present invention is to provide a simple control mechanism for a programmed operation whereby the program can only become effective when a predetermined operation has been performed. A specific illustration of this control, in the present instance, is the simple control by means of which the second of the split multiplication operations can only be initiated following a multiplication of the first, or right-hand, multiplicand factor and only after the first multiplication has been completed.

Most of the calculating machines on the market at the present time have a maximum capacity of ten orders for a multiplicand factor, ten orders for the multiplier factor and a register of twenty or twenty-one orders. This enables an operator to multiply one ten-digit factor by another ten-digit factor, and in most cases this is sufficient for straight multiplication work. However, there are a number of problems in which it is desired to multiply two smaller factors by a single value. One example of such a situation is in inventory work, for it is often desired to simultaneously compute the purchase price and the selling price, and to keep these two values in parallel columns. Suppose that in such a problem the cost of the item was $3.56 and it sold for $9.98, and there were 587 items in stock. In this case the $3.56 is put in the three right-hand orders of the machine keyboard to represent cost and the $9.98 is placed in the extreme left-hand keyboard orders to represent selling price, and both factors are multiplied simultaneously by 587. This gives two separate answers: in the first to sixth orders we have the total cost of $2,089.72, and in the eighth to thirteenth orders we have the value for sales purposes of $5,858.26. These two values are separated by a single "0" in the seventh order, which often is covered by a shutter or decimal marker to keep the two factors separate. It is obvious that in such a problem it is only possible to keep the two products separate when all of the factors are limited to three digits each. If more digits are involved in any factor, it is necessary to perform each operation singly, which takes approximately twice the time.

Another illustration of split-multiplication work is in invoicing, in which it is desired to simultaneously secure both the price of an item (price multiplied by quantity) as a single value, and simultaneously to accumulate that value with others for a total price. For example, again assuming a price of $9.98 and a quantity of 587: the two factors of $9.98 are put in the three right-hand orders of the keyboard and also in the three left-hand orders, and both are multiplified in a single operation by 587. This operation gives the total price of $5,858.26 in the first to sixth orders and also in the eighth to thirteenth orders. Then by a "split-clear" operation, the right-hand orders of the register are cleared but not those to the left thereof, so that the right side of the register is available for a new product. Thereafter the value of another item can be secured, the value standing as an identifiable item in the right-hand orders, and the total value being added to the values previously in the left-hand orders. Again this type of work has been limited to three digits multiplied by three digits.

Perhaps it should be mentioned at the outset that the mechanism of the present invention is primarily designed for incorporation in the well-known "Friden" calculating machine, as my invention, in its preferred embodiment, will be incorporated in such a machine. It is well-known among those acquainted with calculating machines that this calculator has a main keyboard of ten orders in which a multiplicand factor can be set, a ten-key multiplier keyboard in which any ten-digit multiplier factor can be set, and a twenty-order accumulator, or product register. In such a machine I provide means selectively operable to condition the machine for multiplication as it has heretofore been accomplished, or selectively to provide for "split multiplication" in which two five-digit multiplicand factors can be set in the two sides of the main keyboard and a five-digit multiplier factor can be set in the multiplier keyboard. Then, upon operation of any of the conventional multiplier control keys, the mechanism of my invention disables the selection mechanism for the left-hand side of the main keyboard (i.e., the second multiplicand factor) and automatically sets the multiplier mechanism for a single repeat operation. By this means the multiplicand factor set in the lower five orders of the main keyboard (i.e., the "first factor") is multiplied by the five-digit multiplier factor in the multiplier mechanism, and, as the selection mechanism for the left-hand five orders of the main keyboard (i.e., the "second factor") is disabled, the second factor has no effect upon the registration of the product in the register. When the first multiplication is completed the machine is held in a right shift to the sixth ordinal register position, the left-hand side of the keyboard is enabled and the right-hand side of the keyboard is disabled, whereupon the multiplier repeat mechanism is effective to restore the original multiplier factor, and the machine automatically embarks upon a second multiplying operation in which the second factor is multiplied by the same value as the first operation while the first factor can have no effect upon the registration. In this case, the lowest order of the second product is registered in the eleventh order of the register, so that there can be no mixing of the two products in the machine. It is immaterial in my invention whether the factors on the right and left sides of the keyboard are identical or are different, so that the mechanism of this invention can be used either for the accumulation of totals, as in invoicing (in which case the register is split between the tenth and eleventh orders rather than at the seventh as in former practice), or for figuring two distinct products, as in inventory work above-mentioned. It can be noted at this point that the split multiplication of the present invention enables (in the conventional machine) the accumulation of two ten-digit products, each the result of the multiplication of a five-digit multiplicand by a five-digit multiplier, and that the two products are kept separate and distinct. This permits a hundredfold increase in the size of the multiplicand and the multiplier in split-multiplying work, with a consequent ten-thousand-fold increase in the products which may be registered thereby.

These and other objects of the invention will be apparent from the following specification and claims, both of which will more easily understood by a consideration of the drawings in which:

FIG. 1 is a plan view of the preferred embodiment of the machine of my invention.

FIG. 2 is a partial cross-sectional view of the selection, actuating, and registering mechanism of the present invention, such as a view looking toward the left from a plan lying immediately to the right of the extreme right-hand order of the keyboard.

FIG. 3 is a right side view of the pair of selection bars for the right-hand, or units, order of the machine.

FIG. 4 is a partial right side view of the pair of selection bars for the second, or tens, order of the machine.

FIG. 5 is a partial plan view of the rear ends of the selection bars shown in FIGS. 3 and 4.

FIG. 6 is a plan view of the blocking bails of the present invention, such as taken along the horizontal plane indicated by the line 6—6 of FIG. 7.

FIG. 7 is a partial right side view of the units order selection bars showing the registration of a value of "9" and the blocking mechanism of the present invention disabled.

FIG. 8 is a view similar to FIG. 7, showing a selection of "9" in a keyboard but with the right-hand blocking bail operated to disable such a value setting and to hold the selection gears at a value of "0."

FIG. 9 is a front view of the blocking bails and, in effect, is a front view of the mechanism shown in FIG. 6.

FIG. 10 is a plan view of the register of the present invention.

FIG. 11 is a sectional front view of the register of FIG. 10, such as taken along the plane indicated by the line 11—11 of FIG. 10, and showing particularly the means for "split-clearing" of the counter register.

FIG. 12 is a sectional plan view of the machine here illustrated, being taken on a plane parallel to the keyboard but below it, primarily to show the shifting and clearing control mechanisms.

FIG. 14 is a left side view of what is known as the "light key-touch" mechanism which automatically controls shifting and clearing as a preliminary program in multiplication operations, such as taken along the plane indicated by the line 14—14 of FIG. 12.

FIG. 15 is a right side view of the mechanism of FIG. 14, and, in addition, shows means for controlling a right shift of the register during a multiplication operation, such as a view taken along the plane indicated by the line 15—15 of FIG. 12.

FIG. 16 is a partial right side view of the machine, showing particularly the drive means, the clutch, and means for controlling the operation of the clutch.

FIG. 17 is a partial left side view of the right side frame plate, such as taken along the plane indicated by the line 17—17 of FIG. 12, and shows particularly the means for controlling a right shift of the register at the end of the first multiplication operation in order to shift the register to the position predetermined for the beginning of the second multiplication operation.

FIG. 18 is the rearward or left-hand extension of FIG. 17, and shows particularly the means for initiating operation of multiplication from the operation of the "override" mechanism.

FIG. 19 is a right side view of the intermediate frame plate showing particularly means for controlling a multiplication operation, and is taken along a plane substantially as indicated by the line 19—19 of FIG. 12.

FIG. 20 is a sectional left side view taken through the multiplication mechanism.

FIG. 21 is a right side view of the conditioning key of the present invention.

FIG. 22 is a right side view of the multiplying mechanism, taken on a plane to the left of the left side of the intermediate frame plate, or slightly to the left of the plane of FIG. 19.

FIG. 23 is a detail of the multiplier feed pawl.

FIG. 24 is a left side view of the machine of the present invention, with many of the new parts removed so as to show conventional multiplying control mechanisms of the machine used to exemplify the present invention.

FIG. 25 is a detail of a control mechanism shown partly in FIG. 24 and including some parts lying immediately to the left thereof.

FIG. 26 is a left side view of the machine of the present invention, showing the control means of my invention superimposed over the conventional control means shown in FIG. 24.

FIG. 27 is the forward, or right-hand, extension of FIG. 26.

FIG. 28 is an enlarged detail of the repeat multiplication linkage.

FIG. 29 is a detail of the setting means for the blocking gate as well as a detail of a control means for use in the split-multiplication of the present invention.

FIG. 30 is a plan view of a portion of the mechanism shown in FIG. 29.

FIG. 31 is a detail showing the means for setting the blocking gates (which are shown in FIGS. 26 and 29 in its normal position), showing this setting means in the operative position for the first phase of the split-multiplication operation.

FIG. 32 is a partial rear view of the left-hand end of the register, showing particularly means for controlling the second phase of a split-multiplication operation.

FIG. 33 is a plan view of the left end of the register showing particularly the arrangements of the mechanisms which control the second phase of the split-multiplication operation.

I. PRIOR ART CALCULATING MECHANISM

Figure 13:
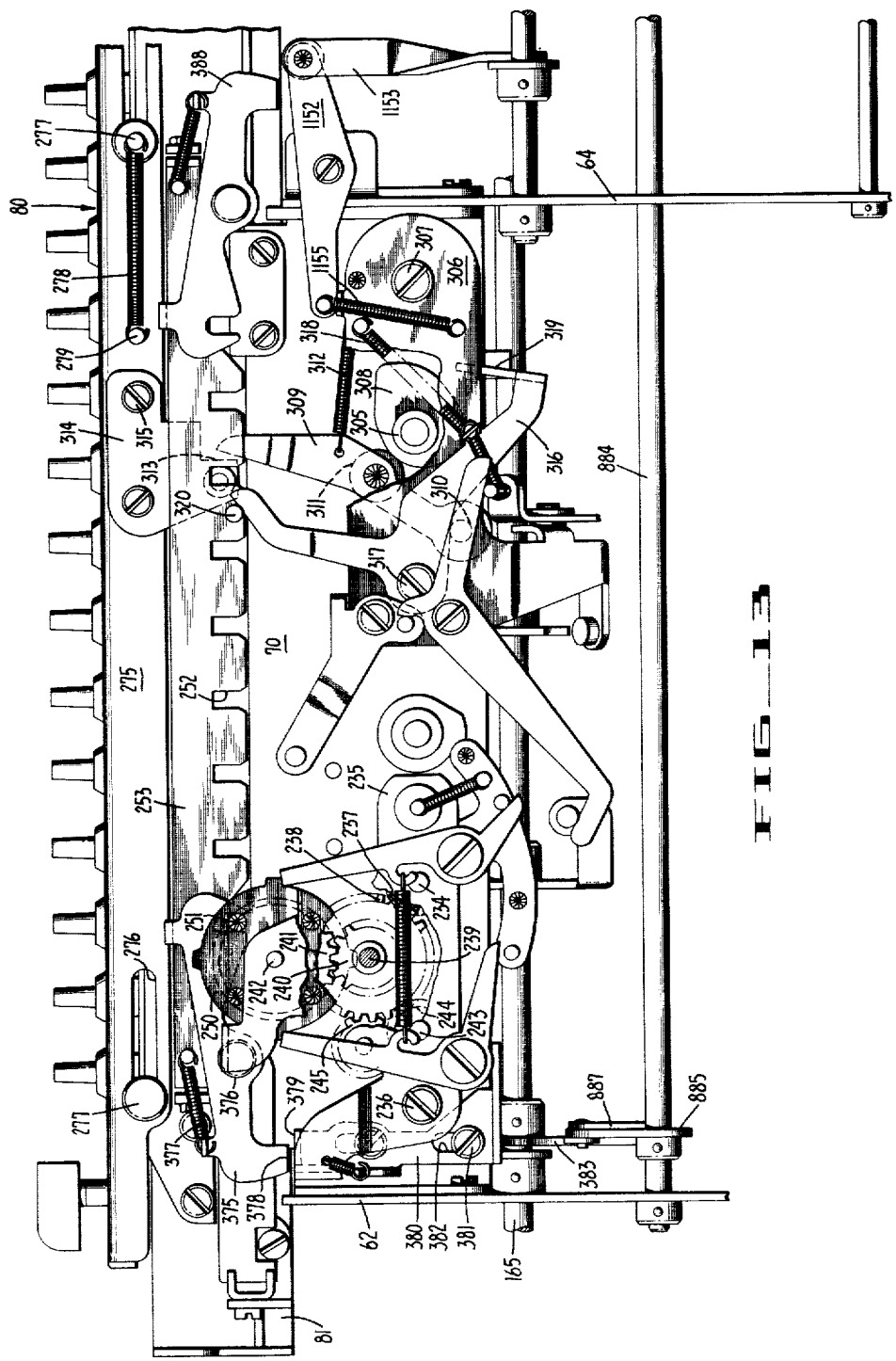
FIG. 13 is a rear view of the machine here illustrated.

The present invention is shown, for purposes of exemplification, as applied to the present "Friden" automatic calculating machine which is constructed in accordance with the patent to Carl M. Friden, No. 2,229,889, of January 28, 1941, as modified by a multiplying mechanism described in the two patents to Carl M. Friden, No. 2,371,752, of March 20, 1945, and No. 2,399,917, of May 7, 1946. Some of the other features of the "Friden" automatic calculating machines which are desirable in connection with the present invention are covered by other patents which will be mentioned briefly when appropriate.

In view of the fact that many of the mechanisms involved in the present split-multiply operation of my invention are well-known parts of the present "Friden" machine, it is deemed sufficient to do little more than mention them briefly, and I shall omit entirely those mechanisms that are not pertinent to a split-multiplying operation such as I propose.

It perhaps should be mentioned that the present invention, in its preferred form, is an addition to the multiplying mechanism of the present "Friden" machine rather than a substitution therefor. It was indicated in the objects of this invention that I propose a mechanism by means of which I can multiply two five-digit multiplicands by a five-digit multiplier without intermixing, or scrambling, the products in a 20-order register. This is accomplished by setting the two multiplicand factors, respectively, in the right-hand five orders and left-hand five orders of the main keyboard, and the multiplier factor in the multiplier keyboard. Then, upon depression of one of the known multiplication initiating keys, I initiate the usual multiplication operation, during the preliminary cycles of which the selection mechanism for the left-hand five orders of the keyboard is disabled, so that I secure a multiplication of the factor standing in the right-hand side of the keyboard by the multiplier standing in the multiplier keyboard, the product being placed in the lower ten orders of the register. Then, at the completion of the first multiplication, mechanism is brought into operation to shift the carriage to the sixth ordinal position and to initiate the second phase operation. In the second phase operation the five right-hand orders of the keyboard are disabled, so that multiplication proceeds with the left-hand five orders standing as a multiplicand and the product is accumulated in the eleventh to twentieth orders.

In one of the preliminary cycles of the operation, mechanism is operated to set the multiplier mechanism on repeat, so that the multiplier factor will be retained at the end of the first operation and will be set into the multiplier unit. This mechanism is normally disabled during the second phase of the split-multiplication, so that when both products have been accumulated the machine is clear and ready for another operation.

The machine of the present invention is adapted to work from the present multiplier initiating keys, including subtractive multiplication. Normally subtractive, or negative, multiplication is used only when it is desired to subtract one product from another. It will be understood that in subtractive multiplication tens complement of the product is secured, so that normally an operator will not desire this factor standing alone but will use it only in subtracting it from a value previously in the accumulator register. In most instances, in split-multiplication work, it will be desirable to show a product as a positive figure, so that in this instance I modify the controls in order that the first phase of operation will be positive in character and the second phase negative, whereby the product value will be subtracted from the left-hand side of the keyboard and not from the right. This envisages the use of this machine in the accumulation of grand totals in which individual products are accumulated in the right side of the register and grand totals in the left.

A. *Machine Frame*

It is well-known in the art that such machines are generally divided into a main body, or frame, portion 60 and a shiftable carriage 80 (FIG. 1). The main body portion customarily is supported upon a framework which comprises a base plate 61 (FIG. 19), upon which are rigidly mounted a number of supporting, or frame, plates including a right frame plate 62 (FIG. 12), an intermediate frame plate 63 (FIGS. 12 and 19), a left frame plate 64 (FIGS. 13 and 22), an auxiliary frame plate 65 (FIGS. 22 and 32) lying to the left, or outside, of the left frame plate 64, and a left side control plate 66 (FIGS. 24 and 32). A number of cross-members, or crossbars, 67, 68, 69 and 70 (FIGS. 2 and 12) rigidly brace the left and right side frames 62 and 64, respectively, and also serve as bearing plates for the actuator mechanism. A carriage rail 71 also braces the frame members, and likewise serves as a rail for supporting the front edge of the carriage. The various operating mechanisms, such as the motor and drive, the actuating mechanism, the keyboard, the selection mechanism, the controls for the positive or negative operation of the accumulator register, the shifting mechanism, the clearing mechanism, and the multiplier mechanism, are mounted upon the frame so formed. All of the above-mentioned mechanisms, with the exception of the tops of the value and the control keys, are enclosed within a cover 72 (FIG. 1), the keys protruding upwardly through suitable apertures in the cover plate.

B. *Register Carriage*

Calculating machines adapted to perform division and mutiplication operations usually are provided with a shiftable register carriage 80 (FIG. 1), which is shiftable longitudinally (laterally across the machine). In the machine with which my invention is preferably associated, the carriage is primarily constructed upon a main hollow frame bar 81 (FIG. 2) and a channel 82 which are held in spaced parallel relationship by suitable end plates 83 (FIGS. 10 and 11). The accumulator, or product register, normally comprises twenty ordinally arranged dials 84 (FIGS. 1 and 2) which are mounted upon vertical shafts 85 journalled in the frame bar 81, the dials being visible through windows 86 in the carriage cover 87. The several dial shafts 85 are rotated to enter a valve into the register dial by means of a gear 159 mounted on the lower end thereof.

It is customary to provide a counter register in the shiftable carriage—this counter register in the preferred machine comprising eleven counter dials 90 (FIGS. 1 and 2) which are mounted upon longitudinal shafts 91 journalled in the carriage frame bar 81 and channel 82. The several dials 90 are visible through their respective windows 92 in the carriage cover (FIG. 1). The counter dials are separately driven by their respective counter gears 93, which preferably are formed as an integral part of the counter dial 90. The counter dials are utilized to count the cycles of operation of the machine and thereby register a quotient in division operations, or show the multiplier value at the end of a multiplication operation.

The counter dial 90 aligned with the lowest, or units, order of the keyboard is operated by a counter actuator 94, preferably of the type shown in the patent to Friden, No. 2,229,889. This actuator is adapted to engage the gear 93 affixed to the counter dial aligned with the units order of the keyboard, and to impart to the gear, dial, and shaft assemby an angular movement equivalent to a value of "1" with each cycle of machine operation. The construction and operation of the counter actuator and the counter register are of no particular importance in the present invention and will, therefore, not be described, reference being made to the Friden Patent No. 2,229,889 for a full disclosure of this mechanism.

It should be mentioned that the counter actuator normally operates in the same sign character as the accumulator register. It is customary to provide, at least in the machine with which my invention is preferably associated, a means for setting the counter actuator for registration in the opposite sign character. This mechanism is not important to the present invention and hence will not be described. Although the mechanism of my invention provides means for a subtractive, or complemental, multiplication, it is customary, and in this instance entirely satisfactory, to always operate the counter actuator in the same sign character direction as the accumulator register.

It will be understood that both the accumulator dials 84 and the counter dials 90 are provided with suitable tens-transfer mechanism operative to effect a necessary tens-transfer between the various orders as required. The tens-transfer mechanism shown in FIG. 2 are those normally found in the machines manufactured under the Friden patents above mentioned, and are fully shown and described in the patent to Friden, No. 2,229,889.

C. Selection Mechanism

Values are entered into the machine by means of a keyboard which, in its preferred embodiment, comprises ten orders of value keys 100 (FIGS. 1 and 2), progressively arranged in banks for the values of "1" to "9," inclusive, as shown in FIG. 1. Aligned with each order of value keys 100 is a single "0," or ordinal clear, key 101. A number of operation control keys are arranged to the right of the main keyboard, such as the customary "plus" and "minus" bars, the right and lefthand shift keys, and the like. Only two of these control keys will directly affect the operation involved in the present invention, and hence it is believed unnecessary to describe any of them except those two—and they can better be described in connection with the mechanisms to which they relate.

The value keys 100 are mounted on the upper ends of identical key stems 102 (FIG. 2) which are slidably mounted in a keyboard frame 103 that includes side pieces 104, top plate 105, bottom plate 106, and rear end plate 107. Preferably, the key stems 102 are provided with a pair of longitudinally extending slots 108, which embrace a pair of tie rods 109 for each bank, the tie rods being suitably mounted in the side plates 104. These keys 100 are individually biased to their raised positions by any resilient means, such as springs 110 seated between the key top 100 and the top plate 105. The key stems 102 project through aligned slots in the top and bottom plates 105 and 106. A key in each order can be latched in a depressed position to control the entry of a value into the machine, upon subsequent cycling of the machine, by a well-known ordinal latch slide 111. Each latching slide is individually biased to a forward position (to the left in FIG. 2) by any resilient means, not shown herein; and each is provided with a series of slots 112 embracing the respective key stem 102. These latching slides cooperate with cam noses 113 formed on the rear edge of each key stem 102, whereby the depression of any key stem cams its latching slide 111 toward the rear (to the right in FIG. 2). When a key has been depressed to its operative position, a notch 114 formed in the rear edge of the key stem immediately above the cam nose 113, will register with the ordinal latching slide, whereupon the latter is snapped into the notch 114 by its spring to hold the key stem latched in its operative position.

A key so latched in its operative position is released by any movement of the latching slide 111 to the rear (to the right in FIG. 2). This movement may occur from the depression of another key in the same order, which obviously will move the latch to a releasing position before the other key reaches a position to which it can be latched down; the operation of the particular ordinal "0" key 101; by the operation of a main keyboard clear key 115 (FIG. 1); or in certain automatic operations not here pertinent.

Each of the key stems 102 is provided with a pin 116 adjacent its lower end, each pin being adapted to engage the associated differentially angled cam face 125 formed in the upper edge of a selection, or "V-notch," bar 126 or 127. In the preferred construction, the selection bars 126 and 127 are mounted in pairs, one pair for each order—the bar 126 serving the "1" to "5" keys and the selection bar 127 serving the "6" to "9" keys. These bars are individually mounted for free longitudinal movement, as by mounting each of them on a pair of parallel arms 128 (see also FIGS. 3 and 4). The rear end of each of the selection bars 126 and 127 is provided with a perpendicularly extending yoke 129 or 130, respectively. These yokes engage an annular slot 131 formed in the hub of a respective selection gear 132. Each pair of selection gears 132 for each order of the keyboard is slidably mounted on a longitudinally extending selection, or square, shaft 133 that is journalled in the crossbars 67, 68 and 70. It is well-known that there is one selection shaft 133 for each order of the keyboard, and it is usual to mount the two selection gears 132 on this single shaft—one of the gears being positioned by the "1" to "5" selection bar 126 and the other by the "6" to "9" bar 127.

Heretofore the selection bars 126 and 127 and their respective yokes 129 and 130 have been made from a common piece of metal. Normally the setting of a key 100 directly sets the gear 132, for the setting of the key was to control the position of the selection gear throughout the following operation. In the present invention the yokes are mounted on a "live tip" carried by the respective bar. A preferred construction of the selection bar and its live yoke is shown particularly in FIGS. 2 to 5 and 7 and 8. Such a construction may comprise a link 138 which is mounted on the rear end of the respective selection bar by any suitable means, such as slots 139 formed in the live tip, or link, embracing pins 140 riveted to the respective selection bar—thereby enabling the link to move longitudinally with respect to its associated selection bar. Normally the live tips are biased to a retracted position by a suitable spring 141 tensioned between studs, such as 142 and 143, riveted to the respective members. Each live tip carries an upstanding ear 144, which is used to control the positioning of the live tip in the split-multiplication operation to be described hereafter. It is customary in the machine with which this invention is preferably associated to use selection links of four different lengths, as the selection gears in one order (usually the odd-numbered orders) are placed toward the rear of their respective square shafts 133 and the selection gears of the alternate orders are placed forwardly on their square shaft 133 to thereby enable a pair of orders to be served by one actuating shaft and thus decrease the width of the machine. In the present invention the live tips are mounted on their associated selection bars behind (to the right of, in FIG. 2) the front bearing plate 67, and all of the ears 144 are aligned transversely of the machine when the selection bars stand at a "0" position. This construction of the selection bars and their live tips is shown particularly in FIGS. 3, 4 and 5.

The selection gears 132, and the square shafts 133 on which they are slidably mounted, are given differential increments of rotation determined by the longitudinal position of one or the other of the selection gears 132 on the shaft 133 by means of the well-known Thomas-type actuator 150 (FIG. 2). These actuators are mutilated drums, having sections of a width corresponding to the incremental movement of the selection bars, i.e., each incremental section has a number of teeth corresponding to the value position of the associated gear 132. Thus, if the selection gear 132 associated with a "1" to "5" selection bar 126 is moved one increment, it will move into the plane of the single tooth section of the coordinal actuator, and the gears and selection shaft will be rotated one increment. On the other hand, if the "9" key 109 of a particular order is depressed, as is shown in FIGS. 7 and 8, its pin 116 engages the "9" cam face 125 and translates the selection bar 127 forwardly four increments, thereby moving its selection gear 132 forward four increments into alignment with the nine-tooth segment of its coordinal actuator 150. The actuator drums 150 are rigidly mounted on actuator shafts 151 extending longitudinally of the machine and journalled in the crossbars, or bearing plates, 67 and 68. The various actuator shafts 151 are driven in unison from a common transverse drive shaft 153 rotatably journalled in the machine—the various actuator shafts 151 being driven by pairs of mitered gears 152 and 154, respectively. Obviously, the differential translation of one or the other of the selection gears 132 along its selection shaft 133, resulting from operation of a pin 116 upon its associated cam face 125, will place the gear in the plane of a number of teeth on the actuator drum corresponding to the value of the depressed key 100. Thereafter, the cycling of the main drive shaft 153 will cause that value to be entered into the selection shaft 133 by an incremental rotation corresponding to the key depressed.

The accumulator dials 84 (FIG. 2) are severally mounted on their respective shafts which are journalled in the carriage frame bar 81. Each shaft 85, and consequently the respective dial 84, is driven by increments of rotation imparted thereto by means of their respective accumulator gears 159. These gears 159 are adapted to be engaged by a digitation control spool 160 that is slidably mounted on the rear end of each of the square selection shafts 133 (between the bearing plates 68 and 70). Each digitation control spool carries a plus, or additive, gear 161 (normally placed toward the front of the machine, or to the left in FIG. 2) and a minus, or subtraction, gear 162. Normally the digitation control spool 160 is in a centralized, or neutral, position shown in FIG. 2, in which neither gear 161 nor 162 engages the accumulator gear 159. However, the spool 160 can be moved forwardly or rearwardly on the square shaft 133, and when so moved, either the additive gear 161 or the subtractive gear 162 will mesh with the accumulator gear 159. Thereupon, the subsequent rotation of the drive shaft will cause an incremental rotation of the accumulator shaft and dial corresponding to the value position of the selection gears 132. Such movement of the digitation control spool 160 is readily secured by means of a well-known gate 163 that is mounted by suitable arms 164 on a digitation control shaft 165. It is well-known that the computation control gate 163 extends transversely of the machine in operative relationship to all of the digitation control spools 160, and that the digitation control shaft 165 can be rocked in either direction by various control means, such as the addition and subtraction control keys. As such controls are not important to the present invention, they will not be described, but the operation of the shaft 165 in multiplication operations will be controlled in multiplication, as will be described in sub-section I (2) hereafter.

D. Drive and Clutch

The machine is preferably driven by an electric motor (not shown) through a conventional clutch 170 (FIG. 16). The driving side of the clutch, in its preferred form, comprises a large gear 171 to which is rigidly secured a ratchet wheel 172, both of which rotate freely on the main drive shaft 153. The gear 171 is preferably driven through an idler 173, rotatably mounted on the right frame plate 62 by any suitable means, such as stub shaft 174, and a pinion 175 that is rigidly mounted on a shaft 176, which can be either the motor shaft or preferably a short shaft connected to the motor through a suitable flexible coupling (not shown). The driven side of the clutch comprises a disk 177, rigidly secured to shaft 153, which disk carries a clutch pawl 178 rotatably mounted thereon. The pawl is urged into engagement with the ratchet wheel 172 through a suitable spring 179, so that whenever the clutch pawl 178 is not restrained from so doing, it will engage the clutch pawl, and thereupon the disk 177 and shaft 153 will rotate with the gear 171 and ratchet wheel 172. Normally the clutch pawl is held out of engagement with ratchet wheel 172 by a clutch dog 185, rotatably mounted on the right frame plate 62 by any suitable means, such as large-headed screw 186. The positioning of the clutch dog 185 is controlled by a clutch control link 187 that is pivotally connected to the clutch dog and also to a parallel lever 188 that is likewise mounted on the right-hand frame plate by any suitable means, such as screw stud 189. This assembly is biased to a clutch-disengaging position by a spring 190, tensioned between a stud on the frame plate and an ear on a second link 191 that is pivotally connected to the link 187 and the lever 188. The spring 190 is thus effective to bias the clutch dog 185 (counter-clockwise in FIG. 16) into engagement with the clutch pawl 178, thereby disengaging the clutch.

At its lower end the lever 188 carries a long pin 192 (FIGS. 16 and 17) which extends through an aperture in the frame plate 62. The forward end of a switch control link 193 is mounted on the inner end of the pin 192, so that rocking of lever 188 to engage the clutch (clockwise in FIG. 16), pulls the link 193 forwardly. The operation of the clutch and the motor are so well-known that it is believed unnecessary to describe them or to refer to their operation, except to mention that they are resiliently held in an inoperative position by the spring 190, but that when either is operated, the other operates synchronously therewith.

It can be noted at this point that the clutch 170 and switch (not shown) can be controlled by means of the normal plus and minus keys operating through link 191 (which operation is not pertinent to the present invention). They are also operated in multiplication by means of an arm 200 (FIG. 17) which is mounted on the right-hand end of a shaft 201, the right end of which is journalled in the right side frame 62. The shaft 201 is rocked (counter-clockwise in FIG. 17) from depression of any of the multiplier control keys, as will hereafter be explained in sub-section I (2) below. A pin 202 on the upper end of lever 200 engages an angled cam face on the forward end of a rocker arm 203 rotatably mounted on a transverse shaft 204. The upwardly extending rear end of the lever 203 is formed with a hook, or shoulder, 205 which engages the long pin 192 connecting the clutch control lever 188 with the switch control link 193. Thus, when the shaft 201 and arm 200 are rocked by the multiplication control keys (counter-clockwise in FIG. 17), the rocker arm 203 is rocked in the opposite direction and the hook 205 pulls the pin 192 forwardly (to the right in FIG. 17). This pulls the link 193 forwardly to cause closing of the power control switch and rocks the clutch control lever 188 (counter-clockwise in FIG. 17 and clockwise in FIG. 16) to cause the clutch control dog 185 to release pawl 178 and thereby cause engagement of the clutch and the driving of shaft 153.

It can be noted at this point that the usual switch control link 193 is preferably modified in the present invention by extending it upwardly above the pin 192 to form a rearwardly-facing hooked tip 194, whereby the link 193 can be pulled forwardly and the clutch control dog 185 rocked to cause engagement of the clutch by an auxiliary means operated at the end of the first stage of the split-multiplication operation, as will be described in section II, sub-section C, "First Phase of Operation."

It should further be noted that the clutch is held engaged and the power control switch held closed as long as the shaft 201 is rocked, and that as soon as the shaft is released the parts will be returned to their normal inoperative position by means of the spring 190 previously mentioned.

E. Carriage Shifting Mechanism

The carriage 80 can be shifted in either direction, either automatically in certain operations or under control of manually operated shift keys. Any shifting mechanism could be used but I prefer to use that described in the patents above-mentioned. Since the shifting mechanism is essential to machine operations in problems of multiplication, it will be briefly described. This mechanism, which is shown in FIGS. 2, 12 and 13, includes a left shift clutch 210 (FIG. 12) and a right shift clutch 211. The driving members 212 and 213, respectively, are mounted on the two right-hand actuator shafts 151— which two shafts are extended to a point adjacent the rear crossbar, or bearing plate, 70. These clutches are of the type described in the patent to Matthew, No. 2,636,678. The operation of each of these clutches is controlled by means of its respective control rod 214 or 215, respectively. These rods are biased to their forward, or inoperative, positions by means of compression springs 227 which encompass the front end of the rods and are compressed between the forward bearing plate, or crossbar, 67 and collars adjacent the forward end of the respective rods. The left shift control rod 214 can be moved rearwardly to cause its control finger 216 to rock the driver 212 to its operative position by several means, one of which will be described in section G below relating to the automatic left shift and clearing operations. Similarly, the right shift control rod 215 can be translated rearwardly to cause its clutch control finger 217 to rock the driver members 213 to its effective position by various means, one of which will be described in connection with the multiplication operation in section I (2) below. The right shift clutch can also be controlled by means of a pin 218 (FIG. 17) carried on a projection of the key stem of the right shift key 219, upon depression of that key. This pin 218 engages the forwardly extending arm 220 of a right shift lever 221. This lever 221 is rigidly mounted on a sleeve 222 (FIGS. 12 and 17), which is rotatably mounted on a short transverse shaft 223 journalled in the right frame plate 62 and a bearing 224 which is mounted on the forward side of the front bearing plate 67. The left end of the sleeve has a downwardly extending arm 225 rigidly secured thereto (FIGS. 12 and 15). The arm 225, in turn, carries a pusher link 226 which extends rearwardly to engage the front end of the right shift clutch control bar 215. Thus, the depression of the right shift key 219 (FIG. 1) will rock the lever 221 (clockwise in FIG. 17), thereby translating the pusher link 226 and right shift control bar 215 rearwardly.

Associated with the clutch driving members 212 and 213 are notched clutch disks 232 and 233, respectively (FIG. 12), the notches (not shown) of which are adapted to be engaged by the tongues on the driving members 212 or 213, respectively, when the latter are rocked from their inoperative positions shown in FIGS. 2 and 12. The left shift disk 232 is rigidly mounted on a quill shaft 234, journalled in the rear bearing plate, or crossbar, 70 and an auxiliary bearing bracket 235 mounted on the rear bearing plate by suitable spacing studs 236. This sleeve carries a pinion 237 (see also FIG. 13) that constantly meshes with the larger gear 238 of a compound gear rotatably mounted on a shaft 239. The smaller gear 240 of the compound gear meshes with a large shift gear 241 that is rigidly mounted on a shaft shaft 242, likewise journalled in the rear bearing plate 70 and the bearing bracket 235. The right shift clutch disk 233 is similarly mounted on a quill shaft, or sleeve, 243 (see FIG. 2), likewise journalled in the rear bearing plate 70 and the bearing bracket 235. A pinion 244 is rigidly mounted on the rear end of this shaft, which pinion meshes with a wide idler 245 (see also FIG. 12) that also meshes with the large gear 238 of the compound gear 238, 240. Thus the engagement of the left shift clutch 210 will rotate the gear 241 in a direction to cause a left shift of the carriage (counter-clockwise if viewed from the front, or clockwise when viewed from the rear, as in FIG. 13) by means of the gear train 237, 238, 240 and 241. Similarly, the engagement of the right shift clutch 211 will cause the rotation of the shift gear 241 (clockwise if viewed from the front, or counter-clockwise if viewed from the rear, as in FIG. 13) through the gear train comprising the pinion 244, wide idler 245, compound gear 238, 240 and the drive gear 241.

A shift plate 250 is rigidly mounted on the shift shaft 242 to which the shift gear 241 is secured. Preferably four equiangularly placed drive pins 251 are affixed to the plate, or disk, 250, on the forward face thereof. These pins engage in notches 252 formed in a shift rack 253 rockably mounted on the crossframe member 81. The notches 252 (FIG. 13) are ordinally spaced, so that the rotation of the shifting disk 250 through an angle of 90° is effective to shift the carriage 80 one order in the selected direction. The gear trains which drive the shifting mechanism have a gear ratio of 1:4, so that a single complete cycle of the actuator shafts 151 is effective to rotate the shift plate 250 through this angle of 90°. Thus, the operation of the shift control rod 214 results in rotation of shift plate 250 to effect a single order left shift of the carriage, while operation of the right shift control rod 215 results in the rotation in the opposite direction for an equal amount. By this means, the rotation of the shift plate 250 results in the necessary carriage shifting in the selected direction.

F. *Carriage Clearing Mechanism*

The well-known means for clearing the accumulator dials 84 and the counter dials 90 is described in the patents mentioned, and is illustrated in FIGS. 2, 10 and 11. Each clearing mechanism comprises a mutilated clearing gear 88 on each accumulator dial shaft 85 and a similar mutilated clearing gear 95 on each counter shaft 91. Preferably these mutilated gears are staggered on their respective shafts, as shown in these figures, in order to keep the ordinal spacing of the machine at the smallest possible distance. Associated with the mutilated clearing gears 88 and 95 are clearing racks 260 and 261, respectively. In each instance it is preferred that the racks be separated longitudinally, so as to engage the staggered gears just mentioned. The respective dials are returned to their "0" positions, or cleared, by longitudinal translation of the racks 260 and 261, respectively, as shown and described in detail in the patent of Friden, No. 2,229,889, already mentioned. These racks can be actuated manually by means of knobs 262 or 263 (FIG. 1), respectively. In the preferred form of construction, these clearing knobs 262 and 263 are mounted on sleeves 264 and 265, respectively, that are rotatably mounted on pins 266 and 267 secured to the racks. In each instance the racks are held in their leftward, or inoperative, position by suitable springs, such as the tension spring 269 (FIGS. 10 and 11). The clearing knobs 262 and 263 are rotatably mounted on the pins 266 and 267, so that when operated manually they are always effective to translate the clearing racks to the right, after which they are returned to their inoperative position by their respective springs. However, when the knobs are rocked (counter-clockwise in FIGS. 1 and 10) they can disable the power clearing mechanism, which will now be described.

The power clearing mechanism comprises a bar 275 (FIGS. 2, 10, 11 and 13) slidably mounted on the carriage frame bar 81 by any suitable means. Customarily the bar 275 is mounted by a pin-and-slot connection shown in FIG. 13, which includes the slots 276 in the power bar 275 embracing pins 277 riveted to the frame bar 81. This bar 275 is biased to its inoperative, left-hand position (to the right in FIG. 13, which is a rear view) by any suitable means, such as spring 278, tensioned between one of the pins 277 and a stud 279 on the power bar. As shown in FIGS. 10 and 11, the right end of the power bar 275 carries an integral bracket 284 upon which is riveted, or otherwise rigidly secured, a pair of pins 280 and 281 that engage interponents 282 and 283, respectively, rigidly mounted on the sleeves 264 and 265 on which the knobs are mounted. Thus the rotation of the knobs (counter-clockwise in FIGS. 1 and 10) move the interponents 282 and 283 from engagement with their respective pins 280 and 281, so that reciprocation of the power bar 275 will have no effect on the clearing mechanism. Normally, however, the knobs are rocked to the positions shown in FIGS. 1 and 10, so that both registers are cleared on operation of the power bar.

The power clearing bar 275 is operated, i.e., translated to the right (to the left in FIG. 13, which is a rear view) against the tension of its spring 278 by a mechanism operated through a clearing clutch 290 (FIG. 12). Preferably, this clutch is of the same form as that illustrated in connection with the shifting mechanism in FIGS. 2 and 12, and includes a drive member 291 mounted on the leftmost actuator shaft 151. When tilted, a tongue on the drive member 291 engages a slot in a driven disk 292 of the clutch. The position of the tongue on the driven member 291 is controlled by a positioning finger 293 mounted on the rear section 294 of a telescoping rod, the forward section 295 of which is slidably mounted in the bearing plates 67, 68 and 69. The two sections of the telescoping bar are held in an extreme projected position by a compression spring 296 encompassing both parts and seated on the bearing plate 69 and the control finger 293. It will be recognized that the forward portion of the telescoping rod 295 can be moved rearwardly and the rearward portion locked in a disabled position, as will hereafter be described. The telescoping control rod 294, 295 is normally held in its forward position by any suitable means, such as compression spring 297 seated against the front bearing plate and a collar adjacent the front end of the bar. The forward section of the bar can be moved rearwardly by means of a rockable pusher link 298 (see also FIG. 19), the front end of which is pivotally supported on an arm 299 that is pinned to, or otherwise secured on, the shaft 204. Thus, the rocking of the shaft 204 (clockwise when viewed from the right, as in FIG. 19) is effective to push the front section of the section 295 of the telescoping rod rearwardly. If the rear end 294 is not blocked, it is also moved rearwardly to set the clutch drive in operative, or engaging, position. The operation of shaft 204, to accomplish this purpose, will be explained in the next subsection G, entitled "Automatic Clearing and Shifting Mechanism."

The driven clutch plate 292 (FIG. 12) is mounted on a quill shaft 305 (see FIG. 13) which is journalled in the rear bearing plate 70 and a bearing bracket 306—the bearing plate being mounted on, and held in spaced parallel relationship to, the bearing plate 70 by suitable spacing studs 307. A clearing cam 308 is mounted on the shaft 305, preferably lying between the bearing plate 70 and the bracket. A follower arm 309 is associated with the cam 308, the follower arm being journalled on a pivot pin 310 mounted in the bearing plate and the bearing bracket. A roller 311 is rotatably mounted on the arm 309 in a position adapted to engage the periphery of the cam 308. The follower arm 309, and its roller 311, are resiliently biased into engagement with the periphery of the cam by any suitable spring means, such as spring 312, tensioned between a seat in the arm 309 and a stud on the bearing bracket. It is obvious that as the clutch driver 291 becomes engaged with the clutch disk 292, the latter will rotate, and the shaft 305 and cam 308 with it. Such rotation of shaft 305 and cam 308 rocks the clearing arm 309, first to the right (to the left in FIG. 13) and then back to the position shown. The upper end of the arm 309 is adapted to engage an ear 313 extending rearwardly from a bracket 314 mounted on the power bar 275 by any suitable means, such as screws 315. In the form shown in these figures, the bracket 314 is so located on the power bar 275 that the ear 313 will become engaged by the arm 309 only when the carriage is in the extreme left-hand position (shown in FIG. 1), and hence power clearing can take place only when the carriage is in its extreme left-hand, or home, position.

It can be mentioned here that the shaft 204 is rocked in the first cycle of machine operation, and hence the forward section of the telescoping control bar 294, 295 will be pushed rearwardly at this time. It is preferred that the clutch 290 should not be engaged until the carriage reaches the extreme left-hand position shown, and it is, therefore, preferable to provide a means for blocking the rear section 294 of the control bar until the carriage is shifted from the second order position to the first order, or extreme left-hand, position. This is readily accomplished by means of a bellcrank 316 (FIG. 13) rotatably mounted at its elbow on the bearing bracket 306 by any suitable means, such as screw stud 317. The lower arm of the bellcrank 316 is normally held in an upper position by means of a spring 318 tensioned between the arm 316 and a stud on the bearing bracket, thereby holding the bellcrank in a position counter-clockwise from that shown in FIG. 13. The lower arm of the bellcrank carries an upwardly and forwardly extending ear 319 which, when the bellcrank is in its normal position, lies immediately adjacent the rear end of the rearward section 294 of the telescoping bar, and hence prevents movement of the latter rearwardly. The bellcrank is rocked to a disabling position (shown in FIG. 13) by means of a stud 320 affixed to the shift rack 253 and so located as to first engage the upper end of bellcrank 316 when the carriage is in its second order, or next-to-the-extreme position shown in FIGS. 1 and 13. Therefore, as the carriage is shifted from its second order position to the extreme left-hand position shown in FIGS. 1 and 13, the pin 320 rocks the bellcrank 316 (clockwise in FIG. 13) to remove the ear 319 from behind the rear section 294 of the control rod 295. By such a means, the clear clutch can become engaged only during the cycle of operation in which the carriage is in the extreme left-hand position, as a conventional interlock prevents the operation of the clutch, except in the full-cycle position, even though the ear 319 is removed part way through the preceding cycle.

By the means here shown and described, either or both registers can be cleared automatically by rocking of the shaft 204 (FIG. 12), if the carriage is in the extreme left-hand position. It can be mentioned here that in multiplication operations it is customary, at least in the Friden machine with which my invention is preferably associated, to shift the carriage 80 to the extreme left-hand position shown as a preliminary phase of all multiplication operations. It can also be mentioned that the rocking of the shaft 204 is effective to initiate the automatic left shift operation, as will be described in the next section. Thus, the preliminary program includes the shifting of the carriage to the extreme left-hand position, followed immediately by a clearing of the registers while in that position.

Incidentally it can be mentioned that it is customary in the Friden machine to provide a mechanism for "split clearing," the term being used to mean a power clearance of the right-hand end of the accumulator register without clearing the left-hand end thereof. These machines use the mechanism described in the patent to Machado et al., No. 2,666,582, issued January 19, 1954. Heretofore, in these machines, it has been customary to split the clearing mechanism between the ninth and tenth or between the seventh and eighth orders, as the purchaser desired. In my invention it is essential that the split be made between the tenth and eleventh orders, as is indicated by the indicia 321 (FIG. 1) above the register dials. This location of the split clearing connection is necessary because if it is desired in connection with "split-multiplication" operations, the clearing must be effective to clear out one of the products completely while leaving the other product untouched.

G. *Automatic Clearing and Shifting Mechanism*

It is convenient, at least in the machine shown herein for purposes of exemplification, to initiate all operations which include an initial left shift of the register 80 to the extreme left-hand position and a clearing of the registers in that position by a single power-operated mechanism. For this purpose I prefer to use the mechanism shown and described in the patent to Machado, No. 2,650,761, issued September 1, 1953, side views of which are illustrated in FIGS. 14 and 15 and a plan view of which is shown in FIG. 12. This mechanism is controlled by the rocking of the shaft 201 extending transversely across the front part of the machine and suitably journalled in bearings carried by the left side control plate 66 (FIG. 24), the intermediate frame plate 63, and the right side frame plate 62 (FIG. 12). This shaft 201 is rocked (clockwise in FIG. 15 and counter-clockwise in FIG. 14) by any one of the multiplier control keys, as will hereafter be explained in section I (2) below, as well as other control keys not here pertinent. It has already been explained that the rocking of the shaft (counter-clockwise in FIG. 17) is effective to close the motor control switch through the forward translation of the switch control link 193 and cause the engagement of the clutch 170 through rocking of levers 188 and 185 and the translation of link 187. The rocking of this shaft is also effective to operate the programming mechanism here under discussion by means of the mechanism shown in FIGS. 12, 14 and 15.

The preferred form of mechanism comprises a bellcrank 330 rigidly mounted on the shaft 201 approximately midway between the right side frame 62 and the intermediate frame plate 63 (see FIG. 12). A control link 331 is customarily mounted on the upper end of the bellcrank by a pin-and-slot connection 332, 333. The rear end of the link 331 is pivotally connected to one arm of a bellcrank 334 that forms a closed cam follower mounted on an eccentric disk 335 rigidly mounted on an auxiliary drive shaft 336. The other arm of the bellcrank is formed as a hook, or shoulder, 337 adapted to engage a pin 338 riveted to, or otherwise mounted on, a control lever 339. This lever is rigidly mounted on the transverse control shaft 204 (which is journalled in the right side frame 62 and the intermediate frame plate 63). It will be evident that the eccentrically mounted bellcrank 334 will be reciprocated with each rotation of the shaft 336. It can be noted that at this point the shaft 336 is directly geared to the main drive shaft 153, as will be explained in the next paragraph, so that, in effect, the eccentrically mounted bellcrank 334 is reciprocated with each cycle of machine operation. Normally, the bellcrank 334 is angularly so positioned that the hook 337 reciprocates in a path in which it does not come into engagement with the pin 338. When the control bellcrank 330 is rocked by the rocking of the shaft 201 (both of which rock counter-clockwise in FIG. 14 and clockwise in FIG. 15), the hook 337 engages the pin 338 at the extremity of its forward stroke, which occurs about the mid-point of a cycle. Thereupon, the eccentric rocks the arm 339, and the shaft 204 upon which it is mounted (counter-clockwise in FIG. 14 and clockwise in FIG. 15). At this time the arm 339 and shaft 204 are latched in the extreme rocked position by means of a latch arm 340, preferably formed as a downwardly extending rocker leg of arm 339, a pin 341 of which engages a shoulder formed on a latch 342. This latch remains effective until it is released by the return of the first-mentioned bellcrank 330, and its shaft 201, to the normal positions shown in these figures (which occurs in the last cycle of a multiplication operation). At that time a pin 343 on the bellcrank 330 lifts the free end of a latch arm 342 to unlatch the control shaft 204.

The means for gearing the shaft 336 to the main drive shaft 153 is shown in FIG. 22. A miter gear 350 on drive shaft 153 meshes with a similar gear 351 pinned to, or otherwise rigidly secured on, a short intermediate shaft 352. This shaft is preferably journalled in a bearing bracket 353 mounted on the front side of the front bearing plate 67 and a second bearing bracket 354 secured to the base plate 61. Another miter gear 355 secured to the shaft 352 at an intermediate point thereon meshes with a similar mitered gear 356 secured to the left end of the auxiliary drive shaft 336. Thus the auxiliary drive shaft 336 rotates synchronously with the main drive shaft 153, and the reciprocating bellcrank 334 reciprocates with each machine cycle.

The rocking of the shaft 204, mentioned in the second paragraph above, is effective to initiate a left shifting operation as well as set the front section 295 of the telescoping clear clutch control rod for a clearing operation. It will be recalled that the arm 299 is rigidly mounted on shaft 204 (FIGS. 12 and 19) and that this arm carries a pusher link 298 which engages the front end of the bar 295. The shaft 204 carries a second arm 360 (FIGS. 12 and 14) which is pinned to it, or otherwise rigidly mounted thereon. The upper and free end of this arm pivotally supports the front end of a pusher link 361, the rear end of which is biased downwardly by a spring 362. The rear end of the pusher link is formed with a shoulder 363 adapted to engage a pin 364 that is riveted to an arm 365. This arm is formed on the left end of a sleeve 366 journalled on the shaft 223, the right end of the sleeve carrying a similar arm 367. The arm 367 carries a long, rightwardly extending pin 368 that engages the front end of the left shift control rod 214. Thus, the rocking of the shaft 204 and arm 360 is effective, through link 361, the two arms 365 and 367 of sleeve 366 and their respective pins, to translate the control rod 214 rearwardly and set the left shift clutch driver 212 into its effective position. This operation takes place in the latter half of the first cycle of operation, but a customary interlock will prevent operation of the shifting mechanism until the beginning of the next cycle. Also, it can be mentioned that a clutch of this type is ineffective to initiate operation of the driven member until the nose of the driver can engage a slot in the driven disk. The clutch will be held in its operative position so long as the shaft 204 is rocked (and this shaft is held in its rocked position so long as the multiplication operation continues), and the pusher link 361 is held downwardly by the bias of its spring 362. The shaft 204 will be released only at the end of the multiplication operation as far as the present invention is concerned, but a means is provided for lifting the pusher link 361 as soon as the carriage reaches the extreme left-hand position (shown in FIG. 1), as will now be described.

H. *Shift and Clear Terminating Mechanism*

It is customary in the machine described to provide means for terminating an automatic shift in either extreme position and to terminate operation of the clearing mechanism is the extreme left-hand position. However, it is conventional in most automatic multiplication mechanisms to shift the carriage to an extreme left-hand position as a preliminary program to multiplication, so multiplication can begin with the lowest order of the register. Therefore, as only the left shifting mechanism is involved in the preliminary programming for multiplication, only the mechanism for terminating the left shifting operation need be described herein. Preferably the termination of such a continuous left shift is controlled by an attempted over-shifting of the carriage beyond its terminal position shown in FIG. 1, and in my machine preferably by the mechanism which is best shown in FIGS. 12 and 13. It is seen in FIG. 13 that the extreme right-hand notch 252 (to the extreme left in this figure) in the shift rack 253 is formed in an override pawl 375 which is pivotally mounted on the rack 253 by means of a stud 376, and is biased into an operative position by a suitable spring 377. A nose 378 on the right end of the pawl (to the left in FIG. 13) overlies an ear 379 formed at the upper end of a slide 380. The slide is mounted on the rear bearing plate 70 by any suitable means, such as pin-andslot connections 381, 382. The lower end of the slide overlies the rearwardly extending horizontal arm of a bellcrank 383 (as perhaps is best shown in FIG. 18) that is pivotally mounted in the machine, such as upon the computation control shaft 165. The lower arm of this bellcrank is connected to a forwardly extending link 384 (see FIGS. 12 and 18) by any suitable means, such as pin 387. The forward end of the link 384 is connected to the upwardly extending right leg of a bail 385 (FIGS. 12 and 17) which is rotatably mounted on the transverse shaft 204. The left leg of the bail carries an extension 386 (FIGS. 12, 14 and 19) which extends to the left to a point adjacent the intermediate frame plate 63. The extended left leg 386 of the bail underlies the left shift control pusher link 361 (FIG. 14) and the shift clutch pusher link 298 (FIG. 19), so that the rocking of the bail is effective to lift both links away from their cooperating pin 364 or rod 295, respectively. When this happens the clutch control rods 214 and 295 are released to the force of their respective springs 227 and 297, respectively, and both, therefore, snap to their normal and inoperative position. At the end of the cycle, when the override pawl returns to its normal position shown and consequently the bail 385 returns to its normal position, the two clutch control rods are in their forward positions. In that situation, the lower edge of the respective pusher links will ride on the top of the control rod 295 or on the top of the pin 364 without in any way controlling the positioning of the mechanisms. The operation of the bail 385, therefore, disables the effectiveness of the shift programming mechanism and the register clearing mechanism, for the pusher links will be riding upon their associated parts instead of engaging them. Thus, even though the automatic shift and clear mechanism is latched in its effective position, it can no longer control a shifting or a clearing operation. It can also be mentioned at this point that the rocking of the bail 385 and its extension 386 is also effective to initiate operation of the multiplier mechanism, as will be described in section I (2) hereafter. A similar override pawl 388 forms the left-hand terminal notch of rack 253 (to the right in FIG. 13). However, the operation of this pawl plays no part in the present invention so it and its associated mechanism will not be described.

I. *Multiplication Mechanism*

It can be mentioned at the outset of the discussion of the multiplier mechanism that it is, almost in its entirety, substantially the same as those disclosed in the Friden multiplier Patents Nos. 2,371,752 and 2,399,917 already mentioned. Insofar as these mechanisms are modified, it is done almost entirely by the addition of new parts to effectuate new controls for this old and well-known mechanism. The entry of multiplier values is made through a multiplier selection unit in the lower, or front, left-hand corner of the machine. Such a selection mechanism ordinarily comprises three main sections:

(1) The keyboard;
(2) The shiftable pinboard; and
(3) The multiplication control segments.

In my invention, these are utilized without change from the calculating machine made under the teachings of these patents. Hence, the selection mechanism will be very briefly described, reference being made to these patents for a full and complete disclosure of the mechanisms involved.

(1) *Multiplier keyboard.*—The multiplier keyboard comprises nine digital value keys 393 (FIG. 1) and a "0" key 394. The value keys 393 are arranged in the usual 3×3 square with the "0" key 394 placed in front of them. All of these keys are mounted on stems (not shown) which are slidably mounted in a keyboard frame comprised in part by an upper frame plate 395 and a lower frame plate 396 (FIGS. 19, 20 and 22). These keys are all urged to their upper, or inoperative, positions by the usual springs, not shown. Depression of the "0" key 394 is effective only to release a multiplier carriage escapement mechanism, not shown herein; the depression of the "9" key is effective to operate the escapement mechanism and also to operate a "0" latch 400 (FIG. 20) by means of a mechanism, not here shown but fully shown and described in the patents mentioned; and depression of the "1" to "8" value keys is effective, in addition to the release of the "0" latch 400 and the operation of the escapement mechanism, to rock setting arms 397 (the tips of which are seen in FIG. 20) to set a value pin 401 carried by a multiplier control carriage 398.

The value pins 401 are, in the machine with which my invention is preferably associated, mounted in the multiplier carriage 398. In the preferred form of construction there are ten orders of pins 401, with eight pins in each order. When the multiplier carriage 398 is in its home position, the highest order of pins 401 is in alignment with the noses 397 of the bellcranks operated by the multiplier value keys. The pins are slidably mounted in aligned apertures in an upper carriage plate 402 and a lower plate 403, the two plates being secured to end plates 404 that are held in spaced relationship by a number of tie rods, such as the shaft 399 on which the "0" latches 400 are mounted.

The multiplier carriage is slidably mounted on a pair of rails 405 and 406 (FIG. 20) and is biased to the left by means of a spring-powered lever arrangement, including a three-armed lever 407 pivotally mounted on the base plate 61, the upwardly extending rear arm of which engages the right side frame plate 404 (see FIG. 22), while the forwardly extending arm seats a spring 417 which extends transversely across the front of the machine. An escapement mechanism, not illustrated herein but fully shown and described in the Friden multiplier Patents Nos. 2,371,752 and 2,399,917, enables the escapement of the carriage one order to the left upon operation of one of the multiplier value keys 393 or "0" key 394. As the escapement mechanism is operative, the carriage is shifted one order to the left whereby a new row of pins 401 comes into alignment with the operating levers 397 of the selection mechanism.

The multiplier carriage 398 (FIG. 20) carries a series of selection segments 408 that are ordinally mounted on a shaft 409 supported in the end plates 404, and which, incidentally, also serves as one of the tie rods of the carriage 398. Each of these segments is biased to an extreme value position of "9" by a spring 410 extending around a hub of the segment, not shown, and is tensioned between a seat on the segment and another on the carriage. Each segment carries a dial 411 which is visible through a window 415 (FIG. 1) as the carriage is escaped one order to the left from its home position. These segments are coordinally arranged with the respective orders of value pins 401 and with the ordinally arranged "0" latches 400 that are rotatably mounted on the tie rod 399. A nose on each segment (FIG. 20) engages its coordinal "0" latch 400 and is thereby held in a "0" value position. When the "0" latch is operated from the depression of one of the value keys, the segment is released to the force of its spring 410, whereupon it will rotate toward an extreme value position (counter-clockwise in FIG. 20) until it is stopped by the one of the pins 401 which has been projected upwardly by the rocking of its associated lever 397, or in the case of the value of "9," until the segment is brought to rest by engaging a tie rod of the frame.

These segments control the number of cycles of operation in the respective orders of the multiplication operation, as will now be explained.

(2) *Multiplier operation.*—Multiplication in the "Friden" machine is by the repeated addition method which a digitation operation is performed a number of times, depending upon the multiplier value of that order. For the moment we can disregard the question of whether such digitation is additive or subtractive in nature, for the subtractive phase of the invention will be described under sub-heading (3) (c) "Subtractive Multiply Key," below. For the moment we can ignore the sign character of the operation and direct our attention to the means for counting the number of cycles in each order of operation, for that operates in the same manner in both instances. This mechanism is best shown in FIG. 23.

It will be noted that each segment 408 is provided on its rear edge with a series of rack teeth 412. These teeth are adapted to be engaged by a holding pawl 420 which is rigidly mounted on a transverse shaft 421 that extends from the intermediate plate 63 to the left side control plate 66. Normally, the shaft 421 and the holding pawl 420 are held in the inoperative position shown in FIG. 23 by the resilient control mechanism to be described in the next paragraph. It should be noted here, however, that the shaft 421 and the holding pawl 420 are resiliently biased to an operative position (counter-clockwise in FIG. 23), so that an ear 422 on the holding pawl will engage the rack teeth 412 whenever it is released by the resilient control mechanism. Normally, however, both are held in the position shown, in which case the ear 422 on the holding pawl rocks a feed pawl 423 away from the rack teeth 412 of the multiplier segment 408, as shown. The feed pawl 423 is pivotally mounted on an oscillating arm 424 by any suitable means, such as pivot stud 425. The rear end of the oscillating arm is pivotally mounted on any suitable means, such as a stud 426 secured to the left-hand auxiliary frame plate 65 (FIG. 22). The arm 423 is connected to an eccentric cam follower 427 (FIG. 23) which embraces an eccentric cam 428 rigidly mounted on the main drive shaft 153. Thus, the arm 424 oscillates with each cycle of machine operation and consequently the feed pawl 423 reciprocates with each cycle of operation. The feed pawl 423 is resiliently biased toward engagement with the ratchet teeth 412 on the segment 408 by a suitable spring 429, but normally is held from such engagement by the holding pawl 420.

The multiplication operation itself is controlled by the rocking of a spring-powered operating arm 435 (FIG. 24) that is pivotally mounted on the left side control plate 66 by any suitable means, such as pivot stud 436. A pin 437 on the rear end of this arm is embraced within a slot 438 formed in the forward end of a rocker arm 439 which is pivotally mounted on the control plate by any suitable means, such as pivot stud 440. A strong spring 441 tensioned between a seat in the rearward arm of the rocker and a seat in the control plate biases the two levers 439 and 435 to an operative position (the arm 439 counter-clockwise and the lever 435 clockwise in this figure). The control lever 435 is latched in an inoperative position by two latches 442 and 443, the operation of which will be described later in this section. A link 444 connects the pin 437 with an arm 445 that is rigidly mounted on the left end of the shaft 421, being connected to this arm by a pin-and-slot connection which includes a pin 446 on the arm embraced by a slot 447 in the link. A spring 448 tensioned between the pin 446 and a stud, not shown, on the control plate, resiliently biases the shaft 421 to its operative position (clockwise in FIG. 24 and counter-clockwise in FIG. 23). Normally the shaft 421 is held in an inoperative position by the link 444 and its control lever 435. However, when the lever 435 is enabled to rock, the link enables the arm 445 and shaft 421 to rock to their operative positions.

At the end of each ordinal series of operations the holding pawl 420 is rocked from engagement with the then operative segment 408, so that in the next cycle of operation the multiplier carriage 398 and the register carriage 80 can each be shifted one order to the right. This is most readily accomplished by means of a shift control arm 455 (FIG. 20), an ear 456 on the front end of which is adapted to engage the upper end of the rack section of the then operative segment 408 as the segment returns from its "1" to its "0" position. This lever 455 is pivoted on a short shaft 457 that extends between the left side auxiliary frame plate 65 and the left side control plate 66. Normally, the shift control lever 455 is held in an inoperative position by means of a resilient link 458 (FIG. 24) which has a pin-and-slot connection with the lever 455 and also with a setting lever 459 that has a pin-and-slot connection with the spring-powered rocker 439. Thus, the rocking of the initiating levers 435 and 439 resiliently biases the shift control lever 455 to its operative position (clockwise in FIGS. 20, 24 and 26). In multiplication, if a value stands in the operative value segment 398, the segment is, of course, rocked (counter-clockwise from the position shown in FIG. 20), so that the shift control lever 455 is enabled to rock (clockwise) from the force of spring 460 (FIG. 24) which holds the link in a retracted position with respect to the rocker 459. In this position the shift control lever is in an inoperative position, and digitation proceeds. If, however, the lever 455 is held in the counter-clockwise position, or when it is rocked to that position by the return of the operative segment 408 to the "0" position shown, it becomes effective to disable the feed pawl and to enable the shifting mechanism.

This result is secured by means of a link 461 (FIG. 20) suspended from the rear end of the lever 455, the lower end of which link is connected to a hook-shaped link 462. The forward end of the hook link 462 is pivotally mounted on a cam follower arm 463 that, in turn, is rotatably mounted on a transverse shift control shaft 464. Early in the fourth quarter of a cycle of operation the upper end of the arm 463 is engaged by a roller 465 carried by a cam 466 mounted adjacent the left end of the main drive shaft 153. The rear end of the link 462 is formed with a shoulder 467 which engages an ear on a latch member 468 that is pivotally mounted on a transverse shaft 469 and is biased to a latched position by any suitable means, such as spring 470. The latch 468 is provided with a shoulder, which underlies an offset section of an arm 478 that is pinned to, or otherwise rigidly secured on, the shaft 464. The shaft 464 carries a second follower arm 471 which is pinned thereto. A relatively strong spring 472, seated on a stud on the arm 471 and a stud on the frame plate, strongly biases the arm 471 and shaft 464 to an operative position (counter-clockwise from that shown in FIG. 20). A pin 473 on the arm 471 is embraced within a slot 474 of a link 475. This link is pivotally mounted on an arm 476 that is rigidly mounted on the shaft 421. It is well known that the first follower arm 463 is rocked and the hook link 462 is reciprocated with each cycle of machine operation. Whenever the shift control lever 455 is in the digitation position (clockwise from that shown in FIG. 20), the hook 467 is held above the ear on latch 468. However, when the lever 455 is rocked by the operative one of the segments 408, the hook link 462 is lowered so that the hook 467 engages the ear of latch 468. Thereupon, in the last quarter of the cycle, the latch is rocked away from the arm 478 and the spring 472 becomes effective to rock the assembly consisting of that arm, shaft 464 and arm 471. When this happens the link 475 and arm 476 are effective to rock the feed control shaft 421 (counter-clockwise in FIG. 20 and clockwise in FIG. 23) to disable the feed pawl.

The rocking of the shaft 464 is also effective to initiate the shift mechanisms which control the shifting of the multiplier carriage 398 and the register carriage 80. The shaft 464 extends transversely across the machine, actually being journalled in the left side control plate 66 (FIG. 24), the left side frame 64 (FIG. 22) and the right side frame 62 (FIG. 12). At a point adjacent the left side frame 64 (FIG. 22) it carries an arm 480 that is pinned to, or otherwise rigidly mounted thereon. A pin 481 on the forward end of this lever is embraced within an annular groove 482 in a collar 483 that is slidable along the intermediate shaft 352 but is nonrotatably mounted thereon. Thus, the collar 483 rotates with the shaft 352, but can be shifted axially along it by the rocking of arm 480 and shaft 464. A feed pawl 484 is mounted on an eccentric portion of the collar 483, its rear end being pivoted on a stud 485 carried by the bearing bracket 354. A ratchet nose on the front end of the pawl 484 is adapted, when the collar and pawl 484 are lifted by the rocking of arm 480, to engage the teeth of a shift rack 486 that forms the rear face of the upper frame plate of the multiplier carriage 398. It will be obvious that the feed pawl 484 oscillates constantly with each cycle of machine operation but normally lies in a plane below the feed rack 486, so that such oscillation is ineffective. However, when the shaft 464 and hence the arm 480 are rocked (clockwise in FIG. 22), the front end of the feed pawl 484 is lifted into the plane of the feed rack 486 and hence will shift the multiplier carriage 398 to the right one ordinal space with each cycle of machine operation.

Near its right end, the shaft 464 carries an arm 490 (FIGS. 12 and 15) that is slidably and rotatably mounted thereon. A spring 491 resiliently biases the arm 490 toward the left. Normally such movement is blocked by means of a bail 492 that is slidably mounted on the shaft 464, the left end of the bail engaging the right frame plate of the multiplier carriage. Hence, the arm 490 is normally forced to the right against the force of spring 491 by the multiplier carriage being in its home position. As soon as the multiplier carriage is escaped to the left, however, the arm 490 can shift to the left from the force of spring 491, and, when so shifted, becomes effective to control a right shift operation. In its normal position, the arm 490 lies to the right of a pin 493 that is carried by an arm 494 rotatably mounted on the shaft 223. However, when the arm 490 is shifted to the left, it lies in a plane adapted to engage the pin 493. Then, when the arm is rocked, it forces the pin 493, and hence the right shift control rod 215, rearwardly and thus initiates a right shift operation. Such rocking of the arm 490 is secured by means of an arm 495 that is pinned to, or otherwise rigidly secured on, the shaft 464. This arm carries a long pin 496 that is embraced within a slot 497 formed in the shift arm 490. This construction, therefore, enables the rocking of the shift control arm 490 with each rocking of the shaft 464, but such rocking is ineffective unless and until the multiplier carriage 398 has been shifted to the left. By this means the register carriage 80 is shifted one order to the right at the end of each ordinal series of operations until the multiplier carriage is returned to its home position. Thereafter, although the shaft 464 is rocked once more to initiate the restore operation, such rocking does not cause a shift of the register carriage.

It was previously mentioned that the actual multiplication operation was initiated by the rocking of an initiating lever 435 (FIG. 24) which is normally latched in an inoperative position by two latches 442 and 443. The rocking of latch 442, which is formed as a bellcrank pivotally mounted on the left side control plate by any suitable means, such as pivot stud 595, is occasioned by the rocking of the automatic shift and clearing control shaft 204 which has heretofore been explained in connection with FIGS. 14 and 15. On its right end this shaft carries an arm 506 (FIG. 17) which is rigidly secured thereon. A pin 507 on the lower end of this arm engages a slot formed in a link 508 that is resiliently held in contact therewith by a suitable spring 509. The forward end of the link is pivotally mounted on a supporting arm 510 that is pivotally mounted on the right frame plate by any suitable means, such as stud 511. A second link 512 connects this arm to an arm 513 that is rigidly mounted on the right end of a transverse shaft 514. It follows that the rocking of shaft 204 (counter-clockwise in FIGS. 14 and 17) in the first cycle of operation is effective to rock the shaft 514 (counter-clockwise in FIGS. 17 and 24). The left end of the shaft 514 carries a U-shaped lever 515 (FIG. 24) rigidly mounted thereon. A pin 516 mounted on the lower arm of the lever 515 engages the upper edge of the forwardly extending arm of the bellcrank latch 442. Thus, the rocking of shaft 514 (counter-clockwise in this figure) rocks the latch 442 clockwise against the force of its spring 517. As the shaft 204 is held in its rocked position throughout the multiplication operation, this latch lever is held disabled until the multiplication operation is completed. However, it should be noted that the release of the arm 435 by this latch alone is not sufficient to initiate a multiplication operation, but that latch 443 must also be released.

The latch 443, which engages a pin 449 on the arm 435, is released by the operation of the override pawl 375 (FIG. 13) and the consequent rocking of bail 385 (FIG. 12) by means of a mechanism which is best illustrated in FIG. 19. The leftward extension 386 of the bail 385 underlies the rearward arm of a bellcrank lever 525 that is rotatably mounted on the shaft 204 adjacent the intermediate frame plate 63. This bellcrank is normally biased to the position shown in this figure by a spring 526 tensioned between its lower arm and an extension on a link 527. The lower arm of this bellcrank 525 carries a pin 528 that normally lies within a slot, not illustrated, in the rearward end of the link 527. The forward end of the link 527 is pivotally mounted on an arm 529 by any suitable means, such as pin 530. The arm 529 is rigidly secured to a short shaft 531 that extends between the intermediate frame plate 63 and the left side control plate 66. The latch 443 (FIG. 24) is mounted on the left end of the shaft 531, so that it is rocked (counter-clockwise in this figure) by the rocking of shaft 531. As just explained, the rocking of shaft 531 is caused by the operation of the override pawl and bail 385, through the medium of the bellcrank 525 and link 527. This assembly is biased to its latching position by a spring 532 tensioned between a stud on the latch and a stud on the frame plate, not shown. It will be noted that operation of the override pawl and the linkage which controls the positioning latch 443 is operated with each operation of the override pawl. However, such release of latch 443 will not be effective to initiate a multiplication operation unless the latch 442 has theretofore been operated by the rocking of the shift and clearing control shaft which results from a depression of one of the multiplication control keys.

(3) *Multiplication control keys.*—It is customary, in the preferred form of the machine, to provide for three separate multiplication operations which can be selected by the operator. The three operations are: (1) Normal multiplication initiated by the "MULT" key 540 which involves repeated addition of the multiplicand standing in the keyboard under the control of the multiplier mechanism heretofore described, the operation being preceded by a shift of the register carriage 80 to the extreme left-hand position and a clearing of both registers; (2) an accumulative multiplication operation initiated by the depression of an "ACCUM MULT" key 610 which is the same as the first, except that the clearing mechanism is disabled whereby one product is added to another; and (3) a complementary multiplication operation initiated by a "NEG MULT" key 640 to subtract a second product from a first by subtractively operating the accumulator register under control of the multiplier segments, which likewise disables the clearing mechanism. These will now be described in order.

(*a*) *Multiply key.*—The multiply key 540 (FIGS. 19 and 22) is mounted on a key stem 541 slidably mounted in aligned apertures in the upper and lower multiply frame plates 395 and 396. It is biased to its upper and inoperative position by a suitable spring 542, and on its forward edge it carries a latching shoulder 543. A roller 544 is embraced within a slot 545 formed in the forward end of an angularly shaped lever 546 that is pivoted on the intermediate frame plate 63 by any suitable means, such as pivot stud 547. A downwardly extending projection of the arm 546 carries a roller 548 that engages the forward face of an arm 549 rigidly mounted on the initiating shaft 201. Thus, the depression of the multiply key 540 is effective to rock the shaft 201 (clockwise in FIG. 19 and counter-clockwise in FIGS. 14 and 17), thereby initiating machine operation and conditioning the automatic shifting and clearing mechanism for operation in the second cycle of operation.

The latching shoulder 543 on the key stem is adapted to engage an ear 555 (FIG. 22) formed on the upper end of an arm 556 that is rigidly mounted on a latching shaft 557. This shaft extends between, and is journalled in, the intermediate frame plate 63 and the left side control plate 66, and also carries a latching arm 558 (FIG. 20) which is effective to latch the accumulative multiply and subtractive multiply keys in their depressed position. The shaft 557 and the two latching arms 556 and 558 are biased to a latching position by any suitable means, such as a spring 559 which is tensioned between a releasing lever 560 and the machine framing. The releasing lever is pivotally mounted on the shaft 557 and carries an ear 561 on its forward edge which engages the forward edge of the arm 558. Thus, the spring is effective not only to rock the releasing lever 560 but also the arms 556 and 558 and shaft 557 to the latching position (counterclockwise in FIG. 20 and clockwise in FIG. 22). The lower end of the lever 560 is engaged by the rear face of a nose 562 forming the left end of an extension 414 of the lever 407. The lever 407 rocks in a counter-clockwise direction (if viewed from above) from the force of its spring 417 as the multiplier carriage 398 is permitted to escape to the left. Hence nose 562 normally moves away from the lower end of the arm 560 as multiplier factors are entered into the multiplier carriage 398, and returns to engage arm 560 as the multiplier carriage is returned to its home position in the course of the multiplication operation. It can be mentioned here, that the restoring operation is accomplished by an overshift of the multiplier carriage 398 one ordinal space to the right of its home position (in which position it cannot be latched, so that it immediately returns to the home position at the end of that cycle of operation). In this overshifting operation the nose 562 will obviously rock the releasing lever 560 (clockwise in FIG. 20). A spring 563 resiliently connects the upper end of releasing lever 560 with the latching arm 558, so that normally the rocking of the lever 560 during the overshifting of the multiplier carriage 398 is effective to release the multiplier control key that is latched down. It can be noted that in the present invention it is necessary to prevent the release of this key at the end of the first phase of a split-multiplication operation, so that the releasing lever 560 and latching arm 558 are formed separately and are resiliently connected by the spring 563, whereby the invariable rocking of the latter will not always release the key.

Associated with, but spaced slightly away from the lower end of the multiply key 541 is a roller 570 (FIG. 22) on the rearward end of the right leg 571 of a bail 572 that is rotatably mounted on the transverse shaft 514. The left leg 574 of the bail 572 (FIG. 20) supports the forward end of a rearwardly extending link 575. Originally the link 575 extended to adjacent the rear of the machine, but more recently it has been found advisable to support the link 575 at an intermediate point by means of an arm 576 pivotally mounted on the shaft 421. The rear end of the link 575 is connected to a bellcrank 577 (see also FIG. 24) that is pivotally mounted on the left side control plate 66 by any suitable means, such as stud 578. The bellcrank is resiliently rocked to the clockwise position shown in this figure by a suitable spring 579 tensioned between the forwardly extending arm of the bellcrank and a stud on the frame plate. The forwardly extending arm of the bellcrank 577 supports the lower end of a link 580, the upper end of which is pivotally connected to an additive control arm 581. The forward end of the arm 581 is pivotally mounted on the framing by means not shown herein, and its rear end is biased downwardly by a spring 582 tensioned between a seat on its rear end and a stud carried by an additive multiply control arm 583 (FIG. 20). A pin 584 on the additive control arm 581 overlies the upper edge of the additive control arm 583, so that when the arm 581 is in its normal position the control arm 583 is positively depressed by the pin 584. However, as the arm 581 is rocked upwardly by the linkage herein described, it resiliently lifts the control arm 583.

The additive control arm 583 is biased upwardly by the spring 582 tensioned between it and arm 581. The forward end of the arm 583 is pivotally secured to a cam follower bellcrank 593 (to be described in the next paragraph) by any suitable means, such as pivot stud 585. The rear end of the arm 583 is formed as a shoulder 586 adapted to engage a pin 587 secured to the upper end of a digitation setting lever 588 which is pinned to, or otherwise rigidly secured on, the digitation control shaft 165. It is obvious that the bias of spring 582 normally would lift the shoulder 586 into engagement with pin 587, but this is prevented by the pin 584 which engages the upper edge of the lever 583—the pin 584 being held in the disabling position through the linkage including the bellcrank 577 (FIG. 24), link 580, arm 581 and spring 579. However, when the multiply key 540 is depressed, the linkage lifts the arm 581, whereupon pin 584 releases arm 583 and spring 582 will lift it into engagement with the pin 587 on the digitation setting lever 588.

It has already been mentioned that the front end of lever 583 is pivotally mounted on the vertical arm of a bellcrank cam follower 593 (FIG. 20). The follower bellcrank 593 is pivotally mounted in the machine by any suitable means, such as the shaft 594, the ends of which are supported in the frame plates 65 and 66. At its upper end the bellcrank carries a roller 595 which engages the periphery of a cam 596 mounted on the main drive shaft 153. The lobe of the cam 596 is so positioned that the cam rocks the follower bellcrank 593 immediately after the start of a cycle of operation, thereby pushing the setting link 583 rearwardly and thus rocking the lever 588 and digitation control shaft 165 rearwardly (counter-clockwise in FIG. 20) to the additive position. The bellcrank 585 is latched in this operative position by means of a square stud 597 which is engaged by a latch arm 598 when the bellcrank follower is rocked to its operative position. The latch arm 598 carries a forwardly extending arm 599, the upper edge of which is engaged by the offset portion of the arm 478 when that arm is released by its latch 468. Thus the cam follower arm is rocked to its effective position at the start of the first cycle of an ordinal series of operations, is latched in that position throughout that ordinal series of operations, and is released when the ordinal series is terminated by the unlatching of arm 478. Thereupon, the centralizer (not shown, but conventional in this type of machine) returns the shaft 165 to the neutral position shown.

It should be mentioned at this point that a roller 477 on the rear end of the shift control lever 455 engages the upper edge of the setting arm 583. When the shift control lever 455 is rocked by the return of a multiplier segment to its "0" position to initiate the interordinal program in the multiplication operation, it (the lever 455) is effective to immediately disable the digitation control that is effected by the additive setting link 583.

(*b*) *Accumulate multiply key.*—The accumulate multiply key 610 is mounted on a key stem 611 (FIGS. 20 and 24) that is mounted in the multiplier keyboard frame in much the same manner as the multiply key 540 (FIG. 22). The key stem 611 carries a forwardly extending latching shoulder 609 (FIG. 20) which, when the key is depressed, engages a latching ear 608 formed on the upper end of the latch arm 558, already described. A pin 612 on the lower end of the key stem is embraced within a slot 613 formed in the forward end of a control lever 614. This lever, as is customary, lies outside of the left-hand control plate 66 in the forward part of the machine, is then offset to the right through an aperture in the frame plate, and is pivoted on a shaft 615 (FIG. 20). The rear end of this lever is bent downwardly to carry a pin 616 that lies within a slot 617 (FIG. 24) formed in the rear end of the additive control arm 581. Thus the depression of the accumulate multiply key 610 lifts the rear end of the additive control arm 581, and hence controls the sign character of the multiplying operation in the same manner as if the multiply key 540 had been depressed. Hence the series of multiplication operations and the control of digitation thereby is the same in both instances.

An interponent lever 620 (FIG. 24) lies immediately to the left of the accumulate control lever 614, and, incidentally, is also rotatably mounted on the shaft 615 (which mounting is not shown herein). This interponent arm 620 carries a pin 621 at its forward end which underlies the forward portion of the lever 614. Hence the lever 620 will be rocked (clockwise in this figure) from the depression of the accumulate multiply key 610. The interponent lever 620 carries a downwardly extending projection 622, the lower end of which rests against a pin 623 carried by an arm 624 rigidly secured on the left end of the motor initiating shaft 201. Hence the depression of the key 610 will rock the shaft 201 (counter-clockwise in this figure) to initiate operation of the motor, cause engagement of the clutch, and condition the automatic left shift and clear mechanism (described in connection with FIGS. 14 and 15) for operation.

The interponent arm 620 also carries a pin 625 that lies within a slot formed in the upper end of a link 626. The lower end of the link 626 is pivotally connected to an arm 627 that is rigidly mounted on a shaft 628. Thus the shaft 628 is rocked (counter-clockwise in FIG. 24 and clockwise in FIG. 19). On its right end the shaft 628 carries an arm 629 rigidly secured thereto. A pin 630 on the upper end of this arm engages the forward leg of a rocker 631 which is pivotally mounted on the transverse shaft 204. A leftwardly extending ear 632 on the rear leg of rocker 631 underlies the clear clutch pusher link 298. Thus, the rocking of the interponent lever 620, from depression of key 610, rocks shaft 628 (clockwise in FIG. 19), thereby rocking the rocker 631 to lift the shift clutch control link 298 from engagement with the clutch control rod 295. The key 610 is, of course, latched in its operative or depressed position and holds the pusher link disengaged throughout the operation, so that clearing is impossible. It is thus apparent that the depression of the accumulate key 610, through the rocking of arm 614 and the interponent arm 620, is effective to rock shaft 201 to initiate a machine operation which includes shifting of the carriage to the extreme left-hand position, and simultaneously disables the clear clutch control mechanism, so that clearing is impossible. In this operation the true, or positive product is secured, which product will be added to values theretofore standing in the register, as the registers are not cleared in this operation.

(c) *Subtractive multiply key.*—Subtractive, or complementary, multiplication is secured by the depression of the negative multiply key 640 (FIGS. 1 and 24). This key is mounted on a key stem 641 similar in construction and mounting to the key stem 611 of key 610 or key stem 541 of key 540. This key stem, at its lower end, carries a pin 642 which is engaged within a slot 643 formed in the front end of a negative control arm 644.

This lever, from this point rearwardly, is similar in shape to that of the accumulate multiply control lever 614, and lies immediately adjacent to it. It is also pivoted on the shaft 615 (FIG. 20) and has a downwardly extending rear end of the same shape and size as that of the accumulate control lever 614 (see FIG. 22). This negative control lever 644 carries a roller 645 adjacent its rear end, which roller overlies the upper edge of a negative control link 646. This negative control link 646 is pivotally mounted on the pin 585 (FIG. 20), and lies immediately to the right of the additive control link 583. It is formed with an upper extension 647 (FIG. 22) which engages the roller 477 carried by the shift control lever 455. Thus, the negative control link 646 is held depressed (along with positive control link 583) by the roller on arm 455, when the machine is not operating in multiplication, or during multiplication when the operative multiplier segment 408 returns to the "0" position to initiate a shifting operation. The link 646 also has a downwardly and rearwardly extending projection 648 which is provided with a shoulder 649 adapted to engage a pin 650 on the lower end of the lever 588. It follows that when the negative multiply key 640 is depressed, the negative control link 646 is enabled to rise and the shoulder 649 engages the pin 650 to condition the machine for subtractive digitation. Thereafter, upon the rocking of the bellcrank cam follower 584, the lever 588 and shaft 165 are rocked (clockwise in FIG. 20 or counterclockwise in FIG. 22) to control the machine for subtractive operation.

The depression of the negative multiply key 640 and the rocking of the subtractive control lever 644 (clockwise in FIGS. 20 and 24) is also effective to rock the interponent lever 620, as the pin 621 on the forward end of that lever extends to the right sufficiently to underlie the lever 644 also. Thus the depression of the negative multiply key 640 is effective to initiate a machine operation and to disable the clearing mechanism, so that the carriage is shifted to the extreme left-hand position and multiplication initiated in a subtractive direction, without clearing of the registers.

(4) *Multiplication restore.*—It has been mentioned that as the operative one of the multiplier segments 408 returns to its "0" position (shown in FIGS. 20 and 22), the consequent rocking of the shift control lever 455 is effective to initiate two shifting operations: in one of which the register carriage 80 is shifted one order to the right, and in the other of which the multiplier carriage 398 is shifted one order to the right. It is conventional in the machine with which this invention is associated, as described in the Friden multiplier Patents Nos. 2,371,752 and 2,399,917 previously mentioned, to restore the projected pin 401 of that order to its inoperative position as the multiplier carriage is shifted to the right. It is customary to secure this restoration by means of apertures 413 (FIG. 20) in the lower end of the value pins 401, which apertures are engaged by cam-shaped teeth (not shown herein but fully described in said patents) that project into these apertures when the multiplier carriage 398 is shifted one order to the right. The cams on these restore teeth become effective to retract the pins in the second shifting cycle. As multiplication in the operative order is completed and the multiplier carriage is shifted, the pins 401 are retracted, which would allow the associated segment to release to the "9" position were they not held in the adjusted position by the repeat multiplier mechanism described in the next section. When the carriage is completely shifted to the right, means is provided for returning all of the released sectors 408 to their "0" positions and to again latch them on the respective "0" latches 400. The means for so restoring the multiplier sectors is shown in FIG. 22.

An arm 660 is mounted on the right end of the shaft 409 which carries the various segments. This arm carries a long pin, or bail, 661 which is adapted to engage one of the spokes of each of the multiplier segments 408. The lower portion of the arm 660 is formed as a gear segment 662, which segment constantly meshes with a gear 663. The gear 663 is rotatably mounted on the right frame plate 404 of the multiplier carriage 398 by any suitable means, such as pivot stud 664. A second gear segment 665 meshes with the idler 663, which segment is also pivotally mounted on the frame plate by any suitable means, such as pivot stud 666. A roller 667 is adapted to be engaged by a snail cam 668 which is mounted on the constantly rotating auxiliary drive shaft 336, the cam being located on this shaft in a plane to engage the roller 667 when the multiplier carriage 398 is shifted one order to the right of its home position, or two orders to the right of the effective position of the highest order segment 408. The respective segments rotate (counter-clockwise in FIG. 20 and clockwise in FIG. 22) upon the insertion of values into the multiplier unit. In the overshift cycle of the multiplier carriage, the cam 668 engages roller 667, thereby rocking the two gear segments and the idler. The rocking of arm 660 rocks bail 661, first to a segment restoring position (in a counter-clockwise direction in FIG. 22) and then permits it to return to the home position shown. When the bail 661 rocks to the extreme position, it has restored all of the segments to a "0" position and enables all of them to be relatched upon the respective "0" latches 490 (shown in FIG. 20).

The second, or overshifting, operation following the return of the highest order segment 408 to its "0" position is caused by an ear 416 carried on the left end plate 404 of the multiplier carriage 398. This ear engages the ear 456 on the shift control lever 455 and holds it in a shift initiating position, when the multiplier carriage is in its home position. When the highest order segment 408 returns to its "0" position, the upper end of this segment rocks the lever 455 to initiate a shift cycle, during which cycle the multiplier carriage 398 shifts one order to the right (but which does not shift the register carriage 80, as has heretofore been explained). Thereupon the ear 416 causes a second shift, which is the overshift that operates the restore mechanism. It has already been mentioned that this overshift also is normally effective to release the latches 556 or 558, as the case may be.

During the restore cycle the multiplier initiating levers 435, 439 are returned to their latched positions shown in FIG. 24. At this time, of course, the return of the carriage to its overshift position has, by the overrocking of the bellcrank 407 (FIG. 20), released the latch arm 560. Normally, operation of arm 560 releases whichever multiplier control key controlled the operation, and the key is, therefore, enabled to rise. As a result thereof the automatic shifting and clear mechanism is disabled, the power switch is permitted to open, and the clutch is permitted to become disengaged. Thus the two latches 442 and 443 are resiliently returned to their normal position and are enabled to latch the arm 435 in its inoperative position upon its return to that position. The arm 435 is raised to its inoperative position during the overshift cycle by two cooperating means operating simultaneously: (1) The release of shaft 204 (FIGS. 14 and 15) enables it to return to its normal position, thereby rocking the shaft 514 (FIGS. 17 and 24) in a clockwise direction. A pin 669 on the upper arm of the U-shaped lever 515 engages a forward extension of the lever 435, thereby lifting it to the inoperative position shown; (2) a restore arm 670 (FIG. 24) is rigidly secured on the left end of the transverse shaft 557, whereby a rocking of this shaft (clockwise in this figure) causes the arm 670 to engage pin 449 and lift arm 435. This shaft is operated, at this time, by the engagement of nose 562 (FIG. 20) of arm 414 of bellcrank 407 with restore arm 560, the operation of which is more fully described in the patent to Friden No. 2,399,917. In normal operation, the machine is restored to its normal condition upon the overshift of the multiplier carriage. It can be noted here, however, that in split operation, this restoration during the first overshift cycle will be blocked by means which can better be described later.

(J) *Repeat Multiplication Mechanism*

For many years the machine shown and described herein has contained a "repeat multiplication" mechanism, by means of which a multiplier factor can be inserted in the multiplier value keys 393, 394 and the machine then conditioned for an unlimited number of repeat operations by that multiplier. For the most part the mechanism is essentially that described in the patent to Friden and this inventor, No. 2,376,997 of May 29, 1945. This mechanism contains three major elements: (1) a control key, or linkage; (2) means for locking the multiplier value in the multiplier control segments 408; and (3) means for returning multiplier carriage 398 to the proper ordinal position. These elements will now be described briefly in sequence.

(1) *Repeat key.*—A repeat key 675 (FIGS. 1 and 24) is mounted on a slide 676 (see FIG. 20) that is slidably mounted in brackets on the multiplier top frame plate 395. A spring 677 tensioned between a pin 633 on the slide and member 835 resiliently biases the slide 676 to its rearward, or inoperative, position, but a customary detent and centralizer (not shown) latches the slide 676 in either its rearward, inoperative position or in its forward and repeat position. The spring 677 is effective, however, to bias the slide to the former position whenever it reaches the midpoint between the two. A pin 678 carried by the slide 676 is embraced within a diagonal slot 679 that is formed in a lever 680 that is pivotally mounted on the multiplier upper frame plate 395 by any suitable means, such as pin 681. As is seen in FIG. 20, the pulling of the key 675 and key stem member 676 forwardly from the inoperative position shown results in rocking of the arm 680 (counter-clockwise in this figure). A nose on the rear end of the arm 680 engages an ear 682 formed on the rearwardly extending leg of a bellcrank 683 that is pivoted at its elbow, as by pin 684 carried by a bracket extending from the lower multiplier frame plate 396. A slot in the other leg of the bellcrank 683 engages a pin 685 carried by the upwardly extending arm of a second bellcrank lever 686 that is pivoted at its elbow on a stud 687 extending to the right from the left side control plate 66. Thus the forward translation of the key 675 (to the right in FIG. 20) is effective to rock the second bellcrank 686 (clockwise in this figure), which rocking is effective to control the resetting of the multiplier segments 408 in the selected position and to determine the extent of escapement of the multiplier carriage 398.

(2) *Resetting multiplier segments.*—A long longitudinally extending link 693 is connected at its front end to the upwardly extending arm of the latching bellcrank 686 by any suitable means, such as pin 694. At its rear end, the link 693 is connected to a two-armed lever 695, as by pin 692; which lever 695 is pivotally mounted on the auxiliary frame plate 65 by screw stud 696. A spring 697 biases the lever 695 (in a clockwise direction in FIG. 20) and pulls the link 693 toward the rear, and hence the bellcranks 686 and 683 to the position shown in this figure. A pin 698 carried by the upper end of the lever 695 extends through an aperture in the auxiliary frame plate, the right end of which pin is embraced within a slot formed in the rear end of a bellcrank 699 (see also FIG. 22). The bellcrank 699 is rigidly secured to a sleeve 700 that is rotatably mounted on a short shaft 701 extending between the left-hand frame plate 64 and the auxiliary frame plate 65. An arm (not shown) on the right end of the sleeve 700 lies in the same angular position as the forwardly extending arm of the bellcrank 699 and the two support a transverse rod, or bail, 702. The bail 702 is embraced within a slot formed in the upwardly extending end of an arm 703 that forms a right end of a bail 704 pivotally mounted in the multiplier carriage 398 by any suitable means, such as on a tie rod 705, and carrying a latching ear 706, as shown in FIG. 20.

Each of the multiplier segments 408 carries a repeat latch disk 710 which actually (but not shown in these drawings) is pivotally mounted on the hub of the associated segment. Each latching disk is resiliently held in a retracted position with respect to its coordinal segment 408 by a light spring 711 tensioned between an ear 712 carried by a spoke of the coordinal segment 408 and a spring seat formed in the latching disk 710. As a segment rocks to a value position (counter-clockwise in FIG. 20) the ear 712 positively forces the latching disk 710 in the same direction and through the same angular increment. The latching disk is provided with a series of latching teeth 713, the interdental spaces between which are adapted to be engaged by the latching ear 706 carried by the bail 704. The operation of the repeat key is effective to rock the bail 704, whereby its ear 706 engages an interdental space between the teeth 713 of latching segment 710, whereby the segment is latched in the adjusted position. Thereafter, during the ordinal operation of the machine in multiplication, the segment can be returned to its "0" position in the normal manner, but the latching segments 710 remain in the adjusted position. During the restored cycle, the segments are returned to their "0" position by the restore bail 661. In repeat operation, however, at that time the "0" latches 400 are disabled, so that the segments are immediately released to rock toward an extreme value position by virtue of the power stored in their springs 410. During such rocking, the segments are stopped in the selected position by the engagement of the ear 712 on the segment 408 with the corresponding shoulder formed on its disk 710.

The "0" latches 400 are controlled by a bail 720 (FIG. 20), the legs of which are pivotally mounted on the transverse shaft 201. The bail 720 lies immediately behind the lower end of the "0" latches 400, so that rocking of the bail (clockwise in this figure) rocks all of the "0" latches 400 to their disengaging positions. A pin 721 on the left leg of the bail 720 is embraced within an aperture formed in the lower end of a link 722 (FIG. 24). The upper end of the link 722 is pivotally connected to a second link 723 by any suitable means, such as pin 724. The second link 723 is pivotally and slidably mounted on the left-hand control plate 66 by any suitable means, such as by a slot 725 in the upper end of the link embracing a pin 726 riveted to the left side control plate 66. The angular position of the lower end of the link 723 is controlled by a link 727, the forward end of which is mounted on the pin 694 (FIG. 20) carried by the upper arm of the bellcrank 686. It is apparent that the rocking of the bellcrank 686 to its operative position (clockwise from that shown in this figure) pulls the link 727 forwardly and the return of the parts to their normal condition pushes this link rearwardly. Adjacent its rear end, the link 727 is offset to the left to extend through an aperture in the control plate 66 and at its rear end carries a pin 728 which is embraced within a slot 729 formed in a projection on the lower end of the link 723. A small light spring (not shown herein but lying behind the link 898) connects links 723 and 727, thereby resiliently biasing the link 723 to follow the position of link 727. A shoulder 730 on the lower end of link 723 is adapted to engage a square pin 731 rigidly secured on the multiplier initiating lever 435 as this lever is returned to its latched and inoperative position during the restore cycle, when this link 723 has been positioned forwardly so that the shoulder overlies the pin. The upper end of the link 723 underlies an escapement control lever 732, so that when the link 723 is lifted by arm 435, the arm 732 is rocked to release the escapement mechanism and permits the multiplier carriage 398 to escape toward its extreme left-hand position. Simultaneously, the lifting of link 723, through link 722 and pin 721, rocks the bail 720 (clockwise in FIG. 20) to release all of the "0" latches 400. Thereupon all of the segments are released to return to the position determined by their respective latching disks 710.

(3) *Carriage escapement control.*—The bellcrank 686 (FIG. 20), when positioned by manipulation of the repeat key 675, is effective to determine the extent of the escapement of the multiplier carriage 398. This is secured by means of a nose 737 formed on the end of the forwardly extending arm of the bellcrank 686. This nose 737 is adapted to engage the interdental spaces between teeth 738 formed on a rack member 739. The rack member, as is conventional in the machine with which my invention is associated, is pivotally mounted on the leftwardly extending arm 414 of the bellcrank 407. The forward edge of the arm 414 engages a pin 740 carried by the rack 739, so that the rocking of the bellcrank 407 (counter-clockwise when viewed from above, or rightward movement of the arm 414 when viewed from the left, as in FIG. 20) positively positions the rack 739. Normally a light spring 741 retracts the rack 739 whenever the bellcrank 407 is returned to its home position. However, when the repeat key 675 is operated to rock the bellcrank 686 (clockwise in FIG. 20), the nose 737 thereof engages one of the interdental spaces in the rack, and the rack member 739 is thereby locked in that position. Thereafter, the bellcrank 407, and especially arm 414, is rocked away from it as the multiplier carriage 398 is moved toward its home position in each interordinal program. In the restore cycle of the machine, the escapement latch lever 732 (FIG. 24) is operated to release the escapement mechanism, whereby the carriage 398 moves to the left under the force of spring 417 until the arm 414 of the bellcrank 407 engages the pin 740. This pin and its rack 739 are, of course, locked in the position determined by the position of the carriage at the time the repeat key was operated. Thus at the end of the restore cycle, when the repeat mechanism is conditioned for operation, the multiplier carriage 398 is returned to its proper position and the multiplier segments 408 are released to return to the position determined by the latching disks 710. It follows that the value originally set in the mulliplier unit is automatically reset therein.

It can be mentioned that, in this preferred form of repeat multiplication mechanism, certain interlocks are provided which are not pertinent to the present invention but which prevent the operation of the value keys 393, 394 after the repeat key 675 has been moved to its forward or repeat condition.

K. *Multiplier Clearing Mechanism*

It is customary, in the preferred machine, to provide means for clearing the multiplier mechanism when desired. Such a mechanism is under control of a clearing key 750 (FIGS. 1 and 19). This key is mounted on a key stem 751 slidably mounted in the frame plates 395 and 396 in a manner similar to the multiply key 540 and is resiliently biased to its upper position. The lower end of the key stem 751 carries a pin (not shown), which pin is embraced within a slot (likewise not shown) formed in the forward end of a control bellcrank 752 (FIG. 19). This bellcrank is pivotally mounted at its elbow on the intermediate frame plate 63 by any suitable means, such as screw stud 753. Its lower arm carries a pin 754 that underlies the rear end of the link 527. It is apparent that the depression of the key 750 and the consequent rocking of bellcrank 752 (counter-clockwise in the figure) lifts the rear end of link 527 so that the slot formed therein is disengaged from pin 528. In this condition of these parts, the operation of the override pawl cannot initiate a multiplication operation.

The rear end of a link 755 is pivotally mounted on the lower arm of the bellcrank 752, and extends forwardly to a point adjacent the initiating arm 549. A slot 756 in the forward end of the link engages a pin 757 riveted to the arm 549, so that the rocking of the bellcrank 752 (counter-clockwise in FIG. 19) is effective to rock the arm 549 (clockwise in this figure) and thereby cause engagement of the clutch and the closing of the motor switch. A pin 758 on the link 755 engages the forward edge of the rocker 631 which controls the positioning of the clear clutch pusher link 298. The rearward translation of link 755, therefore, rocks the control rocker 631 (counter-clockwise in this figure) to disable the clearing mechanism, so that a multiply clearing operation will not affect any registration then standing in the register nor cause a multiplication operation, although it does initiate machine operation.

The rocking of the bellcrank 752 causes the rear edge of the downwardly extending leg to engage a pin 759 (see also FIG. 22) carried by the shift control arm 480 and extending to the right through an aperture in the intermediate frame plate 63. The rocking of bellcrank 752 thereby rocks the arm 480 (clockwise in these figures) to cause the lifting of the feed pawl 484 into its operative position. This causes the multiplier carriage 398 to be shifted to its extreme right-hand position and effect a restore operation to clear the multiplier mechanism.

It is customary to provide an interlock between the repeate multiply key 675 and the multiply clear key 750, so that the multiply clear key 750 cannot be depressed when the repeat multiply key is in its forward, or repeat, position. This interlock is standard in the machine with which my invention is preferably associated and consequently it is not shown herein.

II. SPLIT-MULTIPLICATION MECHANISM

The primary purpose of the present invention is to provide a mechanism to enlarge the capacity of the customary ten-order keyboard, twenty-order register machine in split-multiplication work to a maximum of two five-digit multiplicands multiplied by a single five-digit multiplier without intermingling the products. In my invention I set the first multiplicand factor in the right five orders of the main keyboard and the second multiplicand factor in the left five orders thereof, and then set the multiplier (a maximum of five digits) in the multiplier keyboard 393, 394. Then, upon depression of one of the multiplier control keys 540, 610 or 640, the machine performs a first multiplication operation in which the left half of the main keyboard 100 (the highest five orders thereof) is disabled. In this condition of the machine it is obvious that the first multiplicand, which is set in the right half of the keyboard (the lowest five orders thereof) is multiplied by the multiplier factor. In the most extreme condition, this will produce a product of ten orders in the right-hand ten orders, or right-hand half, of the register. During this operation, the multiplicand values standing in the left half of the keyboard can have no affect upon digitation, so that those values are not entered into the register. After the first stage of the split-multiplication, the right half of the main keyboard selection mechanism is disabled and the left half is enabled, and the multiplication is repeated—the repeat multiplier mechanism having been set to the repeat condition at the beginning of the first phase of operation. Thus, the product of the second phase of multiplication is accumulated in the left half, or upper ten orders, of the register and the two products have been accumulated separately in the two sections of the register. By this means it is possible, in a ten-order keyboard and twenty-order register machine, to accumulate two separate and distinct products resulting from the multiplication of a five-digit multiplicand by a maximum of a five-digit multiplier. The mechanism by means of which this result is accomplished will be explained in detail in this section.

In its preferred embodiment, the split-multiplication mechanism of my invention is selectively operable by the operator. It will be understood that, if desired, a machine could be designed following the teachings of this invention which would invariably operate to perform split-multiplication. However, it is preferred that the machine be operable in the conventional manner, i.e., the multiplication of a ten-digit multiplicand by a ten-digit multiplier, as well as operable to perform split-multiplication work. This invention will, therefore, be described in connection with the embodiment which enables the operator to determine whether the operation is normal multiplication or "split."

A. Conditioning Key

In its preferred form, the conditioning of the machine for conventional or split-multiplication is under the control of a key 800 (FIGS. 1, 24 and 26) which is secured to a key stem 801 projecting upwardly from a slide 802 mounted on the left-hand control plate 66. The key stem 801 extends upwardly through the machine cover 72 through any suitable aperture, such as slot 804 (FIG. 1). The conditioning member, or slide, 802 is slidably mounted in the machine by any suitable means, such as a pair of slots 805 in the member embracing a pair of pins 806 riveted to, or otherwise rigidly secured on, the control plate. This slide is positionable, in the preferred form of my invention, in three separate positions: Normal multiplication (which, in this embodiment, is the extreme rearward position of the slide); a split-multiply, or intermediate position, in which the machine is conditioned for a single repeat operation; and a "Repeat" position (preferably an extreme forward position) in which the machine is set for repeat operation and the multiplier factor is locked in the keyboard until released therefrom by the manual return of the repeat key 675 to its rearward, or inoperative, position and the operation of the clear key 750 to clear the multiplier carriage. These three positions are indicated in FIG. 1 by indicia on the machine cover 72 of "NORMAL," "5×5&5" and "CON. MULT." (the latter standing for "constant multiplier"). It should be understood that in the drawings herein, the control key 800 is shown in the intermediate, or split-multiplication, position.

It is preferred that the conditioning slide 802 be resiliently biased to the intermediate position, although this is not important. In its preferred form, the rear end of the slide 802 is provided with an oblique cam face 807. This cam face is engaged by a pin 808 riveted to, or otherwise rigidly secured on, an arm 809 that is rigidly mounted on a transverse shaft 810. A relatively strong spring 811 strongly biases the arm downwardly (clockwise in FIGS. 24 and 26) and consequently urges the slide 802 forwardly until the pin 808 rests in the angle formed by the cam face 807 and the upper edge of a tail 812 (FIG. 24) extending rearwardly from the slide 802. The tail 812 prevents the pin 808 from becoming disengaged with the rear end of the slide when the slide is pulled to its forward, or constant multiply, position.

When the indicating key 800 is pulled to its extreme forward position, the slide 802 remains in that position by means of a latch associated with the conditioning member 845 (see FIG. 26) set by the key and slide and which will, therefore, be more readily understood if described later in connection with that member. In such a situation, the force of spring 811 has no effect upon the slide as the pin is riding on the tail section 812. On the other hand, the slide can be latched in its rearward position by means of a latch being connected to a setting key 820 (FIGS. 1, 21, 24 and 26). This key is mounted on the forwardly and upwardly extending arm of a bellcrank 821, which is pivoted at its elbow on a pin 822, extending to the left from the control plate 66. A strong spring 823 tensioned between the downwardly extending arm of the bellcrank 821 and a stud secured to frame plate 66 biases the bellcrank (counter-clockwise in FIGS. 24 and 26) toward the raised position of the key 820. The bellcrank 821 carries a roller 824 which is adapted to engage the front end of the control slide 802 when the key 820 is in its raised position and the slide 802 and its indicating key 800 are in their rearward position. However, when the key 820 is depressed, roller 824 releases the key slide to the force of spring 811, and thereafter engages the lower edge of the slide to prevent the rise of key 820.

(1) *Limit multiplier entries.*—One of the first conditions which must be controlled upon setting the machine for split-multiplication work, is to limit the number of multiplier digits to a maximum of five. This is readily accomplished by means of the mechanism shown in FIG. 21. An interponent arm 830 is hung on the bellcrank 821 by any suitable means, such as pivot stud 831. The interponent is held against rotation by means of a slot 832 formed in the lower end thereof, which slot embraces a screw 833 secured to the inside of the left-hand control plate 66. The forward edge (to the left in FIG. 21) of the arm 830 carries a cam nose 834. When the key 820 is depressed (as it is in this figure), this nose engages the left-hand leg 835 of a bail 836 that is pivotally mounted on a transverse shaft 1102 extending from the intermediate frame plate 63 through the left-hand control plate 66. The bail extends to the right a distance sufficient to enable its right leg 838 to engage the left frame plate 404 of the multiplier carriage 398, when that carriage has been permitted to escape five orders to the left from its home position. The bail 836 is resiliently biased toward an inoperative position by the spring 677 (see FIG. 20) which biases the repeat key 675 toward the rear of the machine. Thus, when the key 820 is in its elevated position and the machine is conditioned for conventional multiplication, the bail 836 will be rocked (counter-clockwise from the position shown in FIG. 21) and the bail misses the left-hand frame plate 404 of the multiplier carriage. However, when the key 820 is depressed, the nose 834 on the interponent 830 rocks the bail 836 (clockwise in FIG. 21 and counter-clockwise in FIG. 20) to the position shown. When so rocked, the bail 836 will engage the left frame plate 404 of the multiplier carriage, and so will block leftward movement of the multiplier carriage 398 after it has escaped five orders to the left. This mechanism guarantees that not more than five digits can be inserted in the multiplier unit for a split-multiplication problem, and serves to notify the operator that the capacity of the machine has been reached or that it should be changed from a split-multiply condition to normal.

B. *Master Control Member*

The movement of the conditioning key 800 and its slide 802 from the normal to the split-multiply position is effective to move a master control member, or link, 845 (FIG. 26) from a position in which it disables the various parts of the split-multiplying mechanism to a position in which it enables them for operation. In its preferred form, the master control member 845 is mounted for vertical movement on a pair of parallel arms 846 and 847 to which it is connected by any suitable pivotal mountings, such as pins 848 and 849, respectively. The upper arm 846 is rigidly mounted on a sleeve 850 (FIG. 24) that is rotatably mounted on the pin 822. The right, or inner, end of the sleeve carries a pair of slightly offset arms 851 and 852. The former arm, which extends upwardly from the sleeve 850, is provided with a slot 853 which embraces a pin 813 carried by the slide 802. It follows that the translation of the conditioning key 800 from its normal rearward position to its intermediate, or split-multiply, position, rocks the arm 851 (clockwise in FIGS. 24 and 26), thereby rocking the arm 846 in the same direction and lifting the master control member 845 to the position shown in FIG. 26. The lower arm 847 is preferably made in the form of a bellcrank, and is pivotally mounted on the left end of shaft 623. One purpose of forming this link as a bellcrank is to provide means for detenting the control member 845 in either of its adjusted positions. Such a detent mechanism can be secured by means of a roller 854 (FIG. 29) which is adapted to engage either of two notches 855 formed in the lower edge of a detent arm 856. This arm preferably is rotatably mounted on the left end of shaft 201 and is biased into engagement with the roller 854 by any suitable means, such as a spring 857.

Preferably the upwardly extending leg of the bellcrank 847 is utilized also as an interlock to prevent depression of any of the multiply keys unless the master control member 845 is accurately positioned in one of its three operative positions. This is readily secured by extending the upwardly extending leg to a point adjacent the pin 623 (as is shown in FIG. 29) that is mounted in the upper end of the arm 624 rigidly secured on the left end of shaft 201. It will be recalled that this pin is engaged by the downwardly extending projection 622 of the interponent arm 620, so that neither key 610 nor 640 can be depressed if movement of pin 623 is blocked. Likewise the depression of the multiply key 540 is prevented, because this key also rocks shaft 201; and if the pin 623 is blocked from operation it is obvious that the shaft cannot rotate. The upwardly extending arm of bellcrank 847 is provided with an arcuate face 858 which underlies the pin 623 if the bellcrank 847 is in an intermediate position. If the bellcrank 847 is in the normal multiply position (counter-clockwise from that shown in FIG. 29), the pin 623 will just miss the forward edge of the leg, which preferably is formed with an indentation 859 to enable the pin 623 to rock. In the intermediate position for controlling the normal split-multiplication operation, there is a notch 860 which also enables the pin 623 to move downwardly. Finally, the rear end of the arcuate face 858 is projected rearwardly from the notch 860, so as to prevent depression of the pin 623 if the master control member 845 lies in a position intermedaite normal split-multiplication and a "constant" multiply position, as by means of a finger 861, the rear edge of which is so formed as to permit the depression of pin 623 and the consequent rocking of arm 624. Preferably, as shown, these various portions of the upper edge of the bellcrank can be so shaped as to cam it to a full position if only slightly removed therefrom. However, in any event, if the master control member 845 is not properly positioned, operation of the multiply keys will be prevented, or the operation of the multiply keys will immediately force it to the operable position before the machine starts to cycle, as it will be recalled the rocking of shaft 201 initiates machine operation by closing the motor switch and engaging the clutch.

The master control member is operative, when positioned in the split-multiply position shown in these figures, to condition the machine for the split-multiplication operation by:

(1) Setting to operative position an actuating mechanism which will be effective in the attempted overshift of the register carriage to disable the left-hand side of the selection mechanism.

(2) Conditioning a latch for operation which will disable the release of the operated multiplier control key during the multiplier overshift cycle at the end of the first phase of the multiplication operation.

(3) Conditioning means for positioning the repeat mechanism to its operative position during the first cycle of the machine operation.

(4) Conditioning the right shift mechanism for operation at the end of the first stage of the split-multiplication, so that in the event the multiplier factor contains less than five digits, the right shift will be continued to the sixth carriage position in order that the second phase can proceed properly.

(5) Conditioning mechanism that will be effective to reoperate the multiplier control latch 443 to start the second phase operation when the register carriage shifts to the sixth ordinal position.

These various mechanisms controlled by the master control link 845 will now be discussed in sequence.

(1) *Enable operation of the selection disabinig mecha-*

*nism.*—The mechanism for blocking the operation of the selection slides is controlled by a gear segment 870 (FIG. 26). The clockwise rotation of this gear segment is effective to disable the selection mechanism on the left half of the keyboard, and its counter-clockwise position is effective to block the selection mechanism on the right half of the keyboard. In the intermediate position shown it is ineffective to block either part of the main keyboard. This gear segment 870 is rocked to its first phase position (clockwise from the position shown in FIGS. 26 and 29 to that shown in FIG. 31) during the cycle in which the machine attempts to shift the register carriage one order beyond the left-hand terminal position (by the rocking of the so-called "override" pawl). This segment 870 is latched in this position until the register carriage 80 has shifted to the sixth ordinal position, at which time the segment is released to its central, and inoperative, position shown, and then is immediately rocked counter-clockwise to operate the mechanism for disabling the right half of the keyboard. This gear segment 870 is rigidly secured to the left end of a control shaft 871, the left end of which is journalled in the left-hand control plate 66 and the right end of which is preferably journalled in a bearing bracket 872 which is mounted on the rear frame plate 107 of the keyboard frame (FIGS. 2 and 6 to 9, inclusive).

The gear segment 870 is driven by a driving segment 877 (FIGS. 26, 29 and 31) which is pivotally mounted on a pivot stud 878 extending to the left from the left side control plate (FIGS. 24 and 29). It carries a roller 879 (FIGS. 26 and 29) which is adapted to be engaged by a shoulder 880 formed on the forward end of a longitudinally extending link 881. The rear end of the link 881 is pivotally connected to an arm 882 by any suitable means, such as pin 883 (FIGS. 26 and 31). The arm 882 is rigidly mounted on a shaft 884 extending transversely across the rear of the machine, the left end being journalled in the left side control plate 66 and the right end being journalled in the right frame plate 62 (FIGS. 13 and 18). On its right end the shaft 884 carries an arm 885 (FIG. 18) rigidly mounted thereon. A pin 886 on the upper end of the arm 885 supports the rear end of a short link 887, the forward end of which is mounted on the pin 387 which interconnects the override bellcrank 383 and the link 384. It is obvious that the rocking of the bellcrank 383 from the operation of the override pawl 375 (FIG. 13) and its associated slide 386, is effective to rock the shaft 884 (clockwise in FIGS. 18 and 26), and hence pull the link 881 rearwardly. This operation of the link 881 obviously occurs at each operation of the override pawl, and is operative only during such operation, and then only momentarily.

Normally the link 881 is held in a disabled position, i.e., when the master control member 845 is in its normal condition, so that the shoulder 880 cannot engage the roller 879, by means of a pin 862 carried by the master control member 845. This pin 862 extends to the right from the right face of the member 845 in order to overlie a forwardly extending tail 888 (FIGS. 29 and 31) on the link 881. When the master control member is in its lower, or normal multiply, position (downwardly from that shown in FIG. 26), the pin 862 will lie immediately above the tail 888 and thus prevent the forward end of the link from rising to enable the shoulder 880 to engage the roller 879.

It should also be noted here that the forward end of the link 881 is normally held depressed by a second pin 893 which is riveted to the rear leg of a bellcrank 894 (FIG. 24). The bellcrank 894 is pivotally mounted on a pivot stud 895 extending outwardly from the left-hand control plate 66. A pin 896 on the other leg of the bellcrank 894 is embraced within a slot 897 in the rear end of a link 898. The forward (right, in this figure) end of the link is pivotally connected to the lower end of a repeat key setting lever 983, as by means of pin 982.

The operation of this setting lever 983 can be described in connection with the setting of the repeat mechanism hereafter in Sub-section 3. However, the fact that this lever also controls the positioning of link 881 should be kept in mind. A spring 900 tensioned between seats in the bellcrank 894 and the link 898 resiliently biases the two members to a retracted position, although they are normally held distended (as shown in FIG. 24) from the positioning of lever 983.

A third latch for preventing operation of the actuator link 881 is controlled by the depression of one of the multiply keys. The mechanism for this latch is shown in FIG. 29 and comprises a lever 905 (FIG. 29) that is rockably mounted on a pivot stud 906 extending outwardly from the left control plate 66. The forward end of this lever (to the right in this figure) is provided with a slot 907 that embraces the pin 623 on the upper end of the arm 624. It will be recalled that this pin is engaged by the projection 622 of the interponent lever 620 upon depression of either the accumulate multiply key 610 or the negative multiply key 640 and that the shaft 201 is also rocked by depression of the normal multiply key 540. Thus, upon depression of either of the three multiply control keys, the bellcrank lever 905 is rocked (clockwise in this figure). The rear end of the lever is provided with an arcuate edge 908 which engages a pin 909 secured to the lower end of a link 910, the upper end of which is pivoted to the actuator link 881 by any suitable means, such as pin 911. The link is guided for controlled oscillation by means of a slot 913 which embraces a pin 912 carried by a link 1181, as will hereafter be described. It should be noted, however, that the link 1181 reciprocates only during split-multiplication operations, so that the link 910 will not oscillate during normal multiplication operations even though the lever 905 will be rocked, so that pin 909 will be released.

In normal multiplication operations the link 881 is held depressed by: (1) the pin 862 on the master control link 845; (2) the pin 893 controlled by the repeat multiplication mechanism; and (3) the latch arm 905 and its effect on pin 909. It is apparent that the link 881 cannot be operated until three conditions exist: The master control member 845 is in its raised position (which is accomplished by means of the movement of the conditioning key 890 to its intermediate or forward position); by the operation of the repeat key 675 (which is effected during the first cycle of machine operation in split-multiplication); and the depression of one of the multiplier control keys. When these three conditions exist, the link can rise from the force of its spring 889, whereupon the link 881 becomes operative during the override cycle to set the selection blocking mechanism. This results in the rocking of the driving segment 777 (counter-clockwise from the position shown in FIGS. 26 and 29 to the position shown in FIG. 31), and that, in turn, rocks the setting gear segment 870 (clockwise in these figures).

It should be noted here that the segment 870 is latched in either adjusted position, and is resiliently biased to a central, inoperative position by a spring 873 (FIG. 31) tensioned between an ear on the gear segment and a stud 922 carried by a latch member 920 (FIGS. 24 and 31). The latch member is pivotally mounted on a stud 921 secured to the adjacent control plate and is formed as a three-armed lever. The upper end of this three-armed lever carries the pin 922 which serves as a seat for spring 873, thereby biasing the latch 929 to an operative position (counter-clockwise from the position shown in FIG. 24 to that shown in FIG. 31). The rearwardly extending, or latching, arm is formed by two latching shoulders 923 and 924 separated by an arcuate section 925, all three of which are adapted to engage a pin 926 riveted to the right, or inside, face of the gear segment 870. Normally the segment 870 is strongly biased to its central, or inoperative, position by means of a centralizer arm 927 (FIG. 24) pivoted on the shaft 457 and strongly biased by means of a spring 928 into engagement with the pin 926. The forward end of the arm 927 is provided with opposing cam faces 929 as shown. Thus, normally, the segments are held in the centralized and inoperative position shown in FIGS. 24, 26 and 29, but can be latched in either the first or second stage operative position by means of the latching arm 920 and the engagement of its shoulders 923 or 924 with the pin 926. The third arm of latch 920 is utilized to release the latch at the end of the first phase of operation, i.e., during the overstroke required for restoration of the multiplication mechanism, heretofore described. This releasing will be described in connection with that phase of the operation, under heading "C" below.

The rocking of the segment 870, and consequently its shaft 871, is utilized to set the selection blocking gates, as will now be described. The shaft 871 carries an arm 935 (FIGS. 6, 9 and 20). The free, or upper, end of this arm is connected by means of a link 936 to another arm 937 that is pinned to, or otherwise rigidly secured on, a transverse shaft 938 which extends from the left control plate 66 to the intermediate bracket 872. The shaft 938 carries a bail 939 which lies in front of the ears 144 on the respective live tips 138 of the various selection slides 126 and 127 (see FIGS. 2 to 9). Thus, when the actuating link 881 rocks the gear segments 877 and 870 (the latter clockwise in FIGS. 26 and 29 to the position shown in FIG. 31), the bail 939 is rocked in the same direction. When this is done the bail 939 forces the live tips of the selection slides 126 and 127 of the left-hand five orders of the keyboard rearwardly to an inoperative position, even though the selection bars themselves have been set to a value position. As the gear segment 870 is latched in this position throughout the first phase of the multiplication operation, all of the left-hand orders of the keyboard are disabled during this phase. I prefer to mount a stop arm 940 (similar to stop arm 950 shown in FIGS. 7 and 8, as will later be mentioned) on the shaft 938, the upper end of which arm is adapted to engage the rear frame plate 107 of the keyboard frame and thereby prevent overthrow of the shaft 938 and bail 939 and hence prevent too great a displacement of the live tips of the selection bars.

In the normal position of the bail 939 (shown in FIGS. 2 and 7), the bail lies forwardly of the projections 144 (directly behind bail 945 in the figures). It is apparent that a bail in this position clears ears 144 by an amount sufficient to enable the selection bars, and their live tips, to move freely even when extreme values are placed in the selection bars. It is only when the bail is rocked rearwardly (counter-clockwise in these figures) that it engages the ears 144 and forces the live tips of the selection bars rearwardly to a "0" position.

A second bail 945, which extends across the lowest five orders of the keyboard, is mounted on a shaft 946. This shaft preferably is coaxially aligned with shaft 938, as by insertion of the left end of the shaft 946 in a common bearing in bracket 872, as shown in FIG. 6. The right end of shaft 946 can be supported by any suitable means, such as a bearing bracket 947 carried by the right-hand frame plate of the keyboard frame. I prefer to provide the right-hand shaft and bail 946 and 945 with a stop arm 950 (similar to stop arm 940 mentioned above), likewise adapted to abut the rear wall 107 of the keyboard frame when the bail is rocked to its blocking position (as shown in FIG. 8).

The left end of this second shaft 946 carries a gear segment 948 (FIGS. 6, 7 and 8) which meshes with a similar gear segment 949 mounted on the right-hand end of shaft 871. By this means, the shaft 946 and bail 945 are rocked in a direction opposite to that of the first bail 939. This is illustrated particularly well in FIGS. 7 and 8, in which the depression of the "9" key 100 has set the selection slide of that order to the "9" value position.

In normal operation, when the blocking bails 939 and 945 are in their normal, ineffective position (shown in FIGS. 2 and 7), the ear 144 associated with that selection bar misses the bail 945, and consequently the selection gear 132 carried by the respective live tip 138 moves forward to the "9" position with respect to the actuator 150. In FIG. 8 the same parts are shown in the second stage of a split-multiplication operation, in which case the bail 945 on the right side of the machine has been rocked rearwardly (counter-clockwise in this figure) to engage the ear 144 of the live tip 138, thereby forcing the selection gear to a "0" position. Simultaneously the left-hand shaft 938 and its bail 939 have been rocked (clockwise in this figure) even further away from the respective ears 144. It will be obvious, of course, that the rocking of either bail 939 or 945 forwardly (clockwise in these figures) will have no effect upon the selection mechanism as it moves the bails further away from their respective ears 144 and hence they can have no effect upon the selection mechanism.

By the means just described, the two bails 939 and 945 are effective to block operation of the respective portions of the selection mechanism when either bail is rocked rearwardly. In the first phase of operation, the left-hand bail 939 is so rocked through the effect of the actuator link 881 on the gear segment 877 (FIG. 26). Therefore, throughout the first phase of operation the left-hand side of the keyboard is disabled. In the second phase, as will be subsequently described, the gear segment 877 is rocked in the opposite direction (clockwise in FIG. 29), thereby rocking segment 870 and the shaft 871 in the opposite direction (counter-clockwise in this figure). This second phase rocking of shaft 871, through the gearing 949, 948, rocks the shaft 946 in the opposite direction (counter-clockwise in FIG. 8).

(2) *Disable restoration of multiply key at end of first phase of split-multiplication.*—In the past the multiplier control key which initiated a machine operation was released during the overshift of the multiplier carriage. This release is effected through the engagement of the nose 562 of arm 414 of the escapement bellcrank 407 engaging the arm 560 on the key latching shaft 557 (FIG. 20). However, in split-multiplication work it is very desirable to keep, the control key latched in its operative position at the end of the first phase of the split-multiplication operation, thereby avoiding the necessity of a second depression to initiate the second phase of operation. In its preferred form the mechanism for so blocking the release of the multiplier control key is conditioned for operation by the master control member 845 rising to its operative position, but the actual latching takes place in the override cycle which occurs as the shifting mechanism attempts to shift the register carriage 80 beyond its left-hand terminal position. Actually, the latch is preferably set by the rocking of the gear segments 877 and 870.

It was already mentioned that the movement of the split-multiply conditioning key 800, and its slide 802 to their split-clear position, rocked an arm 851 (clockwise in FIGS. 24 and 26), and that this arm was connected by means of a sleeve 850 to the arms 846 and 852. The arm 852 supports the rear end of a link 1001, preferably by means of a pin, such as 1002, carried by the arm 852 and engaging the corresponding aperture in the rear end of the link. The forward end of the link 1001 has a slot 1003 which embraces a pin 1004 carried by the lower leg of a bellcrank latch lever 1005. The bellcrank latch lever is rotatably mounted on the shaft 1102 associated with the second phase setting mechanism to be described hereafter in Section D. This latching bellcrank 1005 is biased to a latching position (clockwise from that shown in these two figures) by gravity only—being latched in either of its positions by a detent 1015 to be described shortly. The forward end of the latch is provided with a hook 1006 adapted to engage a pin 1007 riveted to a forwardly extending link 1008. The rear end of the link 1008 is supported on the left-hand control plate by a suitable pin-and-slot connection 1009, and the forward end thereof is supported on a pin 564 rigidly secured to the latching arm 558 (FIG. 20). The link 1008 is resiliently biased to the rear (to the left in FIG. 24) by a suitable weak spring 1010 tensioned between the pin 1007 and a seat in an arm 1105, thereby normally pulling the link and resilient latching arm 558 rearwardly to its latching position. It will be recalled that when the multiplier carriage escapement bellcrank 407 was returned one step beyond its home position by the momentary shifting of the carriage one order to the right from its home position, the arm 414 of the bellcrank, through engagement with arm 560, rocks arm 560. Rocking of arm 560 normally rocks the latch arm 558 (clockwise in FIG. 20) to release the depressed multiply control key, as spring 563 is stronger than spring 1010. However, it is obvious that when the link 1008 (FIG. 24) is locked in its rearward position by engagement of its pin 1007 with hook 1006 (as shown in FIG. 31), then operation of the latch arm 558 (FIG. 20) is impossible. In that event, the rotatably mounted arm 560 is rocked during the overshift cycle, but the latch lever 558 is not released and the key is maintained depressed.

When the split-multiplier conditioning key 800 is in its rearward, or normal multiply, position, the pin 1004 (FIG. 24) on the latch lever 1005 abuts against the rear end of the slot 1003, and in that event, rocking of the latch lever is impossible. When the conditioning key 800 is moved to its split-multiply position, the link 1001 is moved rearwardly, thereby freeing the pin 1004 and hence freeing the latching bellcrank 1005 for rocking into engagement with the pin 1007.

The bellcrank latch 1005 is normally held in any adjusted position by means of a detent, which may comprise an arm 1015 (FIG. 26) pivotally mounted on a stud 986 and biased (in a clockwise direction in this figure) by means of a spring 1016 tensioned between it and the shaft 1102. The arm 1015 carries a detenting tooth 1017 which engages a pin 1018 (FIGS. 24 and 26) secured to the lower end of the vertical arm of the bellcrank latch 1005. This detent is effective to hold the latch 1005 in either adjusted position, so that the latch itself remains inoperative even though the conditioning key 800 was moved from its normal to its split-multiply position.

It is preferred that the latch 1005 be operated by the rocking of the gear segment 877 which occurs in the override cycle. This is readily accomplished by means of a link 1023 (FIGS. 24, 26 and 31), the forward end of which is pivotally mounted on pin 1018. A slot 1024 formed in the rear end of the link 1023 embraces a pin 1025 extending inwardly from the inside face of the gear segment 877. Hence, the rocking of this gear segment (counter-clockwise in these figures) during the overstroke cycle is effective to operate the bellcrank latch 1005, after a considerable amount of lost motion. The slot 1024 is relatively long, so that the latching bellcrank is not rocked until the rocking of the gear segment 877 is almost complete. Thereafter the gear segment can be returned, both to its neutral position shown in FIGS. 24, 26 and 29, and also in the second phase position in which this segment is rocked (clockwise from the neutral position shown in these figures). The pin-and-slot connection 1025, 1024 does provide that the latch 1005 will be effective so long as the gear segment 877 is in its first phase or counter-clockwise position shown in FIG. 31, but at all other times is free to be rocked, being subject to holding only by its detent 1015.

(3) *Condition means for operating the repeat mechanism.*—The repeat mechanism is operated by a cam mechanism that is normally latched against operation, the rising of the master control member 845 being effective to release the cam follower for operation. The master control link 845 carries a latch member 955 (FIG. 26) pivotally mounted thereon by any suitable means, such as pivot stud 956. A spring 957 biases the latch 955 downwardly (counter-clockwise in this figure) to a disabling position, overthrow being prevented by means of a pin 966 on the arm engaging a cooperating shoulder (not shown) formed on the rearward edge of the master control member 845. The rearward edge of the latch member 955 is adapted to engage a roller 958 on a cam follower link 959, when the control member 845 is in its lower position. Normally the rear edge of the latch 955 engages the roller 958, holding the cam follower and the follower link 959 disabled, for otherwise these members would operate with each cycle of machine operation and it is preferred to disable them so long as the machine is not operating split-multiplication. It will be obvious that as the control member 845 is lowered, the latch 955 can yield when it engages the roller 958 but, upon the first following cycle of machine operation, the follower link 959 will be latched in its rearward position by its reciprocation pulling the roller 958 to the rear of the latch 955.

It can be noted at this point that the follower link 959 is pivotally connected to a cam follower 960 (see particularly FIG. 24) by a long pin 961. The cam follower 960 is pivotally mounted on the shaft 457 and carries a forwardly extending arm, or projection, 962. A roller 963 on the terminal, or forward, end of the projection 962 engages the periphery of a cam 964 which is mounted on the main drive shaft 153. The cam is shown in its full-cycle position in FIG. 24, so that it is apparent that beginning about halfway through a machine cycle, the lobe of the cam 964 engages the roller 963 to rock the cam follower rearwardly (clockwise in this figure). A spring 965 resiliently biases the follower 960 toward the cam 964, whenever the latch 955 releases the follower link 959.

The lifting of the master control link 845 lifts the latch 955 away from the roller 958 on the follower link 959, so it is evident that at this time the cam follower is released to the force of spring 965, and that it will move forward into engagement with the cam 964. Thereafter, beginning at about the mid-point of the cycle, the cam follower is rocked rearwardly, and at about the beginning of the fourth quarter of the cycle is released to return to its inoperative position.

The repeat key mechanism is set to its operative, or repeat, condition by means of a setting link 975 (FIG. 26). The rear end of the link 975 is supported by an arm 976, the two parts being connected by a suitable pin 977 carried by the arm 976. The arm 976 is pivotally mounted on a pin 978 (FIGS. 24 and 29) extending outwardly from the left-hand control plate 66. The forward edge of the arm 976 forms a face 979 (FIG. 26) which engages the long pin 961 which interconnects the follower arm 960 and the follower link 959. The arm 976 is resiliently biased into engagement with the pin 961 (counter-clockwise in FIGS. 26 and 29) by a spring 980 tensioned between its upper end and the arm 882. It is evident, therefore, that the arm 976 is resiliently biased to follow oscillation of the cam follower 960, and hence the link 975 will be reciprocated along with follower link 959 by the operation of cam 964.

The forward end of the link 975 is formed with a shoulder 981 (see also FIGS. 28 and 31) adapted, when the forward end of the link is raised, to engage a pin 982 which interconnects the link 898 and the repeat setting lever 983. The link 975 is resiliently biased upwardly to enable engagement of the shoulder 981 with pin 982 by a suitable spring 984, but normally is held in a disabled position by means of the pin 904 (FIG. 29) carried by the arm 905, which pin engages the upper edge of the link 975. It will be recalled that the lever 905 is rocked (clockwise in this figure) by the depression of one of the multiplier control keys and the consequent rocking of shaft 330 and arm 624. Thus, while the arm 976 and hence link 975 is held in a rearward inoperative position by the latch member 955 engaging the roller 958, the lifting of the master control member 845, by disabling the latch, enables reciprocation of the link 975. However, the link 975 cannot rise to enable the shoulder 981 to engage the pin 982 until a multiplier control key has been depressed and lever 905 rocked. Thereafter, in the first cycle of operation, and in the third quarter of that cycle, the link 975 is pulled rearwardly. At this time the forward end of the link has been lifted by its spring 984, so that the shoulder 981 engages pin 982 and rocks lever 983.

It should be mentioned at this point that the link 975, and hence the arm 976, is latched in this extreme operated position by means of a latch arm, or live tip, 990 (FIGS. 26 and 31) which is pivotally mounted on the forward end of the link 975 by any suitable means, such as a pin 991. The latch arm 990 is resiliently biased upwardly by a spring 992 tensioned between studs on the link 975 and the latch arm 990, the pin on the link 975 engaging the latch arm 990 to prevent overthrow thereof. The forward end of the latch arm 990 is formed with a rearwardly and upwardly facing cam edge 993 adapted, when the link 975 is raised by its spring 984, to engage a pin 995 that is carried by a downwardly extending arm, or projection, 518 formed on the upper arm of the U-lever 515. It is apparent that, as the link 975, in its raised position, is pulled rearwardly, the pin 995, through its engagement with the cam face 993, cams the latch arm 990 downwardly. However, as soon as the arm 990 has passed the pin 995, the spring 992 becomes effective to lift the arm 990, whereupon the arcuate end 994 seats against pin 995 and latches the link 975 and arm 976 in their extreme positions, as shown in FIG. 31.

It will be recalled that the U-shaped lever 515 is rocked (counter-clockwise in FIGS. 24 and 26) during the second machine cycle of a multiplication operation (which is in the cycle following the rearward translation of link 975). Thereupon, the pin 995 becomes effective to lower the front end (right end in FIGS. 26 and 29) of the link 975 to a position in which the shoulder 981 lies below the pin 982, thereby disabling the link from any further control over the lever 983. It can be mentioned at this point that the lever 983 will be returned partially toward its normal position at the beginning of the second phase of the split-multiplication operation, so that it is essential to disengage shoulder 981 from the pin 982 shortly after the link 975 has become effective to rock lever 983.

It should be mentioned at this point, that the link 975 is provided with a forwardly extending tail 985 which is adapted to be engaged by mechanism controlled by operation of the multiplier correction key 750, so that in a multiplication correction operation, the link 975 is disabled at all times. When the machine has been conditioned for split-multiplication work and the operator makes an error in insertion of the multiplier value, he naturally will desire to operate the multiplier clearing key 750 to correct the error. In such an event, it is highly desirable to disable the split-multiplication control, so that in the clearing operation the split programming will not be effective—for obviously the two mechanisms would be working at cross purposes. It is relatively easy to disable the split-multiplying controls by holding the latching link 975 in its inoperative position. A means for this purpose is shown in FIGS. 22, 26 and 27. It is seen in FIG. 22 that the clearing control lever 752 carries a pin 1270. This pin engages the rear end of an angular arm 1271 that is rigidly mounted on a transverse shaft 1272 extending from the intermediate frame plate 63 to the left-hand control plate 66. The arm 1271 is biased upwardly by a suitable spring 1273, thereby holding the end of the arm 1271 in engagement with the pin 1270. The left end of the shaft 1272 (as is shown in FIG. 27), carries an arm 1274 which extends rearwardly a distance sufficient to overlie the tail 985 of latching link 975. A pin 1275 secured to the rear end of the arm 1274 is adapted to engage the tail 985 of link 975 when the arm 1274 is rocked downwardly (counter-clockwise in FIGS. 26, 27 and 28), thereby depressing the front end of the link 975 so that it cannot be operative as a latch. It is apparent, therefore, that the depression of the multiplier clearing key 750, from its engagement with arm 1271, rocks shaft 1272 and arm 1274 to inactivate the latch 975 and thereby prevent operation of the split-multiplying mechanism.

The lever 983 is pivotally mounted on the left side control plate 66 by any suitable means, such as a pivot stud 986 (FIGS. 24 and 29) secured to the control plate. The upper arm of the lever 983 is formed with a slot 987 which embraces the pin 688 mounted on the left side of the repeat key slide 676 (FIG. 20). Thus, the translation of the link 975, which occurs in the first cycle of machine operation following the setting of the master control member 845 and the depression of one of the multiply control keys, is effective to pull the repeat key 676 and its associated mechanism to the forward, or repeat, position. Later in the same cycle the link 975 is forced downwardly by operation of the U-shaped lever 515 to enable the return of the repeat key to its nonrepeat condition during the second phase of the split-multiplication operation.

(4) *Condition right shift mechanism for operation at end of first phase of split operation.*—Another effect of the positioning of the master control link 845 in its split-multiplying position shown is to free, or enable, the mechanism which will be effective at the end of the first phase of the split operation to initiate a right shift of the carriage 80. This operation is necessary in those problems in which the multiplier factor has less than five digits in order to condition the machine for the second phase of operation. While the right shift mechanism and its operation can best be described under section D, "Second Phase of Operation" below, it should be noted at this point that the master control link 845 carries a forwardly projecting nose 1030 (FIG. 26) that overlies a pin 1031 on the rear section 1032 of an extensible link, comprising the member 1032 and a second link member 1033. The two links are connected by a pair of pin-and-slot connections, such as the slots 1034 in the rear section 1032 embracing pins 1035 carried by the forward section. A suitable spring 1036 resiliently biases the links to the retracted position shown. When the control member 845 is in its lower, or normal multiply, position, the nose 1030 engages pin 1031 and rocks the extensible link 1032, 1033 away from a pin 1106 carried by lever 1105, the operation of which will be described hereafter in section D. However, when the master control member is lifted to its operative position, the nose 1030 releases pin 1031, whereupon the rear end of the link is lifted by means of a spring 1037 (FIG. 27) to engage the pin 1106. It should be noted, as shown in FIG. 26, that when the extensible link 1032, 1033 rises to its operative position, the pin 1106 lies immediately in front of a hook shoulder 1038, so that the rocking of the arm 1105 (clockwise in this figure) will pull the rear section 1032 rearwardly and thereby control the necessary right shift operation.

It can be mentioned at this point, however, that the forward end of the forward member 1033 of the extensible link is pivotally mounted on the lower end of an arm 1044 (FIG. 27). This arm is rigidly mounted on the left end of a transverse shaft 1045, the left end of which is journalled in the left side control plate 66 and the right end of which is journalled in the right side frame plate 62 (FIG. 17). It is obvious that the rearward translation of the forward section 1033 of the extensible link will rock the arm 1044 and shaft 1045 (clockwise in these figures). At its right end the shaft 1045 carries an arm 1046 rigidly secured thereto. A link 1047 pivotally connects the arm 1046 to a second link 1048 and a supporting arm 1049 that supports the adjoining ends of the links 1047 and 1048. The arm 1049 is pivotally mounted on the right-hand frame plate 62 by any suitable means, such as a screw stud 1050. The rear end of the second link 1044 is provided with a slot 1051, which slot embraces a pin 1052 carried by the right shift control arm 221. It follows that the rocking of the shaft 1045 (clockwise in FIG. 17) pulls the right shift control arm 221 forwardly (to the right in this figure) to its right shift position. It can be mentioned at this time that the arm 221 remains in its rocked, or clockwise, position until the register carriage 80 has been shifted to the sixth ordinal position, so that the right shift mechanism is held operative until that time.

The second link 1048 also carries a pin 1053 which engages the rear edge of the upper arm 194 of the switch control link 193. Hence the forward translation of the link 1048 pulls the switch control link 193 forwardly and rocks the clutch control arm 188 to cause engagement of the clutch. The latching of the extensible link 1032, 1033 in its rearward position and the consequent rocking of shaft 1045 (clockwise in these figures) is, therefore, effective to maintain the machine in operation and to set the right shift clutch for operation.

I have found that it is highly desirable to delay the operation of the right shift mechanism at the end of the first phase of operation in order to allow the multiplier carriage to be seated in its adjusted position. It will be recognized that as this carriage is returned to the adjusted position by means of the powerful spring 417 (FIG. 20), there will be some "bounce" of the carriage as it comes to its adjusted position. It is highly desirable that the carriage be allowed to come to rest in the selected position before the register carriage is shifted to the sixth ordinal position. This delay is particularly important when there are five digits in the multiplier, as in that case the shift of the register carriage would be taking place and perhaps the second phase started while the multiplier carriage was still "bouncing" from being shifted under force of its strong spring 417 to the adjusted position. At the same time the various multiplier segments 408 are being returned to their adjusted position through spring forces, so that they too are apt to "bounce" as they come to the adjusted value position. Therefore, it is highly desirable to provide an idle cycle of operation to let the multiplier carriage 398 and the multiplier segments 408 come to the adjusted position before continuing the operation. This idle cycle is controlled by a simple delay latch which is released for operation by movement of the master control member 845 to its raised or split-multiply position.

The delay latch preferably comprises a T-shaped lever 1075 (FIGS. 26, 29 and 30) that is rotatably mounted on the pivot stud 936. This lever has an arcuate forward edge 1076 adapted to engage a square stud 1039 on the inner side of the forward portion 1033 of the extensible link 1032, 1033. In the normal position of the parts, the square stud 1039 lies immediately in front of the upper portion of the arcuate edge 1076, so that under normal conditions rearward movement of the forward portion of the extensible link 1077 is prevented. A link 1077 is pivotally connected to the upper arm of the delay latch 1075, the rear end of the link being pivotally supported on a rocker 1078 (FIGS. 24 and 29). This rocker is pivotally mounted on the left side control plate by any suitable means, such as pivot stud 1079, and at its lower end carries a roller 1080 that engages the periphery of the cam 964. A spring 1081 tensioned between the third arm of the delay latch and the link 1077 holds the roller 1080 against the cam 964 and the delay latch in its effective position.

It is apparent from FIG. 24 that the rocker 1078 is rocked in the first quarter of a cycle, thereby rocking the delay latch 1075 at this time. However, due to the size and shape of the edge 1076, the delay latch is effective throughout almost its entire stroke to engage the pin 1039 and thus block movement of the forward member of the extensible link 1032, 1033. It is not until the delay latch reaches its extreme position (counter-clockwise from that shown in FIG. 29) that the edge passes beyond the pin 1039. The multiplier carriage will be allowed to escape in the third quarter of the overstroke cycle which provides for the restoration of the multiplier mechanism, at which time the delay latch 1075 will be in its blocking position. It will not be moved therefrom until near the end of the first quarter of the next cycle—too late in that cycle to enable the right shift mechanism to be effective at that time. Thus there is an enforced idle cycle between the restoration of the multiplier mechanism and the initiation of the right shift.

The link 1077 supports a latch member 1085, as by pivotally mounting this member on the pin 1086 which interconnects the link 1077 and the rocker 1078. Preferably this latch member is formed as a bellcrank and is resiliently biased to a latching position (clockwise in FIG. 29) by a spring 1087 tensioned between a seat on the link and another on the upper arm of the bellcrank latch. The latch member 1085 carries a forwardly facing shoulder 1088 adapted to engage a pin 1089 (FIG. 26) riveted to, or otherwise rigidly secured on, the upper portion of the master control member 845. Overthrow of the latch 1085 is blocked by means of a pin 1090 (FIG. 29) secured to the link 1077, which pin engages a face of the latch 1085 and prevents rotation beyond the position shown.

When the master control member 845 is in its lowered, or normal multiplication, position, the pin 1089 engages the shoulder 1088 and thereby latches the link 1077 and hence the delay latch 1075 in the extreme rearward position of the former and extreme rocked position of the latter. In this position the delay latch is lifted above the cooperating square stud 1039. However, when the master control member 845 is lifted to the split clearing position shown in FIG. 26, the pin is removed from the latch and the delay latch operates with each machine cycle. It can be noted that the rear end of the latch member 1085 is provided with an arcuate face 1091 which is effective to cam the latch 1085 downwardly when the master control member 845 is returned to the normal multiplication position. Thereafter, the delay latch mechanism will be latched in an operative position at the end of the first quarter of the succeeding cycle of operation.

(5) *Condition mechanism effective to re-operate the multiplier control latch 443 to start the second phase of operation.*—A downwardly extending shoulder 1060 (FIGS. 26 and 31) on the master control member 845 normally overlies a pin 1061 on an intermediate section of a repeat restore link 1062. The means for operating this link 1062 will be best described in connection with the second phase of operation, and hence will be described hereafter. However, it can be noted here that the forward end of this link 1062 is supported by a pin-and-slot connection comprising a slot 1063 in the forward end of the link, which slot embraces a pin 1064 carried by an arm 1065 (see also FIG. 25). The arm 1065 is rigidly mounted on the second latch 443 that controls the operation of the multiplying initiating member 435. By this connection, the latch 443 can be rocked to its operative position by the override pawl in normal multiplication or at the start of the first phase of a split-multiplication, without causing any adjustment of the link 1062. However, when the link 1062 is pulled rearwardly at the start of the second phase of operation, it is obviously effective to again rock the latch 443 and release the initiating lever 435 (FIG. 24) and hence initiate the second phase of a multiplication operation (the first latch 442 being still inoperative from depression of the multiplier control key).

The rear end of the link 1062 is supported for both vertical and horizontal movement by means of a vertical slot 1066 (FIGS. 26 and 31) which embraces a pin 1067 carried by an arm 1063 freely rotatable on the left side control plate 66. A tension spring 1069 resiliently biases the rear end of the link 1062 upwardly, in which position a hook shoulder 1070 on the rear end thereof is engaged by a roller 1166 carried on the lower leg of a bellcrank 1163, the operation of which will be described hereafter under the heading "Second Phase of Operation."

For the moment it should be noted that the link 1062, when allowed to rise from the force of its spring 1069 and then pulled rearwardly (to the left in these figures), initiates a re-operation of latch 443 to release multiplication initiating arm 435 to start the second phase of the split-multiplication operation. Normally, this link is held downwardly in a disabled position by means of the shoulder 1060 engaging pin 1061 as the master control member 845 is in its lower, or normal, multiply position. When the control member is lifted, however, the link 1062 is also enabled to rise, so that thereafter the hook 1070 is in position to be engaged by the roller 1166 when the bellcrank is operated at the start of the second phase of operation.

C. *First Phase of Operation*

When the master control member 845 (FIG. 26) is in its split-multiplication control position and the various control mechanisms (described under section II–B, "Master Control Member," above) have been set to operative position, and either of the multiply control keys, such as 540, 610 or 640, is depressed, the rocking of the shaft 201 (FIG. 29) rocks the lever 905 (clockwise in this figure). The rocking of this lever, from its effect on pin 909 and link 910, releases the setting link 881 for upward movement from the force of its spring 889. However, this link is not completely released until a mid-point in the first operating cycle, as the forward end of the link is also held depressed by the pin 893 (FIG. 24) mounted on the mechanism which sets the repeat multiply key to its operative position. It will be recalled that this key is pulled to its forward position by means of the cam 964 which, in the third quarter of operation, rocks the follower 960. The pin 961 on the lower end of cam follower 960 engages the face 979 of arm 976, thereby rocking the latter (clockwise in these figures). Such rocking of arm 976 pulls the repeat key setting link 975 rearwardly, whereupon the shoulder 981 thereof (FIG. 26) engages pin 982 and rocks lever 983 to force the repeat key to its forward, or repeat, position.

The normal preliminary program of multiplication operation, consisting of the shifting of the register carriage 80 to the extreme left-hand position, and perhaps clearing of the registers, follows from the rocking of the shaft 201. The mechanism of the present invention does not interfere with this program in any way, so that it proceeds to completion in the normal way. However, when the shifting mechanism attempts to shift the carriage beyond the terminal position and thereby operates the override pawl 375 (FIG. 13) and the override slide 380, the rocking of the bellcrank 383 (see also FIG. 18) rocks the shaft 884 (clockwise in this figure). The clockwise rocking of shaft 884 thereupon pulls the setting link 881 (FIG. 26) rearwardly. As the forward end of this link has been released from the three restraints normally imposed upon it, its shoulder 880 is in engagement with the roller 879 on the setting gear segment 877. The rocking of the shaft 884 and rearward translation of link 881 rocks the segment 877 (counter-clockwise in this figure). This, in turn, rocks the setting segment 870 and shaft 871 (clockwise from the position shown in FIG. 26 to that shown in FIG. 31) which, through the gate setting mechanism described in connection with FIGS. 6 to 9, inclusive, rocks the right-hand gate 945 forwardly and left-hand gate 939 rearwardly—thereby blocking operation of the selection gears of the left side of the keyboard. Simultaneously with this setting of the blocking gates 939 and 945, the conventional mechanism for releasing the multiplier control lever 435 (FIG. 24) is operating in the normal way to rock the second latch 443 to initiate a multiplication operation. In this condition of the machine the multiplication proceeds, with the values set in the right-hand side of the keyboard standing as the multiplicand factor and the value in the multiplier mechanism operating as the multiplier. This multiplication takes place in the usual manner. The rocking of drive segment 877 also sets the locking mechanism which prevents release of the multiplier control key.

At the end of the multiplication operation, the multiplier carriage 398 is shifted to its home position in which the highest order segment 408 lies one ordinal space to the right of the feed mechanism described in connection with FIG. 23. In this home position of the multiplier carriage 398, the shift control lever 455 is held in its rocked, or shift control, position by the engagement of its ear 456 with the ear 414 on the left-hand multiplier carriage frame plate, thereby causing an additional shift of the carriage. During this shift of the carriage the restoring mechanism described in connection with FIG. 22 becomes operative to restore the multiplier segments to their home position by operating the bail 661.

This rocking of the bail 661 is also effective to rock a lever 1101 (FIG. 22) that is rigidly mounted on a transverse shaft 1102 journalled in the intermediate frame plate 63 and the left-hand control plate 66. Preferably, the arm 1101 is provided with a tail 1103 which engages a pin 1104 secured to the intermediate frame plate to prevent overrocking of the lever 1101 and shaft 1102. It is obvious that this arm and the shaft are rocked counter-clockwise in FIG. 22 and clockwise in FIGS. 20, 29 and 31. The shaft 1102 carries an arm 1105 (FIG. 31) adjacent its right-hand end, which arm is rigidly secured thereto and hence rocks with the rocking of the arm 1101 previously mentioned. This arm 1105 carries the pin 1106 that pulls the rearward portion of the extensible link 1032, 1033 rearwardly. At this time, however, movement of the forward portion 1033 of that link is blocked by the delay latch 1075, so that a right shift is not immediately initiated.

The assembly comprising the arm 1105, shaft 1102, and the initiating arm 1101, is thereupon latched in the adjusted position by means of a latch lever 1110, a shoulder 1111 of which is adapted to engage a roller 1107 on the lower end of the arm 1105 (FIGS. 29 and 31). The latch lever is shaped as a bellcrank, and is pivoted at its elbow on a suitable stud 1112 on the left-hand control plate 66. The upwardly extending arm of this bellcrank is provided in order to enable convenient release of the latch as the register carriage 80 shifts into the sixth ordinal position for the start of the second multiplication operation, as will be described in the next paragraph. For the moment it should be noted that the latch lever 1110 is resiliently biased upwardly by any suitable means, such as spring 1113 tensioned between the lever and a member 1192 (FIG. 28). Normally, however, the latch 1110 is held in an inoperative position by means of the lower edge of a downwardly extending projection 1026 of link 1023 (see FIG. 24) engaging a pin 1114 (see also FIGS. 29 and 31). It will be recalled that the link 1023 is moved rearwardly during the register carriage overshift cycle, simultaneously with the setting of the gate setting segments 877 and 870. At this time the link moves rearwardly, so that the projection 1026 moves from above the pin 1014 and thereby releases the latch 1110 to its effective position.

As just indicated, the arm 1105 is latched in its rocked position (clockwise from that shown in FIGS. 26, 29 and 31) by the latch 1110, and this latch is not released until the carriage shifts to the sixth ordinal position. The front carriage rail 82 carries a cam block 1120 (FIGS. 26 and 33). A camming edge on the right-hand end of this block (not shown) engages a roller 1121 as the carriage shifts from the fifth ordinal to the sixth ordinal position. The roller 1121 is mounted on the rear end of an arm 1122 which is pinned to a short shaft 1123. Preferably, this shaft is journalled in the left-hand control plate 66 and the auxiliary frame plate 65, and the camming block 1120 is so positioned on the rail 82 as to engage the roller 1121 as the carriage shifts from the fifth to the sixth position. By the time the carriage has reached the sixth ordinal position, the arm 1122 and hence shaft 1123 are rocked to their extreme counter-clockwise position (when viewed from the left as in FIGS. 26 and 31). The left end of shaft 1123 carries an arm 1124, a pin 1125 on the lower end of which engages the rear edge of the upwardly extending leg of the bellcrank latch 1110. It is apparent that the rocking of the arm 1122, and hence rocking shaft 1123 and arm 1124 (counterclockwise in these figures), rocks the latch 1110 clockwise to its disengaging position—thereby releasing controls set by the latching of the arm 1105 in its adjusted position. It is apparent that as the latching of arm 1105 in its operative position (clockwise from that shown in these figures) holds the right shift control link 1032, 1033 in its operative position, the release of latch 1110 at this time terminates the right shifting operation. Preferably the cam block 1120 will extend along the rail 82 for a distance equivalent to the five ordinal spacings which correspond to the upper half of the keyboard. Therefore, as long as the register carriage is in any of the sixth to tenth ordinal positions thereof, the cam block 1120 will disable the latch 1110 in order to prevent any possible latching of the right shift mechanism while the machine is in the second phase of the split operation.

It is also preferable to provide an interlock which will block operation of the latch 1110 whenever the repeat key mechanism is in its inoperative, or nonrepeat, position. In normal split-multiplication operation the repeat key mechanism is returned to the disabled position during the second phase of operation. It is obvious that as the second phase of operation is completed, the shift control mechanism comprising the arm 1101 (FIGS. 20 and 22), shaft 1102 and the arm 1105 (FIGS. 29 and 31) are operated as the multiplier carriage is overshifted from its home position to the restore position. At this time, however, it is not desirable to latch the right shift mechanism in a position to effect a shift. In view of the fact that the extensible link 1032, 1033 is in its raised position, the rearward link 1032 will be operated by the rocking of the arm 1105, although the forward end 1033 is blocked, as heretofore described. At this point the latch 1110 should be disabled, so as to prevent latching of the arm 1105. It will be recalled that the rocking of the assembly including the arm 1105 is momentary, for only a portion of the cycle is necessary to rock the clearing bail 661 (FIGS. 20 and 22) from its rearward to its forward position, and it is immediately released by the actuating cam 668. Thus, if the latch is ineffective at this time, the arm 1105 is immediately restored and has no effect upon the extensible link 1032, 1033 which controls the right shift operation. This interlock is readily secured by providing a forwardly and upwardly extending tail 1115 (FIG. 29) which is adapted to engage the pin 982 whenever the repeat key is in its rearward, or ineffective, position and the setting lever 983 is in its forward position, as shown in this figure. However, when the repeat key mechanism is set to its operative position (clockwise from that shown in FIG. 29 to that shown in FIG. 31), the tail 1115 misses the pin 982 and hence the latch 1110 can be operated.

It will be recalled that the gate setting segments 877 and 870 were latched in their first phase effective position by means of the latch 920 (FIG. 31), the rear latching face 923 of which has engaged the pin 926 on gate setting segment 870. This latch is released during the overstroke cycle, at which time the multiplier carriage 398 lies in its overstroke position and digitation is, of course, disabled. At this time the blocking gates can be restored to their normal position (shown in FIG. 7) without any interference with any operating mechanism. Release of the latch 920 is most readily secured from the rocking of the arm 1105 which occurs during the overstroke cycle.

Preferably a link 1130 (FIGS. 29 and 31) connects the arm 1105 with the lower leg of the latch lever 920. This link can be connected to the arm 1105 by any suitable means, such as pin 1106. Preferably the latch lever 920 is connected to the link 1130 by a pin-and-slot connection, such as that comprising a pin 1132 carried by the latch lever which is embraced within a slot 1133 formed in the rear end of the link. It is preferred that the pin 1132 lie in a central part of the slot 1133 when the latch 920 is in its latching position shown in FIG. 31, so that the latch 920 will not be rocked away from its latching position until the pin 1107 is in a position to be engaged by the shoulder 1111 of latch 1110. It is rather important that the gate setting gear segment 870 not be released before the arm 1105 has rocked to its extreme operative position (clockwise from that shown in these figures) and has conditioned the machine for the right shift operation. The slot should also extend in the other direction so that at the end of the second phase, when the gear segment 870 is set at an extreme counter-clockwise position and pin 926 is engaged by the latching shoulder 924, any "bounce" in the return of the assembly including the arm 1105 to its normal position, will not affect the latch.

It is clear that in the overstroke cycle in which the multiplier carriage 398 (FIG. 20) is shifted to the right beyond its home position in the first half cycle and in the early part of the second half of that cycle, the restore bail 661 is rocked (clockwise in FIG. 20 and counter-clockwise in FIG. 22). The momentary rocking of bail 661 momentarily rocks the arm 1101 shaft 1102, and arm 1105, whereupon the arm 1105 is locked in its extreme position by latch 1110. The latch 1110 remains effective until the register carriage 80 shifts from its fifth to its sixth order position. While so rocked, the arm 1105 holds the rear portion of the extensible link 1132, 1133 rearwardly, the front portion being blocked for one cycle by the delay latch 1075. In the next full cycle of operation, the delay latch is rocked to a disengaging position, thereby enabling the right shift of the carriage, which shift continues until the register carriage shifts to its sixth ordinal position. During this shifting operation the gate setting segments 877 and 870 are released from control by the latch 920.

D. Second Phase of Operation

The machine is conditioned for the second phase of the split-multiplication operation by a mechanism which operates almost simultaneously with the release of the latch 1110 while the carriage is shifting from the fifth to the sixth ordinal position. The mechanism for controlling the initiating of the second phase of the split-multiplication operation is best shown in FIG. 32. The initiating member of this mechanism is a live pawl 1140 that is pivotally mounted on the rear side of the carriage frame bar 81 by any suitable means, such as a large-headed screw stud 1141, and preferably, is mounted adjacent the left end of the frame bar 81. A spring 1142 tensioned between a stud 1143 on the live pawl and another stud 1144 affixed to the mounting bracket 1145 biases the live pawl 1140 to its operative position—the pin 1144 engaging the edge of the live pawl to prevent overthrow (beyond the counter-clockwise position shown in this figure. A rightwardly extending cam face 1146 (on the left side in FIG. 32, which is a rear view) is adapted to barely engage a roller 1150 when the carriage is in the fifth ordinal position. The roller 1150 is rotatably mounted on a pin 1151, which pin serves to connect a two-armed lever 1152 and a link 1153. The lever 1152 is pivotally mounted on a bracket carried by the left frame plate 64 by any suitable means, such as screw stud 1154. The assembly is biased to an inoperative position (counter-clockwise in this figure) by a relatively strong spring 1155 tensioned between studs on the extremity of the right arm of lever 1152 and on the bearing bracket 306. Preferably, the roller 1150 is so located as to lie to the left of the conventional right shift override pawl 388 (to the right in this figure), when the carriage is in the extreme left-hand position, as shown in this figure, so as to avoid any possibility of this pawl ever engaging the roller 1150.

As the register carriage 80 is shifted to the right from the fifth ordinal position to the sixth ordinal position, the cam edge 1146 forces the roller downwardly, thereby depressing link 1153 and rocking the lever 1152 (clockwise in this figure) against the tension of its spring 1155. The lower end of the link 1153 is pivotally connected to an arm 1156 extending forwardly from a short shaft 1157 journalled in the left frame plate 64 and the left-hand control plate 66. Thus the depression of the link 1153 is operative to rock the shaft 1157 in a clockwise direction when viewed from the left, as in FIG. 31. A forwardly extending arm 1160 is pinned to, or otherwise rigidly mounted on, the right end of the shaft 1157. A downwardly extending link 1161 is pivotally connected on the forward end of the arm 1160, as by a pin 1162. The lower end of the link 1161 is pivotally connected to a bellcrank 1163, as by pin 1164. The bellcrank 1163 is pivotally mounted on the adjacent control plate 66 by any suitable means, such as a pivot stud 1165, and carries the roller 1166 which engages the shoulder 1070 of link 1062. It will be recalled that the rearward translation of this link (to the left in FIG. 31) is effective to release the second latch 443 (FIG. 24) that holds the multiplier initiating lever 435 in its disabled position. This initiating arm was latched in its inoperative position by the joint operation of the restore arm 670 (FIG. 24) and the U-lever 515, as heretofore explained. It, therefore, must be unlatched in order to initiate the second phase of operation. It is obvious that the rocking of the shaft 1157 (FIG. 31) rocks the bellcrank 1163 (clockwise in this figure) and pulls the link 1062 rearwardly to initiate the second phase of multiplication operation.

The link 1161 carries a forwardly extending arm 1167, on the forward end of which is a pin 1168. The pin 1168 is adapted to engage the upper edge of an interponent 1169 when that interponent is rocked from the normal clockwise position shown in FIG. 26 to the position shown in FIG. 31. This interponent is pivotally mounted on the actuating link 881 by any suitable means, such as screw stud 1170. This mounting is made so tight (as by the use of a warped shim, or washer, not shown) that although the interponent 1169 can be rotated thereon, there is sufficient drag on the interponent 1169 to positively hold it in any adjusted position unless positively moved with considerable force to the other. The interponent 1169 is provided with a shoulder 1171 adapted to engage a pin 1172 carried by the actuating link 881 to prevent overthrow beyond the counter-clockwise position shown in FIG. 31. The interponent is positioned by means of a link 1173, in the rear end of which is pivotally mounted on the interponent 1169. The forward end of the link 1173 is provided with a slot 1174 which embraces a pin 1175 carried by the gear segment 877. Normally, the interponent lies in the position shown in FIG. 26, being pulled to that position by the rocking of the gear segment 877 at the beginning of the second phase of operation. However, it can be noted that when the gear segment 877 is rocked from the normal position shown in FIG. 26 to the first phase actuated position shown in FIG. 31, the link 1173 pushes the interponent 1169 to the position shown in the latter figure. When the gear segment 877 returns to the normal, or centralized, position shown in FIG. 26, the slot enables the interponent 1169 to remain in the position shown in FIG. 31. When the gear segment 877 is centralized after the interponent 1169 is set to its operative position shown in FIG. 31, the pin 1175 will lie in the right-hand end of slot 1174. Thereafter, the further rocking of gear segment 877 (clockwise from the position shown in FIG. 26) will be effective to return the interponent 1169 to the position shown in FIG. 26.

The depression of the link 1161, resulting from rocking of shaft 1157 as the register carriage moves from the fifth to the sixth ordinal position, will obviously depress link 881 against the force of its spring 889. As a matter of fact, it will depress the front end of the link 881 considerably below the point in which it is normally latched by the pins 862 and 893 (FIG. 26) or by pin 909 on the lower end of link 910 which engages the lever 912 (FIG. 29).

The link 910 is provided with an intermediate slot 913 (best shown in FIG. 31) which embraces a pin 912 carried by a floating link 1181. The rear end of the link 1181 is pivotally mounted on the pin 961 carried by the cam follower 960 (see also FIG. 24). Normally, the link 1181 is biased upwardly by a suitable spring 1182 against a suitable stop pin 1180 (FIG. 24) riveted to the adjacent control plate 66. The forward end of the floating link 1181 is provided with a rearwardly facing shoulder 1183 adapted, when the link is lowered, to engage a pin 1184 affixed to the lower end of the gear segment 877. In the normal position of link 881 (such as that shown in FIGS. 26 or 29), the pin 912 will abut against the upper end of the slot 913—further lifting of the link by its spring being prevented by the stop pin 1180. When the link 881 is lifted to the operative position shown in FIG. 31, the pin 912 will lie at the lower end of the slot 913. About the mid-point of the downward rocking of the link 881 (resulting from the rocking of shaft 1157 and the depression of the link 1161, and its pin 1168 engaging the interponent 1169), the pin 912 will again engage the upper end of the slot 913. Thereafter, the further depression of link 881 resulting from the rocking of shaft 1157 is effective to depress the forward end of the floating link 1181, as the upper end of the slot 913 has theretofore engaged the pin 912. Such rocking of the link 1181 against the force of its spring 1182, causes the shoulder 1183 to engage the pin 1184. This operation takes place about midway in the shift cycle.

Immediately thereafter the cam follower 960 is rocked by the cam 964 (FIG. 24), the lobe of that cam rocking the cam follower 960 in the third quarter of that cycle. The shape of the pawl 1140 (FIG. 32), with a flat surface extending leftward from the cam face 1146, holds the linkage including the floating link 1181 depressed until after the reciprocation of the link 1181 has been completed, and, in fact, until immediately before the carriage reaches the sixth ordinal position. The reciprocation of the floating link 1181 is thus effective, in the third quarter of this cycle, to rock the gear segment 877 to an extreme clockwise position and the gear segment 870 and its shaft 871 to an extreme counter-clockwise position.

In this latter position, the pin 926 (FIGS. 24 and 31) on segment 870 latches in front of shoulder 924 on the latch 920 and the parts are held in this adjusted position even though the link 1181 continues to reciprocate. With the gear segment 870 and the shaft 871 in its second position (counter-clockwise from that shown in FIGS. 24, 26 and 29), the right-hand gate 945 is rocked rearwardly (to the counter-clockwise position shown in FIG. 8) and the left-hand bail 939 releases its selection mechanism. Thus, at the end of this shifting cycle, the right-hand bail, or gate, 945 is rocked to disable the right-hand side of the selection mechanism, the left-hand gate 939 is rocked to release the left-hand side of the keyboard, and a new multiplication operation is initiated.

The second phase multiplication operation thus initiated will continue until the multiplier carriage 398 is shifted to its overstroke position, again rocking the arm 1101 (clockwise in FIG. 20), shaft 1102 and arm 1105. At this time, however, the latch lever 1110 (FIGS. 29 and 31) is held disabled by the engagement of its nose 1115 with pin 982, so that this rocking does not initiate a right shift operation, for the delay latch prevents movement of the forward section 1033 of the extensible link. As the arm 1105 canont be latched at this time, these parts immediately return to their original position and have no further effect upon the multiplication operation.

Simultaneously with the operation of the arm 1105 the overshifting of the carriage has rocked the carriage escapement lever 407 (FIG. 20) in a clockwise direction, if viewed from above. Thereupon, the leftwardly extending arm 414 thereof engages the lower end of the lever 560, rocking the latter in a clockwise direction in this figure. At this point the latch 1005 (FIGS. 24, 26 and 31) is ineffective for it has been rocked to the counter-clockwise position shown in FIGS. 24 and 26 by the link 1023. The left, or rear, end of this link is connected to the driving gear segment 877, so that the forward rocking of this segment to its second phase position will have rocked the latch 1105 (counter-clockwise in these figures), so that it releases the link 1008. It is evident that in this situation, the rocking of the lever 560 (FIG. 20), through the force of spring 563, rocks the key latching arm 558 to release the depressed key. The operation of the machine, therefore, terminates at this point, regardless of the position of the register carriage 80 or the number of digits in the multiplier.

During this second phase of the split-multiplication operation, the repeat multiply mechanism is restored to its normal, or nonrepeat, position. The link 1062 carries a roller 1190 (FIG. 26) adjacent its front end. It will be recalled that this link is pulled rearwardly as the register carriage 80 is shifted from the fifth to the sixth ordinal position. Normally, this roller (as shown in phantom in FIG. 28) engages an arcuate cam edge 1191 on the bellcrank latch lever 1192 that is pivotally mounted on the pivot stud 906. This latch lever is resiliently biased toward a latching position (clockwise in these figures) by the spring 1113 tensioned between the vertical arm of the bellcrank and a pin on the latch bellcrank 1110. It is evident that as the link 1062 is pulled rearwardly, the roller 1190, through its engagement with the cam edge 1191, will rock the bellcrank 1192 (in a counter-clockwise direction in these figures). The forward end of the lever is formed with an upwardly facing cam edge 1193 (FIGS. 28 and 29) which engages the pin 982 connecting the lower end of the repeat setting lever 983 and link 898. When the lever 983 is in the repeat position (shown in phantom in FIG. 28) such engagement of the cam edge 1193 with the pin 982 rocks the lever 983 slightly (counter-clockwise in these figures) to an intermediate position. Normally, such rocking of the lever 983 would move the repeat mechanism past the mid-point of its customary detent (not shown herein) and hence subject it to the force of its spring 677 (FIG. 20) to return it to its normal, or nonrepeat, position. In this instance such operation is prevented by means of a pin 519 (see FIG. 31) on the rear end of the upper arm of the U-shaped lever 515 which, in the intermediate position of arm 983, engages an ear 1194 formed on the rear edge of the arm 983. The pin 519 holds the lever 983 in a mid position, against the force of its spring, until the end of the multiplication operation, at which time the shaft 514 and lever 515 are rocked (clockwise in these figures) by the restoration of the multiplier mechanism. The restoration of the multiply mechanism at the end of the second phase of operation rocks the shaft 514 (clockwise in these figures), whereupon the pin 519 releases ear 1194 and the repeat mechanism is returned to its inoperative, or nonrepeat, position by its spring 677. Therefore, at the end of the second phase of split operation, the operation is terminated and the repeat mechanism is returned to its normal, or nonrepeat, position and the machine is ready for another problem.

In this final cycle, the control key is released shortly before the mid-point thereof by the shifting of the multiplier carriage to the extreme overstroke position, and almost simultaneously therewith the shaft 514 and the U-shaped lever 515 are rocked (clockwise in these figures) to release the repeat mechanism and at the same time to restore the multiplication initiating lever 435 to its latched position. These operations occur before the restore bail 661 can act to restore the set multiplier segments, so that the repeat mechanism is returned to normal before the segments are restored (although both happen in the same cycle of operation and almost simultaneously).

It should perhaps be noted at this point that if five digits are set in the multiplier unit, the first phase of operation will proceed in the normal manner through the first five orders. At this point the right shift mechanism for the register carriage 80 is disabled because the multiplier carriage is immediately adjacent its home position (in this event the operative multiplier segment being the highest order of the multiplier unit). At the end of the last cycle of operation in this order, the highest order multiplier segment returns to "0" and rocks the shift control lever 455 (FIG. 20) to a shift-initiating position and stops digitation by returning the digitation control shaft 165 to its neutral position. The multiplier carriage shifts one order to the right to restore the multiplier carriage 398 to the home position. This shift is immediately followed by a second, or overshift, in order to operate the restore mechanism. During this cycle of operation the repeat mechanism is operative to restore both the carriage 398 and the segments 408 carried thereby to their set positions, and during this cycle the extensible link 1032, 1033, is conditioned for initiating a right shift. This shift, however, cannot take place until the succeeding cycle, thereby providing an idle cycle between the two phases of split-multiplication operation. During this right shift operation the register carriage 80 shifts to the sixth ordinal position and this shift is effective to initiate the second phase of operation, as has just been described.

If, on the other hand, less than five digits have been inserted in the multiplier value, the restoration of the multiplier unit to the repeat condition occurs at the end of the series of multiplication operations in which the highest order multiply segment 408 is effective. For example, if there were two digits in the multiplier unit the actual multiplication operation would be terminated in the second ordinal position of the carriage. At this time the register carriage shift controlled by the multiplier unit is disabled as the multiplier carriage is adjacent its home position. The two shift cycles for the multiplier carriage immediately takes place without any shifting of the reigster carriage. During the second of these cycles the operation of the restoring mechanism conditions the machine for the continued right shift, as has heretofore been described. Subsequent to the idle cycle which immediately follows, the right shift of the carriage 80 is initiated by the extensible link 1032, 1033 and continues because the initiating mechanism is latched in the operated position. As the carriage shifts from the fifth to the sixth ordinal positions, this control is released by rocking of the latch 1110 (FIG. 29), as heretofore described, and the second phase of operation is simultaneously initiated.

If it should happen that no values have been inserted in the multiplier unit before depression of the multiplication control key, the multiplication operation is initiated in the conventional way. In this event the ear 414 on the left-hand frame of the multiplier carriage 398 immediately initiates the overshift. As the machine has been conditioned for a split-multiplication operation, the right shift is initiated and must continue until the register carriage 80 reaches the sixth ordinal position, at which time the right shift mechanism is disabled. The first cycle of operation in the sixth order immediately causes the overshift of the multiplier carriage, and the machine comes to rest at the end of that cycle.

III. CONSTANT MULTIPLICATION

It was mentioned earlier that the conditioning lever 800 can be moved to an extreme forward position indicated by "CON. MULT." in FIG. 1. In this position of the lever, the machine is conditioned for a series of successive operations using a common multiplier, commonly referred to as a "constant multiplier." This position of the control key 800 is secured by manually pulling the key to the extreme forward position, in which position it further lifts the master control member 845 (upward from the position shown in FIG. 26). The forward edge of the master control member is formed to provide a slot 1201, the lower lip 1202 of which projects forwardly to underlie a roller 1195 carried by the upwardly extending arm of the bellcrank lever 1192. It is apparent that the lifting of the master control member 845 to its extreme uppermost position (from the forward translation of the key 800 to its extreme position) seats the roller 1195 at the bottom of the notch 1201, thereby latching the control member in this extreme position. It can be noted that it takes considerable rearward pressure on key 800 to return the mechanism from the constant multiply position to the normal split-multiplication position. Such seating of the roller 1195 in the bottom of notch 1201 is also effective to rock the bellcrank latch lever 1192 (counterclockwise in FIGS. 26 and 28). When so rocked, the forward end of the lever 1195 is lifted above the pin 982. When the latch lever 1192 is in this position, the rocking of the repeat setting lever 983 will cause the pin 982 to underlie the forward nose of the lever 1192 rather than be above it. Further, in this rocked position of latch lever 1192, it cannot be engaged by the roller 1190. Hence, the bellcrank 1192 will not be rocked at the second phase of operation to release the repeat key mechanism. When the bellcrank lever 1192 is so positioned, there is nothing to restore the repeat multiplication mechanism in the second phase of operation, and it will remain effective at the end of the second phase as well as the first. Thus the multiplier values set in the multiplier unit will be retained indefinitely.

IV. SUBTRACTIVE MULTIPLICATION

In my invention I prefer to change the usual subtractive, or complementary, multiplication program. It will be recalled that in subtractive multiplication, in normal operation, the multiplier unit controls the same number of cycles as in additive multiplication but digitation takes place subtractively instead of positively. The product, therefore, represents the complement of the true product. This program is normally used only to subtract one product from another and hence the register clearing mechanism is disabled.

One of the important uses of split-multiplication is to provide a single product on one part of the register and accumulated products, or the accumulation of a series of products, on the other. It is obviously difficult for most operators to read accurately a complementary number. It is, therefore, better to operate the first phase of a split-multiplication operation positively in order to set forth the true product on the right side of the register, and in the second phase to operate subtractively in order to subtract that product from a previous total. In that way the item itself can be read correctly and the accumulated totals also represent the subtraction of one product from a previous total. For example, assume the machine is used for a billing operation in which several products representing a number of items multiplied by their cost are secured. When the total number of listings has been made and a total taken, it is desired to take a discount from the total and also to set forth the amount of the discount. In my machine, in a negative multiplication, I prefer to provide the right-hand product as a true product, and thus show the amount of the discount, while the second phase of operation is subtractive in order to subtract that discount from the previously acquired total. Therefore, in my preferred construction I provide means which is operated by depression of the subtractive multiply key 640, whenever the machine is conditioned for split-multiplication work, to override the normal subtractive controls in the first phase of operation and set the machine for additive operation, and, at the end of the first phase, to restore the machine to normal operation so that the product is subtracted from whatever value was in the accumulator register.

This result is readily secured if the rear end of the subtractive control lever 644 (FIG. 22) carries a roller 645. In the normal position of lever 644, this roller engages an arm 1210 which is rigidly secured to a short shaft 1211 extending from the auxiliary frame plate 65 to the lefthand control plate 66. The left end of the shaft 1211 carries an arm 1212 (FIGS. 26 and 29) rigidly secured thereto. A link 1213 is pivotally suspended from the rear, or free, end of the arm 1212. The link 1213 supports the rear end of a hook link 1214, the front end of which is mounted on the pin 1184 at the lower end of the setting gear segment 877. A spring 1215 (FIGS. 24 and 29) resiliently biases the hook link 1214 downwardly to an inoperative position. However, it is obvious that as the negative multiply key 640 is depressed, the forward end of the subtractive multiplication lever 644 is rocked downwardly and the rear end upwardly (counter-clockwise in FIG. 22). Such rocking of the subtractive lever 644 rocks the shaft 1211 (counter-clockwise in that figure but clockwise in FIGS. 26 and 29) thereby lifting the rear end of the link 1214 against the force of its spring 1215. The rear end of the link 1214 is provided with a shoulder 1216 (best shown in FIGS. 24 and 29) which, in the lifted position of the link 1214, is adapted to engage a pin 589 on the lower end of the additive setting bellcrank. Then, when the gear segment 877 is rocked at the start of the first phase of operation (counter-clockwise in FIGS. 24 and 29), the link 1214 is pulled forwardly. If the link 1214 has been lifted by depression of the negative multiply key, the shoulder 1216 engages the pin 589 and rocks the bellcrank 577 (counter-clockwise in these figures). It will be recalled that such rocking of the bellcrank 577 enables the additive multiplication link 583 (best shown in FIG. 20). Simultaneously with the setting of the additive control link 583 for operation, it is necessary to disable the subtractive setting finger 646 (FIG. 20) which, it will be recalled, is spring-biased upwardly. This is readily secured by means of a second link 1220 (FIGS. 24 and 26), the forward end of which is provided with a slot 1221 embracing pin 1025 on the upper end of the setting segment 877. The rocking of the setting segment 877 in the override cycle and immediately before the initiation of the first phase of the split-multiplication operation, forces the link 1220 rearwardly, or to the left in these figures. The rear end of the link 1220 is pivotally connected to an angular lever 1222 which is rockably mounted on the pivot stud 978. A spring 1223 resiliently biases the lever 1222 and link 1220 to the inoperative position shown in these figures. The lever 1222 has a rearwardly extending leg 1224 which overlies, but is normally spaced from, a pin 651 riveted to the negative control link 46 (see FIGS. 20 and 26 particularly). Thus, the setting of the segment 877 for controlling the first phase of the split operation (counter-clockwise in these figures) forces the link 1220 rearwardly to the left, thereby rocking the leg 1224 of the lever 1222 downwardly (counter-clockwise in these figures) to engage pin 651 and prevent the lifting of the subtractive setting finger 646. By this means the subtractive control normally set by the depression of the negative multiply key is overridden and held in abeyance throughout the first phase of operation.

It will be obvious that as the setting segment 877 returns to its normal position shown in these figures, both the negative control and the additive control are released. As the segment 877 is set to the opposite extreme for the second phase of operation, the normal operation of the machine for subtractive multiplication will not be affected. Therefore, in the second phase, the machine will operate subtractively to subtract the product from the value standing in the left half of the register although in the first phase the product was secured as a true product which is capable of being read as such.

It is contemplated that in some instances it may be desired to operate both phases subtractively. In that event the mechanism heretofore described in this section would be omitted and the machine would operate subtractively in both phases. In this event it would be necessary to provide means for blocking a tens-transfer between the fifth and sixth order counter dials 90. It is obvious that the first substractive operation in the lowest order would immediately set all of the dials affected by a tens-transfer to "9." If this break in the tens-transfer were not provided it would set the counter dials in the left half of the counter register likewise to "9," which would give a false reading in the second phase of operation by a value of "1." It is, therefore, necessary to provide for breaking the tens-transfer between the fifth and sixth orders of the counter dials when the machine is set for subtractive operation, if the preferred controls herein described are omitted. Since this is relatively easy to secure and is deemed an inferior type of mechanism, it is not specifically described herein.

V. SPLIT CLEARING OF THE COUNTER REGISTER

There are some instances in which it would be desirable to block clearing of the left side of the counter register (the sixth to eleventh orders thereof) during split-multiplication operations. For example, in billing work in which it is desired to severally register the price of each item (the product of cost times quantity) while also accumulating totals thereof, it would be preferable to show each multiplier separately in the right side of the counter register simultaneously with the registration of the individual product in the right side of the accumulator. It is, therefore, desirable in such a situation, to clear the right side of the counter register from the operation of the clearing bar 275 (FIGS. 10 and 11) simultaneously with clearing the right side of the accumulator register. Sometimes in such work it is desirable to accumulate multipliers, and for that reason I illustrate, in the instant application, means for "split clearing" of the counter register. It will be obvious that if split clearing is not desired, the mechanism can be simplified by omitting all of the parts to be described in this section without affecting the operation of the machine in split-multiplication. However, as the split clearing of the counter seems preferable, a means for this purpose will be described.

In the normal machine the clearing racks 261 (FIGS. 10 and 11) for the counter register extend transversely across the entire register. In the present invention, to provide for split clearing of the counter I separate the racks between the fifth and sixth orders to provide two separate racks 261a and 261b (FIG. 11). Normally the two sections are operated as a unit by means of a rocking lever 1240 that is pivotally mounted on the left-hand section 261b of the clearing rack, as by means of a pin 1241 mounted on a bracket 1242 attached to that section. A suitable spring, such as a compression spring 1243 seated on the connecting lever and the left-hand section of the clearing rack 261b, rocks the lever 1240 to its operative position shown. An upstanding projection, or nose, 1244 engages the right end of the right-hand section 261a of the clearing rack when the lever 1240 is in the normal position shown. In this position any movement of the right-hand section of the clearing rack will also pull the left-hand section along with it.

However, if the connecting lever 1240 is rocked (clockwise in this figure) to disengage the right end of the section 261a, then there will be no means to operate the left-hand clearing rack 261b. Such rocking of the connecting lever 1240 is readily secured from the rocking of arm 809 (FIG. 26) which biases the setting slide 802 forwardly. In the present embodiment this arm 809 is rigidly secured on the left end of the transverse shaft 810, the right end of which is shown in FIG. 16. An arm 1250 is secured on the right-hand end of the shaft 810. The arm 1250 is resiliently connected to a link 1251 by means of a pin-and-slot connection preferably comprising a pin 1252 carried by the arm which is embraced by a slot 1253 formed in the link. A spring 1254 resiliently biases the two parts (the arm 1250 and the link 1251) to the retracted position shown. The rear end of the link 1251 is pivotally connected to an arm 1255 that is pivotally mounted on the frame plate 62 by any suitable means, such as a pivot stud 1256. This arm is provided with an ear 1257 adapted to engage a pin 1258 (FIGS. 11 and 16) riveted to the vertical leg of a bellcrank lever 1259 pivotally mounted in the register carriage, as by means of pin 1260. The leftwardly extending horizontal leg of the bellcrank 1259 engages a pin 1245 on the connecting lever 1240, so that rocking of the bellcrank 1259 (counter-clockwise in FIG. 11) will rock the connecting lever 1240 (clockwise in this figure) to its disconnecting position. It is obvious that as the bellcrank 1259 is carried by the register carriage, it will engage the ear 1257 of arm 1255 only when the register carriage 80 is in the extreme left-hand position (which is the carriage position normally utilized for the register clearing operation in the machine with which the present invention is shown). Thus the bellcrank 1259 will be rocked only when the carriage is in the extreme left-hand, or clearing, position and in all other carriage positions the counter clearing mechanism will not be affected. Also, if the shaft 810 is rocked to its normal multiply position (counter-clockwise in FIG. 26 and clockwise in FIG. 16) the arm 1255 is pulled forwardly so that ear 1257 misses pin 1258. In that event, both sections of the counter clearing rack 261 will be operated as a unit.

By the means just described, the clearing of the left-hand section of the counter register will normally be disabled during the clearing cycle so long as the split clear setting key 800 is in either of its split clear positions, and this disabling mechanism will not be operative when the key 800 is in the position for normal multiplication.

It is also believed obvious that this split clearing mechanism for the counter register can readily be omitted without in any way affecting the mechanism for split-multiplication operation. In that event the arm 809 (FIG. 26) would be pivotally mounted on a pivot stud carried by the left-hand control plate instead of being mounted on the left end of the shaft 810.

It will be understood that for purposes of disclosure of the invention it has been shown and described as embodied in a machine of the type disclosed in the Friden patents above mentioned. It will be further understood, however, that the invention is not limited to incorporation in that particular machine, for it can be incorporated in, or applied to, other commercial calculating machines on the market. It must be understood, therefore, that the machine shown in the accompanying drawings and described herein is for purposes of exemplification only and that the invention is not limited thereto.

I claim:

1. In a calculating machine having an ordinally arranged selection mechanism and a multiplying mechanism, means for disabling one portion of said selection mechanism, a second means for disabling another portion of said selection mechanism, and means operated by said multiplying mechanism for alternatively operating said disabling means.

2. In a calculating machine having an ordinally arranged selection mechanism and a drive means, means operated by said drive means for disabling one portion of said selection mechanism, a second means operated by said drive means for disabling another portion of said selection mechanism, and means operated by said drive means for alternatively operating said disabling means.

3. In a calculating machine having a keyboard and an actuating mechanism, the combination which comprises ordinally arranged resilient selection elements settable by said keyboard and normally operable to control operation of said actuating means, disabling means for disabling a group of certain lower orders of said selection elements, a second disabling means for disabling a group of certain higher orders of said selection elements, and a control mechanism for sequentially operating said disabling means.

4. In a calculating machine having a keyboard, an actuating mechanism, and a drive means, the combination which comprises ordinally arranged resilient selection elements settable by said keyboard and operable to control operation of said actuating means, disabling means for disabling a group of certain lower orders of said selection elements, a second disabling means for disabling a group of certain higher orders of said selection elements, and means driven by said drive means for alternatively operating said disabling means.

5. In a calculating machine having:
   (1) ordinally arranged selection members,
   (2) means for storing a multiplier factor,
   (3) a multiplier programming means operated under control of said multiplier storing means for controlling a multiplication operation in which a multiplicand value set in said selection members is multiplied by a value set in said storing means, and
   (4) a repeat multiplier mechanism operable to retain selected values in said multiplier storing means,
the combination which comprises:
   (5) a first blocking means for setting one group of the selection members to a disabled position,
   (6) a second blocking means for setting another group of said selection members to a disabled position,
   (7) means operated simultaneously with the initiation of a multiplication operation to operate said repeat multiplier mechanism and to operate said second blocking means to disable said second group of said members during a first multiplication operation,
   (8) means operated upon completion of said first multiplication for reinitiating a multiplication operation and for operating said first blocking means to disable said first group of said selection members and to release the second blocking means, and
   (9) means operated during said second multiplication operation for disabling said repeat multiplier mechanism.

6. In a calculating machine having:
   (1) an ordinally arranged register,
   (2) an ordinally arranged actuating mechanism,
   (3) ordinally arranged selection members operable to control values entered by said actuating mechanism into said register,
   (4) means for storing a multiplier factor,
   (5) a multiplier programming means operated under control of said multiplier storing means for controlling operation of said actuating means to multiply a multiplicand value set in said selection members by a multiplier value set in said storing means, and
   (6) a drive means,
the combination which comprises:
   (7) a first blocking means for setting one portion of the selection members to a disabled position,
   (8) a second blocking means for setting another portion of said selection members to a disabled position,
   (9) means operated by said drive means simultaneously with the initiation of a multiplication operation to operate said second blocking means to disable said second portion of said members during a first multiplication operation, and
   (10) means operated by said drive means upon completion of said first multiplication for reinitiating a multiplication operation and for operating said first blocking means to disable said first portion of said selection members and to release the second blocking means and thereby enable the second portion of said selection members for operation during a second multiplication operation.

7. The mechanism of claim 6 comprising also a repeat multiplier mechanism operable to retain set values in said multiplier storing means, and a means operated during said first multiplication operation to operate said repeat multiplier mechanism to condition the machine for a second multiplication operation by the same multiplier value.

8. The apparatus of claim 6 comprising also selectively operable means for operating the multiplier programming means additively during the first multiplication operation and subtractively during the second multiplication operation.

9. In a calculating machine having:
   (1) an ordinally arranged register,
   (2) a keyboard,
   (3) an ordinally arranged actuating mechanism,
   (4) ordinally arranged selection members settable by said keyboard and operable to control values entered by said actuating mechanism into said register,
   (5) means for shifting said register with respect to said keyboard,
   (6) means for storing a multiplier factor,
   (7) a multiplier programming means operated under control of said multiplier storing means for conrolling a multiplication operation in which a multiplicand value set in said keyboard is entered into said register a number of times corresponding to a multiplier value set in said multiplier storing means,
   (8) a multiplier restoring mechanism operable at the end of a multiplication operation to restore the multiplier mechanism to normal,
   (9) a repeat multiplier mechanism operable to disable said restoring mechanism to prevent clearing of values from said multiplier storing means, and
   (10) a drive means,
the combination which comprises:
   (11) resilient means connected to each of said selection members whereby a selection member set to a value position by the keyboard can be set to a disabled position,
   (12) a first blocking means for setting the resilient means of one portion of the selection members to a disabled position,
   (13) a second blocking means for setting the resilient means of another portion of said selection members to a disabled position,
   (14) means operated by said drive means simultaneously with the initiation of a multiplication operation to operate said repeat multiplier mechanism and to operate said second blocking means to disable said second portion of said members during a first multiplication operation,
   (15) means operated by said multiplier restore means for operating said shifting means to shift said register to a predetermined ordinal position, and
   (16) means operated by the shifting of the register to the predetermined ordinal position for reinitiating a multiplication operation and for operating said first blocking means to disable said first portion of said selection members and to release the second blocking means and wthereby enable the second portion of said selection members for operation during a second multiplication operation.

10. The apparatus of claim 9 comprising also means for operating said actuating means, additively or positively, a plus multiplication key for operating said actuating means additively in both multiplication operations, and a negative multiplication key for operating actuating means additively during the first multiplication operation and subtractively during the second multiplication operation.

11. In a calculating machine for performing split-multiplication and having:
(1) an accumulator,
(2) actuating mechanism including selection gears for operating said accumulator,
(3) means for shifting said accumulator relative to said actuating mechanism,
(4) a keyboard for setting said gears,
(5) power means for cyclically operating said actuating means and said shifting means,
(6) a multiplier storage mechanism for controlling said actuating mechanism and said sign character control means to multiply values set in said keyboard by values inserted into said multiplier storage mechanism,
(7) means for inserting values into said multiplier mechanism,
(8) means for clearing said multiplier mechanism and restoring the same to a normal inoperative condition,
(9) a repeat mechanism for disabling the clearing of said multiplier storage mechanism,
(10) a multiplier control key, and
(11) means rendered operative by said control key for initiating a multiplication operation,
the improvement which comprises:
(12) resilient connecting means between said keyboard and said actuator gearing whereby the gearing may be held in a "0" value position although values are set in said keyboard,
(13) a blocking bail operative upon one group of said resilient connecting means whereby the bail is effective to hold the selection gears of said one group in a "0" condition,
(14) a second blocking bail operative upon a second group of said resilient connecting means whereby the bail is effective to hold the selection gears of said second group in a "0" position,
(15) means operated simultaneously with said initiating means for setting said repeat mechanism to its operative position and for operating one of said blocking bails,
(16) means operated by said clearing and restoring means for controlling a shift of said register to a predetermined position, and
(17) means operated upon shifting of said register to said predetermined position for operating the other of said blocking bails and for conditioning said repeat mechanism for return to its normal position upon the succeeding operation of said clearing and restore means.

12. In a calculating machine for performing split-multiplication and having:
(1) an accumulator,
(2) actuating mechanism including selection gears for operating said accumulator,
(3) means for shifting said accumulator relative to said actuating mechanism,
(4) a keyboard for setting said gears,
(5) sign character control means for adjusting the said gears to operate said accumulator in an additive or a subtractive sign character direction,
(6) power means for cyclically operating said actuating means and said shifting means,
(7) a multiplier storage mechanism for controlling said actuating mechanism and said sign character control means to multiply values set in said keyboard by values inserted into said multiplier storage mechanism,
(8) means for inserting values into said multiplier mechanism,
(9) means for clearing said multiplier mechanism and restoring the same to a normal inoperative condition,
(10) a repeat mechanism for disabling the clearing of said multiplier storage mechanism,
(11) an additive multiplier control key,
(12) a substractive multiplier control key, and
(13) means rendered operative by said control keys for initiating a multiplication operation,
the improvement which comprises:
(14) resilient connecting means between said keyboard and said actuator gearing whereby the gearing may be held in a "0" value position although values are set in said keyboard,
(15) a blocking bail operative upon one group of said resilient connecting means whereby the bail is effective to hold the selection gears of said one group in a "0" condition,
(16) a second blocking means operative upon a second group of said resilient connecting means whereby the bail is effective to hold the selection gears of said second group in a "0" position,
(17) means operated simultaneously with said initiating means for setting said repeat mechanism to its operative position and for operating one of said blocking means,
(18) means operated by said clearing and restoring means for controlling a shift of said register to a predetermined position,
(19) means operated upon shifting of said register to said predetermined position for operating the other of said blocking means and for conditioning said repeat mechanism for return to its normal position upon the succeeding operation of said clearing and restore means, and
(20) means operated by said subtractive multiplier control key for operating the said sign character control means additively during the first multiplication operation and subtractively during the second multiplication operation.

13. In a calculating machine having a keyboard, an actuating mechanism, and a multiplying mechanism, the combination which comprises ordinally arranged resilient selection elements settable by said keyboard and operable to control operation of said actuating means, disabling means for disabling a group of certain orders of said selection elements, a second disabling means for disabling a group of certain other orders of said selection elements, and means for alternatively operating said disabling means during operation of said multiplying mechanism.

14. In a calculating machine having an ordinally arranged keyboard, an actuating mechanism, a multiplier storage mechanism, and a multiplier programming mechanism for controlling operation of said actuating means to multiply a value in said keyboard by a value in said multiplier storage mechanism, the combination which comprises disabling means for disabling a group of certain orders of said keyboard, a second disabling means for disabling a group of certain other orders of said keyboard, and means for alternatively operating said disabling means during an operation of said multiplier programming means.

15. In a calculating machine having:
(1) a keyboard,
(2) an actuating mechanism, and
(3) ordinally arranged selection elements settable by said keyboard and normally operable to control operation of said actuating means,
the combination which comprises:
(4) resilient means for each of said selection elements whereby a selection element set to a value position by the keyboard can be set to a disabled position, (5) disabling means for disabling a group of certain lower orders of said selection elements, (6) a second disabling means for disabling a group of certain higher orders of said selection elements, and (7) a control mechanism for either disabling both of said disabling means whereby the selection elements are controlled by the keyboard or operating said disabling means alternatively whereby in a first operation one group of said selection elements will be disabled and in a second operation the other group of said selection elements will be disabled.

16. In a cyclically operable calculating machine having:

(1) a keyboard,
(2) an actuating mechanism,
(3) ordinally arranged selection elements settable by said keyboard and normally operable to control operation of said actuating means, and
(4) a multiplying mechanism, the combination comprising:

(5) a disabling means for disabling a group of certain lower orders of said selection elements regardless of their setting by the keyboard,
(6) a second disabling means for disabling a group of certain higher orders of said selection elements regardless of their setting by the keyboard, and
(7) means operated by said multiplying mechanism for alternatively operating said disabling means.

17. In a calculating machine having:

(1) a keyboard,
(2) an actuating mechanism,
(3) a multiplying mechanism,
(4) and ordinally arranged selection elements settable by said keyboard and normally operable to control operation of said actuating means, the combination which comprises:

(5) disabling means for disabling a group of certain orders of said selection elements,
(6) a second disabling means for disabling a group of certain other orders of said selection elements, and
(7) a control member operable in one position to disable both of said disabling means during a multiplication operation whereby the multiplying mechanism is effective to multiply the value standing in the various orders of the keyboard, and operable in another position to control operation of said disabling means in sequence whereby a first multiplication operation multiplies the value standing in certain orders and a second multiplication multiplies the value standing in certain other orders.

18. In a calculating machine having:

(1) an ordinally arranged register,
(2) a keyboard,
(3) an ordinally arranged actuating mechanism,
(4) ordinally arranged selection members settable by said keyboard and normally operable to control values entered by said actuating mechanism into said register,
(5) means for storing a multiplier factor,
(6) a multiplier programming means operated under control of said multiplier storing means for controlling a multiplication operation in which a multiplicand value set in said keyboard is entered into said register a number of times corresponding to a multiplier value set in said multiplier storing means, and
(7) a drive means, the combination which comprises:

(8) resilient means connected to each of said selection members whereby a selection member set to a value position by the keyboard can be set to a disabled position,
(9) a first blocking means for setting the resilient means of one portion of the selection members to a disabled position,
(10) a second blocking means for setting the resilient means of another portion of said selection members to a disabled position,
(11) means operated by said drive means simultaneously with the initiation of a first multiplication operation to operate said second blocking means to disable said second portion of said members during such first multiplication operation, and
(12) means operated by said drive means simultaneously with the operation of a second multiplication operation for operating said first blocking means to disable said first portion of said selection members and to release the second blocking means during such second multiplication operation and thereby enable the second portion of said selection members for operation during a second multiplication operation.

19. In a calculating machine having:

(1) ordinally arranged selection members,
(2) means for storing a multiplier factor,
(3) a multiplier programming means operated under control of said multiplier storing means for controlling a multiplication operation in which a multiplicand value set in said selection members is multiplied by a value set in said storing means, the combination which comprises:

(4) a first blocking means for setting one group of the selection members to a disabled position,
(5) a second blocking means for setting another group of said selection members to a disabled position,
(6) means operated simultaneously with the initiation of a multiplication operation to operate said second blocking means to disable said second group of said members during a first multiplication operation, and
(7) means operated upon completion of said first multiplication for reinitiating a multiplication operation and for operating said first blocking means to disable said first group of said selection members and to release the second blocking means.

20. In a calculating machine having:

(1) an ordinally arranged actuating mechanism,
(2) ordinally arranged selection members operable to control said actuating mechanism,
(3) means for storing a multiplier factor, and
(4) a multiplier programming means operated under control of said multiplier storing means for controlling operation of said actuating means to multiply a multiplicand value set in said selection members by a multiplier value set in said storing means, the combination which comprises:

(5) a first blocking means for setting one portion of the selection members to a disabled position,
(6) a second blocking means for setting another portion of said selection members to a disabled position,
(7) means operated by said programming means simultaneously with the initiation of a multiplication operation to operate said second blocking means to disable said second portion of said members during a first multiplication operation, and
(8) means operated by said programming means upon completion of said first multiplication for reinitiating a multiplication operation and for operating said first blocking means to disable said first portion of said selection members and to release the second blocking means and thereby enable the second portion of said selection members for operation during a second multiplication operation.

References Cited in the file of this patent
UNITED STATES PATENTS 1,016,276   Kilpatrick _____ Feb. 6, 1912

UNITED STATES PATENT OFFICE
CERTIFICATE OF CORRECTION

Patent No. 3,110,441                          November 12, 1963

Grant C. Ellerbeck

It is hereby certified that error appears in the above numbered patent requiring correction and that the said Letters Patent should read as corrected below.

Column 1, line 49, for "calculaitng" read -- calculating --; column 2, line 30, for "multiplified" read -- multiplied --; column 3, line 39, for "plan" read -- plane --; column 6, line 37, for "valve" read -- value --; column 7, lines 5 and 7, for "mechanism", each occurrence, read -- mechanisms --; same column 7, line 47, for "stem" read -- stems --; column 11, line 23, for "members" read -- member --; line 33, after "bearing" insert -- bracket --; column 13, line 40, for "drive" read -- driver --; column 25, line 65, after "positive" insert a comma; column 31, line 23, for "repeate" read -- repeat --; column 34, line 33, for "intermedaite" read -- intermediate --; line 75, for "disablnig", in italics, read -- disabling --, in italics; column 38, line 43, after "keep" strike out the comma; column 48, line 67, after "figure" insert a closing parenthesis; column 49, line 33, after "arm" insert -- 435 --; line 59, strike out "in"; column 51, line 6, for "canont" read -- cannot --; column 52, line 9, for "multiplifier" read -- multiplier --; line 52, for "reigster" read -- register --; column 54, line 64, for "46" read -- 646 --; column 58, lines 34 and 35, for "conrolling" read -- controlling --; line 71, for "wthereby" read -- thereby --; column 61, line 62, for "muliplication" read -- multiplication --.

Signed and sealed this 8th day of September 1964.

(SEAL)
Attest:

ERNEST W. SWIDER                              EDWARD J. BRENNER
Attesting Officer                              Commissioner of Patents